US010805836B2

(12) United States Patent
Yu et al.

(10) Patent No.: US 10,805,836 B2
(45) Date of Patent: Oct. 13, 2020

(54) PACKET DUPLICATION AT A PACKET DATA CONVERGENCE PROTOCOL (PDCP) ENTITY

(71) Applicant: QUALCOMM Incorporated, San Diego, CA (US)

(72) Inventors: Yu-Ting Yu, Union City, CA (US); Gavin Bernard Horn, La Jolla, CA (US); Chih-Ping Li, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/970,047

(22) Filed: May 3, 2018

(65) Prior Publication Data

US 2018/0324642 A1    Nov. 8, 2018

Related U.S. Application Data

(60) Provisional application No. 62/502,552, filed on May 5, 2017, provisional application No. 62/651,970, filed on Apr. 3, 2018.

(51) Int. Cl.
*H04W 28/06* (2009.01)
*H04L 1/18* (2006.01)
(Continued)

(52) U.S. Cl.
CPC ............. *H04W 28/065* (2013.01); *H04L 1/08* (2013.01); *H04L 1/1835* (2013.01); *H04L 1/22* (2013.01);
(Continued)

(58) Field of Classification Search
CPC .. H04L 69/321; H04L 69/322; H04W 28/065; H04W 36/0069; H04W 36/026; H04W 72/04; H04W 80/02
See application file for complete search history.

(56) References Cited

U.S. PATENT DOCUMENTS 6,904,016 B2 *  6/2005  Kuo ........................ H04L 29/06
                                                         370/235
7,539,220 B2 *  5/2009  Jiang ....................... H04L 47/14
                                                         370/522
(Continued)

FOREIGN PATENT DOCUMENTS

CN      109391639 A   *  2/2019
GB        2449629 A   * 12/2008   ............ H04W 36/02
(Continued)

OTHER PUBLICATIONS

Ericsson, Data duplication and link selection for URLLC in NR, Jan. 17, 2017, 3GPP, 3GPP TSG-RAN WG2 #AH, Tdoc: R2-1700428 (Year: 2017).*
(Continued)

*Primary Examiner* — Eric Nowlin
(74) *Attorney, Agent, or Firm* — Holland & Hart LLP

(57) ABSTRACT

Techniques are described for operating procedures associated with packet duplication. A packet data protocol convergence protocol (PDCP) entity of a transmitting device may duplicate a received packet to form a set of copied packets. Each packet in the set of copied packets may include the information of the received packet. Each packet of the set of copied packets may be transmitted using a different radio link control (RLC) entity. Procedures are described for configuring duplication bearers. Procedures are described for activating or deactivating packet duplication. Procedures are described for handling RLC entities at deactivation. Procedures are described for discarding some duplicate packets after a packet has been successfully decoded by a receiving device. Procedures are described for delaying transmission of duplicate packets to improve efficient use of communication resources. Procedures are (Continued)

described for buffer status report (BSR) reporting for duplication bearers.

28 Claims, 27 Drawing Sheets

(51) Int. Cl.
| | |
|---|---|
| *H04W 36/00* | (2009.01) |
| *H04W 76/15* | (2018.01) |
| *H04L 1/22* | (2006.01) |
| *H04L 1/08* | (2006.01) |
| *H04W 76/27* | (2018.01) |
| *H04W 28/02* | (2009.01) |
| *H04L 12/823* | (2013.01) |
| *H04L 5/00* | (2006.01) |
| *H04L 1/00* | (2006.01) |
| *H04L 1/04* | (2006.01) |

(52) U.S. Cl.
CPC ....... *H04W 36/0055* (2013.01); *H04W 76/15* (2018.02); *H04L 1/0009* (2013.01); *H04L 1/04* (2013.01); *H04L 5/001* (2013.01); *H04L 47/32* (2013.01); *H04L 2001/0096* (2013.01); *H04W 28/0278* (2013.01); *H04W 76/27* (2018.02)

(56) References Cited

U.S. PATENT DOCUMENTS

| | | | | |
|---|---|---|---|---|
| 9,635,655 | B2* | 4/2017 | Jha | H04W 28/0278 |
| 10,231,170 | B2* | 3/2019 | Luo | H04W 48/08 |
| 2005/0201353 | A1* | 9/2005 | Lee | H04L 1/0018 370/349 |
| 2008/0170522 | A1* | 7/2008 | Sammour | H04L 1/1812 370/310 |
| 2009/0103478 | A1* | 4/2009 | Sammour | H04L 1/1874 370/328 |
| 2009/0104890 | A1* | 4/2009 | Wang | H04W 12/02 455/410 |
| 2009/0116490 | A1* | 5/2009 | Charpentier | H04L 1/1841 370/395.1 |
| 2009/0290598 | A1* | 11/2009 | Pani | H04L 1/0007 370/473 |
| 2010/0118781 | A1* | 5/2010 | Petrovic | H04L 1/1887 370/328 |
| 2010/0195617 | A1* | 8/2010 | Park | H04W 36/02 370/331 |
| 2011/0032877 | A1* | 2/2011 | Pani | H04L 1/0007 370/328 |
| 2015/0023370 | A1* | 1/2015 | Sammour | H04L 1/1874 370/465 |
| 2015/0245349 | A1* | 8/2015 | Jha | H04W 28/0278 370/329 |
| 2015/0289171 | A1* | 10/2015 | Jung | H04L 1/0001 370/331 |
| 2016/0183158 | A1* | 6/2016 | Decarreau | H04W 36/02 370/328 |
| 2016/0338092 | A1* | 11/2016 | Agiwal | H04W 72/1289 |
| 2017/0195944 | A1* | 7/2017 | Luo | H04W 72/04 |
| 2018/0041413 | A1* | 2/2018 | Yi | H04W 80/02 |
| 2018/0132220 | A1* | 5/2018 | Jang | H04W 76/14 |
| 2018/0199315 | A1* | 7/2018 | Hong | H04W 76/15 |
| 2018/0279168 | A1* | 9/2018 | Jheng | H04W 76/20 |
| 2018/0309660 | A1* | 10/2018 | Loehr | H04W 36/0066 |
| 2018/0310202 | A1* | 10/2018 | Lohr | H04W 28/065 |
| 2018/0324642 | A1* | 11/2018 | Yu | H04W 76/15 |
| 2018/0352601 | A1* | 12/2018 | Park | H04W 76/19 |
| 2018/0367288 | A1* | 12/2018 | Vrzic | H04L 12/403 |
| 2018/0367463 | A1* | 12/2018 | Jose | H04L 47/32 |
| 2019/0053326 | A1* | 2/2019 | Lee | H04W 4/70 |
| 2019/0098682 | A1* | 3/2019 | Park | H04L 5/001 |
| 2019/0150217 | A1* | 5/2019 | Kim | H04W 76/19 |
| 2019/0215726 | A1* | 7/2019 | Park | H04L 1/08 |
| 2019/0254062 | A1* | 8/2019 | Wu | H04W 76/15 |
| 2019/0327641 | A1* | 10/2019 | Mok | H04W 76/27 |
| 2020/0084663 | A1* | 3/2020 | Park | H04W 28/06 |
| 2020/0092746 | A1* | 3/2020 | Baek | H04L 1/08 |
| 2020/0107213 | A1* | 4/2020 | Park | H04L 61/2007 |

FOREIGN PATENT DOCUMENTS

| | | | | |
|---|---|---|---|---|
| WO | WO-2017211417 | A1 * | 12/2017 | H04W 28/065 |
| WO | WO-2018230849 | A1 * | 12/2018 | H04W 28/02 |
| WO | WO-2019019150 | A1 * | 1/2019 | |
| WO | WO-2019024792 | A1 * | 2/2019 | |

OTHER PUBLICATIONS

Ericsson, Further aspects of data duplication in PDCP layer, Feb. 13, 2017, 3GPP, 3GPP TSG-RAN WG2 #97, Tdoc: R2-1700834 (Year: 2017).*
Nokia et al., Discussion on the support for packet duplication, Feb. 13, 2017, 3GPP, 3GPP TSG-RAN WG2 #97, Tdoc: R2-1701861 (Year: 2017).*
Ericsson, Duplication in UL in Dual connectivity, Apr. 3, 2017, 3GPP, 3GPP TSG-RAN WG2 #97bis, Tdoc: R2-1702750 (Year: 2017).*
Ericsson, Controlling of duplication in case of CA, Apr. 3, 2017, 3GPP, 3GPP TSG-RAN WG2 #97bis, Tdoc: R2-1702753 (Year: 2017).*
Samsung, Packet Duplication Operations, Apr. 3, 2017, 3GPP, 3GPP TSG-RAN WG2 #97bis, Tdoc: R2-1703731 (Year: 2017).*
CATT, Configuration and activation/deactivation of duplication, May 15, 2017, 3GPP, 3GPP TSG-RAN WG2 Meeting #98, Tdoc: R2-1704247 (Year: 2017).*
ZTE, Consideration on the activation/deactivation of data duplication for CA, May 15, 2017, 3GPP, 3GPP TSG-RAN WG2 Meeting #98, Tdoc: R2-1704660 (Year: 2017).*
Huawei, Email discussion summary on control of UL PDCP duplication, May 15, 2017, 3GPP, 3GPP TSG-RAN2#98, Tdoc: R2-1704834 (Year: 2017).*
Huawei et al., Dynamic activation/deactivation of packet duplication, May 15, 2017, 3GPP, 3GPP TSG-RAN2#98, Tdoc: R2-1704835 (Year: 2017).*
Interdigital, Control of PDCP duplication, May 15, 2017, 3GPP, 3GPP TSG-RAN2#98, Tdoc: R2-1704916 (Year: 2017).*
Sharp, Enable/Disable PDCP Duplication, May 15, 2017, 3GPP, 3GPP TSG-RAN2#98, Tdoc: R2-1704941 (Year: 2017).*
Qualcomm Incorporated, Further details of PDCP duplication in CA case, May 15, 2017, 3GPP, 3GPP TSG-RAN2#98, Tdoc: R2-1705055 (Year: 2017).*
Qualcomm Incorporated, Discussion on PDCP duplication, May 15, 2017, 3GPP, 3GPP TSG-RAN2#98, Tdoc: R2-1705056 (Year: 2017).*
ASUSTeK, Activation and Deactivation of UL PDCP duplication, May 15, 2017, 3GPP, 3GPP TSG-RAN2#98, Tdoc: R2-1705416 (Year: 2017).*
CATT: "PDCP Duplication", 3GPP Draft; R2-1703114, 3rd Generation Partnership Project (3GPP), Mobile Competence Centre; 650, Route Des Lucioles; F-06921, Sophia-Antipolis Cedex; France, vol. RAN WG2, No. Spokane, USA; Apr. 3, 2017-Apr. 7, 2017 Mar. 25, 2017, XP051254404, Retrieved from the Internet: URL:http://www.3gpp.org/ftp/tsg_ran/WG2_RL2/TSGR2_97bis/Docs/ [retrieved on Mar. 25, 2017], 3 pages.
Ericsson: "Further Aspects of Data Duplication in PDCP Layer", 3GPP Draft; R2-1700834, Further Aspects of Data Duplication in PDCP Layer, 3rd Generation Partnership Project (3GPP), Mobile Competence Centre; 650, Route Des Lucioles; F-06921, Sophia-Antipolis Cedex; France, vol. RAN WG2, No. Athens, Greece; Feb. 13, 2017-Feb. 17. 2017 Feb. 3, 2017, XP051223012, Retrieved from the Internet: URL:http://www.3gpp.org/ftp/tsg_ran/WG2_RL2/TSGR2_97/Docs/ [retrieved on Feb. 3, 2017], 3 pages.
Interdigital Communications: "Packet Duplication at PDCP", 3GPP Draft; R2-1701186 (NR SI AI10212) URLLC Packet Duplication at PDCP, 3rd Generation Partnership Project (3GPP), Mobile Competence Centre; 650, Route Des Lucioles; F-06921, Sophia-

(56) References Cited

OTHER PUBLICATIONS

Antipolis Cedex; France, vol. RAN WG2, No. Athens, Greece; Feb. 13, 2017-Feb. 17, 2017 Feb. 4, 2017, XP051223409, Retrieved from the Internet: URL:http://www.3gpp.org/ftp/tsg_ran/WG2_RL2/TSGR2_97/Docs/ [retrieved on Feb. 4, 2017], 2 pages.
International Search Report and Written Opinion—PCT/US2018/031158—ISA/EPO—dated Aug. 1, 2018.
Nokia et al., "Duplication Impacts to PDCP", 3GPP Draft; R2-1704276 Duplication Impacts to PDCP, 3rd Generation Partnership Project (3GPP), Mobile Competence Centre; 650, Route Des Lucioles; F-06921, Sophia-Antipolis Cedex; France, vol. RAN WG2, No. Hangzhou, China; May 15, 2017-May 19, 2017 May 4, 2017, XP051263562, Retrieved from the Internet: URL:http://www.3gpp.org/ftp/tsg_ran/WG2_RL2/TSGR2_98/Docs/ [retrieved on May 4, 2017], 5 pages.
Nokia et al., "Overview of Duplication Operation", 3GPP Draft; R2-1702632 Overview of Duplication Operation, 3rd Generation Partnership Project (3GPP), Mobile Competence Centre; 650, Route Des Lucioles; F-06921, Sophia-Antipolis Cedex; France, vol. RAN WG2, No. Spokane, USA; Apr. 3, 2017-Apr. 7, 2017 Mar. 24, 2017, XP051253615, Retrieved from the Internet: URL:http://www.3gpp.org/ftp/tsg_ran/WG2_RL2/TSGR2_97bis/Docs/ [retrieved on Mar. 24, 2017], 2 pages.

\* cited by examiner

PACKET DUPLICATION AT A PACKET DATA CONVERGENCE PROTOCOL (PDCP) ENTITY

CROSS REFERENCES

The present application for patent claims to the benefit of U.S. Provisional Patent Application No. 62/502,552 by YU, et al., entitled "PACKET DUPLICATION AT A PACKET DATA CONVERGENCE PROTOCOL (PDCP) ENTITY," filed May 5, 2017, assigned to the assignee hereof and claims the benefit of U.S. Provisional Patent Application No. 62/651,970 by YU, et al. entitled "PACKET DUPLICATION AT A PACKET DATA CONVERGENCE PROTOCOL (PDCP) ENTITY," filed Apr. 3, 2018, assigned to the assignee hereof, and expressly incorporated herein.

BACKGROUND

The following relates generally to wireless communication, and more specifically to packet duplication at a packet data convergence protocol (PDCP) entity.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In wireless communication systems, some traffic may have reliability and/or latency requirements. Meaning, some traffic may request that the network deliver the traffic within a certain time frame. For example, ultra-reliable low latency communications (URLLC) traffic may be used in mission critical applications.

SUMMARY

The described techniques relate to improved methods, systems, devices, or apparatuses that support packet duplication at a packet data convergence protocol (PDCP) entity. Generally, the described techniques provide for operating procedures associated with packet duplication. A PDCP entity of a transmitting device may duplicate a received packet to form a set of copied packets. Each packet in the set of copied packets may include the information of the received packet. Each packet of the set of copied packets may be transmitted using a different radio link control (RLC) entity. Procedures are described for configuring duplication bearers. Procedures are also described for activating, reactivating, or deactivating packet duplication. Procedures are described for handling RLC entities at deactivation. Procedures are described for discarding some duplicate packets after a packet has been successfully decoded by a receiving device. Procedures are described for discarding some stared packets of the RLC entities at deactivation of packet duplication. A reset procedure for RLC entities may be initiated following deactivation of packet duplication. Procedures are also described for initiating a reset procedure of the RLC entities at reactivation. Packets stored in a buffer of an RLC entity may be discarded based on initiating the reset procedure following a reactivation. Procedures are described for delaying transmission of duplicate packets to improve efficient use of communication resources. Procedures are described for discarding some duplicate packets after a packet has been successfully decoded by a receiving device. Additionally, procedures are described for buffer status report (BSR) reporting for duplication bearers.

A method of wireless communication is described. The method may include receiving a configuration of a bearer to support packet duplication by a PDCP entity, determining an activation status of the packet duplication for the bearer, duplicating a first PDCP packet to create a second PDCP packet that is a copy of the first PDCP packet based at least in part on the activation status of the packet duplication for the bearer, and forwarding the first PDCP packet to a first RLC entity and the second PDCP packet to a second RLC entity.

An apparatus for wireless communication is described. The apparatus may include means for receiving a configuration of a bearer to support packet duplication by a PDCP entity, means for determining an activation status of the packet duplication for the bearer, means for duplicating a first PDCP packet to create a second PDCP packet that is a copy of the first PDCP packet based at least in part on the activation status of the packet duplication for the bearer, and means for forwarding the first PDCP packet to a first RLC entity and the second PDCP packet to a second RLC entity.

Another apparatus for wireless communication is described. The apparatus may include a processor, memory in electronic communication with the processor, and instructions stored in the memory. The instructions may be operable to cause the processor to receive a configuration of a bearer to support packet duplication by a PDCP entity, determine an activation status of the packet duplication for the bearer, duplicate a first PDCP packet to create a second PDCP packet that is a copy of the first PDCP packet based at least in part on the activation status of the packet duplication for the bearer, and forward the first PDCP packet to a first RLC entity and the second PDCP packet to a second RLC entity.

A non-transitory computer readable medium for wireless communication is described. The non-transitory computer-readable medium may include instructions operable to cause a processor to receive a configuration of a bearer to support packet duplication by a PDCP entity, determine an activation status of the packet duplication for the bearer, duplicate a first PDCP packet to create a second PDCP packet that is a copy of the first PDCP packet based at least in part on the activation status of the packet duplication for the bearer, and forward the first PDCP packet to a first RLC entity and the second PDCP packet to a second RLC entity.

In some examples of the method, apparatus, and non-transitory computer-readable medium described above, the packet duplication comprises one or more of a plurality of packet duplication modes of operation of the PDCP entity.

In some examples of the method, apparatus, and non-transitory computer-readable medium described above, the packet duplication includes a set of conditions for duplicating packets as part of a packet duplication mode.

Some examples of the method, apparatus, and non-transitory computer-readable medium described above may further include processes, features, means, or instructions for receiving an indication to activate or deactivate the duplication of packets during the packet duplication.

Some examples of the method, apparatus, and non-transitory computer-readable medium described above may further include processes, features, means, or instructions for determining that a dynamic duplication parameter satisfies an activation threshold. Some examples of the method, apparatus, and non-transitory computer-readable medium described above may further include processes, features, means, or instructions for activating the duplication of packets by the PDCP entity based at least in part on the dynamic duplication parameter satisfying the activation threshold.

Some examples of the method, apparatus, and non-transitory computer-readable medium described above may further include processes, features, means, or instructions for receiving a message that indicates the dynamic duplication parameter and the activation threshold, wherein determining that the dynamic duplication parameter satisfies the activation threshold may be based at least in part on the message.

In some examples of the method, apparatus, and non-transitory computer-readable medium described above, the dynamic duplication parameter includes, a packet loss rate associated with the first RLC entity, a packet loss rate associated with the second RLC entity, a data rate associated with the first RLC entity, a data rate associated with the second RLC entity, a channel quality indicator associated with the first RLC entity, a channel quality indicator associated with the second RLC entity, an application packet type, a transport block size associated with the first RLC entity, a transport block size associated with the second RLC entity, or a combination.

Some examples of the method, apparatus, and non-transitory computer-readable medium described above may further include processes, features, means, or instructions for receiving a control message from a base station. Some examples of the method, apparatus, and non-transitory computer-readable medium described above may further include processes, features, means, or instructions for activating the duplication of packets during the packet duplication based at least in part on receiving the control message.

Some examples of the method, apparatus, and non-transitory computer-readable medium described above may further include processes, features, means, or instructions for deactivating the second RLC entity based at least in part on receiving a command to deactivate the duplication of packets during the packet duplication. Some examples of the method, apparatus, and non-transitory computer-readable medium described above may further include processes, features, means, or instructions for transmitting packets stored in a buffer of the second RLC entity until the buffer may be empty based at least in part on deactivating the second RLC entity.

Some examples of the method, apparatus, and non-transitory computer-readable medium described above may further include processes, features, means, or instructions for deactivating the second RLC entity based at least in part on receiving a command to deactivate the duplication of packets during the packet duplication. Some examples of the method, apparatus, and non-transitory computer-readable medium described above may further include processes, features, means, or instructions for discarding packets stored in a buffer of the second RLC entity based at least in part on deactivating the second RLC entity.

Some examples of the method, apparatus, and non-transitory computer-readable medium described above may further include processes, features, means, or instructions for initiating a reset procedure for the second RLC entity based at least in part on deactivating the second RLC entity, wherein discarding the packets may be based at least in part on initiating the reset procedure.

Some examples of the method, apparatus, and non-transitory computer-readable medium described above may further include processes, features, means, or instructions for discarding the packets may be based at least in part on reactivating the duplication of packets during the packet duplication after the duplication of packets during the packet duplication may have been deactivated.

In some examples of the method, apparatus, and non-transitory computer-readable medium described above, at least one of the first PDCP packet of the first RLC entity or the second PDCP packet of the second RLC entity includes a logical channel identifier (LCID), a logical channel group identifier (LCG ID), a buffer size of the first RLC entity, a buffer size of the second RLC entity, padding, or a combination.

Some examples of the method, apparatus, and non-transitory computer-readable medium described above may further include processes, features, means, or instructions for receiving, via the first RLC entity, an acknowledgement (ACK) indicating that the first PDCP packet was received by a receiving device. Some examples of the method, apparatus, and non-transitory computer-readable medium described above may further include processes, features, means, or instructions for refraining from transmitting the second PDCP packet via the second RLC entity based at least in part on receiving the ACK.

Some examples of the method, apparatus, and non-transitory computer-readable medium described above may further include processes, features, means, or instructions for synchronizing sequence numbers of the first RLC entity and the second RLC entity, wherein the ACK may be associated with the first PDCP packet and the second PDCP packet based at least in part on the synchronized sequence numbers.

Some examples of the method, apparatus, and non-transitory computer-readable medium described above may further include processes, features, means, or instructions for identifying a current left edge and a next sequence number of the first RLC entity. Some examples of the method, apparatus, and non-transitory computer-readable medium described above may further include processes, features, means, or instructions for determining a state variable for the second RLC entity based at least in part on the current left edge and the next sequence number of the first RLC entity.

Some examples of the method, apparatus, and non-transitory computer-readable medium described above may further include processes, features, means, or instructions for adjusting a state variable of the second RLC entity based at least in part on an updated state variable of the first RLC entity. Some examples of the method, apparatus, and non-transitory computer-readable medium described above may further include processes, features, means, or instructions for discarding packets stored in a buffer of the second RLC entity based at least in part on adjusting the state variable of the second RLC entity.

In some examples of the method, apparatus, and non-transitory computer-readable medium described above, the updated state variable of the first RLC entity may be indicated to the second RLC entity by an indication from the PDCP entity, the first RLC entity, or a radio resource control (RRC) entity.

Some examples of the method, apparatus, and non-transitory computer-readable medium described above may further include processes, features, means, or instructions for activating a timer based at least in part on forwarding the first data packet to the first RLC entity.

Some examples of the method, apparatus, and non-transitory computer-readable medium described above may further include processes, features, means, or instructions for receiving an ACK that the first PDCP packet was received by a receiving device before the timer expires. Some examples of the method, apparatus, and non-transitory computer-readable medium described above may further include processes, features, means, or instructions for discarding the second PDCP packet without forwarding the second PDCP packet to the second RLC entity based at least in part on receiving the ACK.

Some examples of the method, apparatus, and non-transitory computer-readable medium described above may further include processes, features, means, or instructions for determining that the timer expired without receiving an acknowledgement from a receiving device, wherein forwarding the second PDCP packet may be based at least in part on the timer expiring without receiving acknowledgement from the receiving device.

Some examples of the method, apparatus, and non-transitory computer-readable medium described above may further include processes, features, means, or instructions for transmitting the first PDCP packet using a first component carrier having a first frequency spectrum band, the first component carrier being mapped to the first RLC entity. Some examples of the method, apparatus, and non-transitory computer-readable medium described above may further include processes, features, means, or instructions for transmitting the second PDCP packet using a second component carrier having a second frequency spectrum band different from the first frequency spectrum band, the second component carrier being mapped to the second RLC entity.

Some examples of the method, apparatus, and non-transitory computer-readable medium described above may further include processes, features, means, or instructions for receiving a message indicating the mapping of the first RLC entity to the first component carrier and the second RLC entity to the second component, wherein transmitting the first PDCP packet and the second PDCP packet may be based at least in part on the mapping.

Some examples of the method, apparatus, and non-transitory computer-readable medium described above may further include processes, features, means, or instructions for transmitting a first BSR for the first RLC entity. Some examples of the method, apparatus, and non-transitory computer-readable medium described above may further include processes, features, means, or instructions for transmitting a second BSR for the second RLC entity.

Some examples of the method, apparatus, and non-transitory computer-readable medium described above may further include processes, features, means, or instructions for identifying a buffer of an RLC entity that includes more data than any other buffer associated with other RLC entities. Some examples of the method, apparatus, and non-transitory computer-readable medium described above may further include processes, features, means, or instructions for transmitting a single buffer status report that includes an amount of data of the identified buffer.

Some examples of the method, apparatus, and non-transitory computer-readable medium described above may further include processes, features, means, or instructions for identifying a buffer of an RLC entity that includes less data than any other buffer associated with other RLC entities. Some examples of the method, apparatus, and non-transitory computer-readable medium described above may further include processes, features, means, or instructions for transmitting a single buffer status report that includes an amount of data of the identified buffer.

Some examples of the method, apparatus, and non-transitory computer-readable medium described above may further include processes, features, means, or instructions for averaging an amount of data stored in a first buffer of the first RLC entity with an amount of data stored in a second buffer of the second RLC entity. Some examples of the method, apparatus, and non-transitory computer-readable medium described above may further include processes, features, means, or instructions for transmitting a single buffer status report that includes the averaged amount of data.

Some examples of the method, apparatus, and non-transitory computer-readable medium described above may further include processes, features, means, or instructions for identifying a first buffer status for a first buffer of the first RLC entity and a second buffer status for a second buffer of the second RLC entity. Some examples of the method, apparatus, and non-transitory computer-readable medium described above may further include processes, features, means, or instructions for transmitting a single buffer status report that includes the first buffer status and the second buffer status.

Some examples of the method, apparatus, and non-transitory computer-readable medium described above may further include processes, features, means, or instructions for selecting the first RLC entity or the second RLC entity as a default RLC entity. Some examples of the method, apparatus, and non-transitory computer-readable medium described above may further include processes, features, means, or instructions for transmitting an identification of the default RLC entity to a receiving device.

In some examples of the method, apparatus, and non-transitory computer-readable medium described above, the first RLC entity and the second RLC entity may be associated with carrier aggregation for communicating with a same base station.

In some examples of the method, apparatus, and non-transitory computer-readable medium described above, the first RLC entity may be associated with a first base station and the second RLC entity may be associated with a second base station different from the first base station for dual connectivity communication.

In some examples of the method, apparatus, and non-transitory computer-readable medium described above, the packet duplication includes a plurality of procedures for processing data at the PDCP entity that may be different from procedures specified by other modes of operation of the PDCP entity.

Some examples of the method, apparatus, and non-transitory computer-readable medium described above may further include processes, features, means, or instructions for coordinating a forwarding of the first PDCP packet to the first RLC entity and the second PDCP packet to the second RLC entity based at least in part on a status of the first RLC entity and a status of the second RLC entity.

Some examples of the method, apparatus, and non-transitory computer-readable medium described above may further include processes, features, means, or instructions for configuring the status of the first RLC entity and the status of the second RLC entity based at least in part on activating packet duplication.

Some examples of the method, apparatus, and non-transitory computer-readable medium described above may further include processes, features, means, or instructions for configuring the status of the first RLC entity and the status of the second RLC entity based at least in part on deactivating packet duplication.

Some examples of the method, apparatus, and non-transitory computer-readable medium described above may further include processes, features, means, or instructions for configuring the status of the first RLC entity and the status of the second RLC entity based at least in part on reactivating packet duplication.

In some examples of the method, apparatus, and non-transitory computer-readable medium described above, the coordinating of the forwarding of the first PDCP packet and the second PDCP packet may be based at least in part on delaying transmission of the second PDCP packet using a timer.

Some examples of the method, apparatus, and non-transitory computer-readable medium described above may further include processes, features, means, or instructions for transmitting a BSR associated with at least a bearer configured to support duplication of packets for a PDCP entity.

In some examples of the method, apparatus, and non-transitory computer-readable medium described above, the BSR includes a bearer type, information about whether the bearer may be a duplication bearer, an indication of whether the BSR includes information per RLC entity or includes information per PDCP entity, or a combination.

In some examples of the method, apparatus, and non-transitory computer-readable medium described above, the BSR may be transmitted using a short duplication format.

In some examples of the method, apparatus, and non-transitory computer-readable medium described above, the short duplication format includes a LCID, a LCG ID, a buffer size of the first RLC entity, a buffer size of the second RLC entity, padding, or a combination.

In some examples of the method, apparatus, and non-transitory computer-readable medium described above, the BSR may be transmitted using a long duplication format.

In some examples of the method, apparatus, and non-transitory computer-readable medium described above, the long duplication format includes information organized based at least in part on a radio bearer identifier.

In some examples of the method, apparatus, and non-transitory computer-readable medium described above, the long duplication format includes a buffer size of bearers that do not support duplication.

A method of wireless communication at a base station is described. The method may include measuring an activation parameter associated with packet duplication, determining that the activation parameter satisfies an activation threshold, and transmitting an activation message to a UE indicating that duplicated packets are to be communicated based at least in part on determining that the activation parameter satisfies the activation threshold.

An apparatus for wireless communication at a base station is described. The apparatus may include means for measuring an activation parameter associated with packet duplication, means for determining that the activation parameter satisfies an activation threshold, and means for transmitting an activation message to a UE indicating that duplicated packets are to be communicated based at least in part on determining that the activation parameter satisfies the activation threshold.

Another apparatus (e.g., base station) for wireless communication is described. The apparatus may include a processor, memory in electronic communication with the processor, and instructions stored in the memory. The instructions may be operable to cause the processor to measure an activation parameter associated with packet duplication, determine that the activation parameter satisfies an activation threshold, and transmit an activation message to a UE indicating that duplicated packets are to be communicated based at least in part on determining that the activation parameter satisfies the activation threshold.

A non-transitory computer readable medium for wireless communication at a base station is described. The non-transitory computer-readable medium may include instructions operable to cause a processor to measure an activation parameter associated with packet duplication, determine that the activation parameter satisfies an activation threshold, and transmit an activation message to a UE indicating that duplicated packets are to be communicated based at least in part on determining that the activation parameter satisfies the activation threshold.

Some examples of the method, apparatus, and non-transitory computer-readable medium described above may further include processes, features, means, or instructions for duplicating, by a PDCP entity of the base station, a first PDCP packet to create a second PDCP packet that may be a copy of the first PDCP packet based at least in part on determining that the activation parameter satisfies the activation threshold.

In some examples of the method, apparatus, and non-transitory computer-readable medium described above, the activation message indicates that the UE may be to transmit duplicated packets to the base station.

Some examples of the method, apparatus, and non-transitory computer-readable medium described above may further include processes, features, means, or instructions for receiving a first PDCP packet from the UE and a second PDCP packet from the UE based at least in part on transmitting the activation message, the second PDCP packet being a copy of the first PDCP packet.

In some examples of the method, apparatus, and non-transitory computer-readable medium described above, the activation parameter may be a packet loss rate or a channel quality indicator associated with a communication link between the base station and the UE.

Some examples of the method, apparatus, and non-transitory computer-readable medium described above may further include processes, features, means, or instructions for transmitting a condition for activating packet duplication that includes an indication of the activation parameter and the activation threshold.

Some examples of the method, apparatus, and non-transitory computer-readable medium described above may further include processes, features, means, or instructions for selecting the first RLC entity or the second RLC entity as a default RLC entity. Some examples of the method, apparatus, and non-transitory computer-readable medium described above may further include processes, features, means, or instructions for transmitting an identification of the default RLC entity to the UE.

A method of wireless communication by a UE is described. The method may include receiving, from a base station, a condition for activating packet duplication, the condition including an indication of an activation parameter and an activation threshold, measuring the activation parameter associated with packet duplication, determining that the activation parameter satisfies the activation threshold, and transmitting an activation message to the base station indicating that duplicated packets are to be communicated by the UE based at least in part on determining that the activation parameter satisfies the activation threshold.

An apparatus for wireless communication by a UE is described. The apparatus may include means for receiving, from a base station, a condition for activating packet duplication, the condition including an indication of an activation parameter and an activation threshold, means for measuring the activation parameter associated with packet duplication, means for determining that the activation parameter satisfies the activation threshold, and means for transmitting an activation message to the base station indicating that duplicated packets are to be communicated by the UE based at least in part on determining that the activation parameter satisfies the activation threshold.

Another apparatus for wireless communication is described. The apparatus may include a processor, memory in electronic communication with the processor, and instructions stored in the memory. The instructions may be operable to cause the processor to receive, from a base station, a condition for activating packet duplication, the condition including an indication of an activation parameter and an activation threshold, measure the activation parameter associated with packet duplication, determine that the activation parameter satisfies the activation threshold, and transmit an activation message to the base station indicating that duplicated packets are to be communicated by the UE based at least in part on determining that the activation parameter satisfies the activation threshold.

A non-transitory computer readable medium for wireless communication at a UE is described. The non-transitory computer-readable medium may include instructions operable to cause a processor to receive, from a base station, a condition for activating packet duplication, the condition including an indication of an activation parameter and an activation threshold, measure the activation parameter associated with packet duplication, determine that the activation parameter satisfies the activation threshold, and transmit an activation message to the base station indicating that duplicated packets are to be communicated by the UE based at least in part on determining that the activation parameter satisfies the activation threshold.

Some examples of the method, apparatus, and non-transitory computer-readable medium described above may further include processes, features, means, or instructions for duplicating, by a PDCP entity of the UE, a first PDCP packet to create a second PDCP packet that may be a copy of the first PDCP packet based at least in part on determining that the activation parameter satisfies the activation threshold.

Some examples of the method, apparatus, and non-transitory computer-readable medium described above may further include processes, features, means, or instructions for forwarding the first PDCP packet to a first RLC entity and the second PDCP packet to a second RLC entity different from the first RLC entity.

Some examples of the method, apparatus, and non-transitory computer-readable medium described above may further include processes, features, means, or instructions for transmitting the first PDCP packet and the second PDCP packet to the base station based at least in part on determining that the activation parameter satisfies the activation threshold.

In some examples of the method, apparatus, and non-transitory computer-readable medium described above, the activation parameter may be a packet loss rate or a channel quality indicator associated with a communication link between the base station and the UE.

Some examples of the method, apparatus, and non-transitory computer-readable medium described above may further include processes, features, means, or instructions for receiving an identification of a default RLC entity from the base station.

A method of wireless communication is described. The method may include duplicating, at a transmitting device, a first packet data convergence protocol (PDCP) packet to create a second PDCP packet that is a copy of the first PDCP packet based at least in part on the PDCP entity operating in a duplication mode for duplication of packets, forwarding the first PDCP packet to a first radio link control (RLC) entity and the second PDCP packet to a second RLC entity, deactivating the duplication of packets using the second RLC entity, and discarding packets stored in a buffer of the second RLC entity based at least in part on deactivating the duplication of packets using the second RLC entity.

An apparatus for wireless communication is described. The apparatus may include means for duplicating, at a transmitting device, a first packet data convergence protocol (PDCP) packet to create a second PDCP packet that is a copy of the first PDCP packet based at least in part on the PDCP entity operating in a duplication mode for duplication of packets, means for forwarding the first PDCP packet to a first radio link control (RLC) entity and the second PDCP packet to a second RLC entity, means for deactivating the duplication of packets using the second RLC entity, and means for discarding packets stored in a buffer of the second RLC entity based at least in part on deactivating the duplication of packets using the second RLC entity.

Another apparatus for wireless communication is described. The apparatus may include a processor, memory in electronic communication with the processor, and instructions stored in the memory. The instructions may be operable to cause the processor to duplicate, at a transmitting device, a first packet data convergence protocol (PDCP) packet to create a second PDCP packet that is a copy of the first PDCP packet based at least in part on the PDCP entity operating in a duplication mode for duplication of packets, forward the first PDCP packet to a first radio link control (RLC) entity and the second PDCP packet to a second RLC entity, deactivate the duplication of packets using the second RLC entity, and discard packets stored in a buffer of the second RLC entity based at least in part on deactivating the duplication of packets using the second RLC entity.

A non-transitory computer-readable medium for wireless communication is described. The non-transitory computer-readable medium may include instructions operable to cause a processor to duplicate, at a transmitting device, a first packet data convergence protocol (PDCP) packet to create a second PDCP packet that is a copy of the first PDCP packet based at least in part on the PDCP entity operating in a duplication mode for duplication of packets, forward the first PDCP packet to a first radio link control (RLC) entity and the second PDCP packet to a second RLC entity, deactivate the duplication of packets using the second RLC entity, and discard packets stored in a buffer of the second RLC entity based at least in part on deactivating the duplication of packets using the second RLC entity.

Some examples of the method, apparatus, and non-transitory computer-readable medium described above may further include processes, features, means, or instructions for initiating a reset procedure for the second RLC entity upon deactivating the duplication of packets using the second RLC entity, wherein discarding the packets may be based at least in part on initiating the reset procedure upon deactivating the duplication of packets.

Some examples of the method, apparatus, and non-transitory computer-readable medium described above may further include processes, features, means, or instructions for activating or reactivating the duplication of packets using the second RLC entity during the duplication mode.

Some examples of the method, apparatus, and non-transitory computer-readable medium described above may further include processes, features, means, or instructions for initiating a reset procedure for the second RLC entity upon reactivating the second RLC entity, wherein discarding the packets may be based at least in part on initiating the reset procedure.

Some examples of the method, apparatus, and non-transitory computer-readable medium described above may further include processes, features, means, or instructions for receiving a message that activates or reactivates the duplication of packets using the second RLC entity, wherein activating or reactivating the duplication of packets using the second RLC entity may be based at least in part on receiving the message.

In some examples of the method, apparatus, and non-transitory computer-readable medium described above, the message may be a radio resource control (RRC) message, a PDCP control protocol data unit (PDU), a medium access control (MAC) control element (CE), or a physical downlink control channel, or a combination thereof.

In some examples of the method, apparatus, and non-transitory computer-readable medium described above, the packets may be pending for acknowledgement or negative acknowledgement, pending for retransmission, or pending for new transmission, or a combination thereof.

Some examples of the method, apparatus, and non-transitory computer-readable medium described above may further include processes, features, means, or instructions for transmitting an indicator that the packets stored in the buffer of the second RLC entity may have been discarded.

In some examples of the method, apparatus, and non-transitory computer-readable medium described above, the indicator may be a RLC control protocol data unit (PDU), a RLC data PDU with a discard flag, or a RLC data PDU with an empty RLC payload, or a combination thereof.

Some examples of the method, apparatus, and non-transitory computer-readable medium described above may further include processes, features, means, or instructions for performing a RLC reestablishment procedure for the second RLC entity after deactivating the duplication of packets using the second RLC entity.

Some examples of the method, apparatus, and non-transitory computer-readable medium described above may further include processes, features, means, or instructions for determining that a duration after deactivating the duplication of packets using the second RLC entity satisfies a time threshold, wherein performing the RLC reestablishment procedure occurs after the duration satisfies the time threshold.

Some examples of the method, apparatus, and non-transitory computer-readable medium described above may further include processes, features, means, or instructions for receiving a message from a receiving device requesting that the RLC reestablishment procedure be performed, wherein performing the RLC reestablishment procedure occurs after receiving the message.

Some examples of the method, apparatus, and non-transitory computer-readable medium described above may further include processes, features, means, or instructions for configuring a bearer to support the duplication of packets for a PDCP entity of the transmitting device, wherein duplicating the first PDCP packet may be based at least in part on configuring the bearer.

Some examples of the method, apparatus, and non-transitory computer-readable medium described above may further include processes, features, means, or instructions for determining, based at least part on an activation status, that a bearer supports the duplication of packets, wherein duplicating the first PDCP packet may be based at least in part on determining that the bearer supports the duplication of packets.

In some examples of the method, apparatus, and non-transitory computer-readable medium described above, the duplication mode comprises one mode of a plurality of modes of operation of the PDCP entity.

In some examples of the method, apparatus, and non-transitory computer-readable medium described above, the duplication mode includes a set of conditions for duplicating packets.

DETAILED DESCRIPTION

Figure 1:
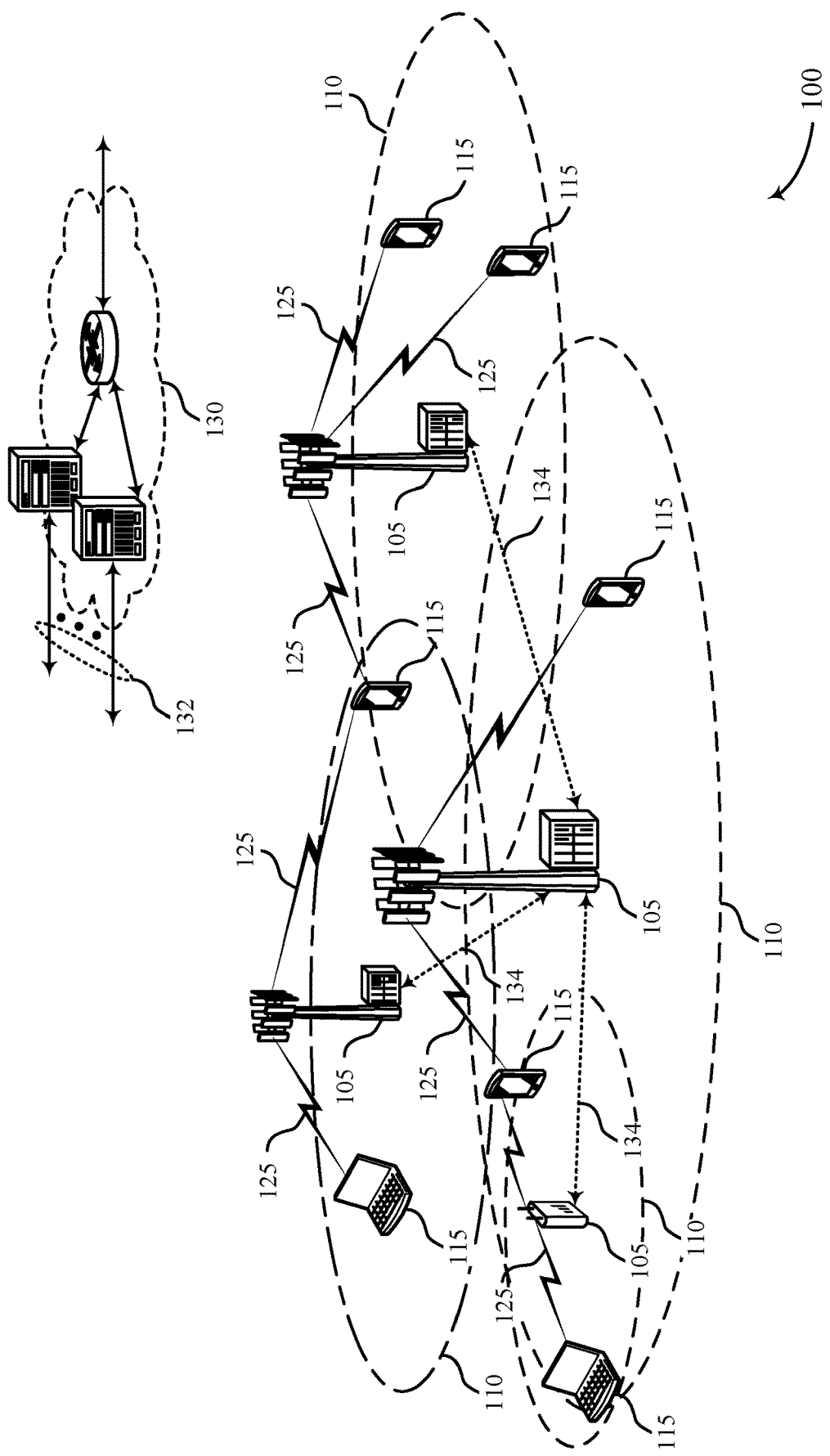
FIG. 1 illustrates an example of a system for wireless communication that supports packet duplication at a packet data convergence protocol (PDCP) entity in accordance with aspects of the present disclosure.

In some wireless communication systems, packets may be duplicated and transmitted to improve a likelihood that information included in the set of copied packets is received by a receiving device. A packet data convergence protocol (PDCP) entity of a transmitting device may receive a packet from a high layer. The PDCP entity of the transmitting entity may duplicate the received packet to form a set of copied packets. Each packet in the set of copied packets may include the information of the received packet. Some wireless communication systems may support packet duplication used in conjunction with carrier aggregation procedures or dual connectivity procedures.

Techniques are described for operating procedures associated with packet duplication. A PDCP entity of a transmitting device may duplicate a received packet to form a set of copied packets. Each packet in the set of copied packets may include the information of the received packet. Each packet of the set of copied packets may be transmitted using a different radio link control (RLC) entity. Procedures are described for receiving configurations of duplication bearers to support packet duplication. Procedures are also described for activating, reactivating, or deactivating packet duplication using some RLC entities. Packet duplication may refer to implementation of a packet duplication mode. Additionally or alternatively, packet duplication may refer to exercising the duplication of packets as part of a packet duplication mode. Procedures are described for handling RLC entities at deactivation. Procedures are described for discarding some stored packets of the RLC entities at deactivation of packet duplication. A reset procedure for RLC entities may be initiated following deactivation of packet duplication. Procedures are described for initiating a reset procedure of the RLC entities at reactivation. Packets stored in a buffer of an RLC entity may be discarded based on initiating the reset procedure following a reactivation. Procedures are also described for discarding some duplicate packets after a packet has been successfully decoded by a receiving device. Procedures are described for delaying transmission of duplicate packets to improve efficient use of communication resources. Procedures are described for delaying transmission of duplicate packets to improve efficient use of communication resources. Procedures are described for discarding some duplicate packets after a packet has been successfully decoded by a receiving device. Additionally procedures are described for buffer status report (BSR) reporting for duplication bearers.

Aspects of the disclosure are initially described in the context of a wireless communications system. Aspects of the disclosure are illustrated by and described with reference to communication schemes. Aspects of the disclosure are further illustrated by and described with reference to apparatus diagrams, system diagrams, and flowcharts that relate to packet duplication at a PDCP entity.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. To improve the reliability of some communications (e.g., ultra-reliable low latency communications (URLLC) packets), the wireless communications system 100 may be configured to generate and transmit duplicate packets. In such duplication systems, a transmitting device (e.g., base station 105 or UE 115) may duplicate a packet. The original packet and duplicated packets may be transmitted to a receiving device (e.g., base station 105 or UE 115). Transmitting multiple packets that include the same information may improve the likelihood that the receiving device receives the information included in the multiple packets.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or PDCP layer may be IP-based. An RLC layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten one ms subframes numbered from zero to nine. A subframe may be further divided into two 0.5 ms slots, each of which contains six or seven modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain twelve consecutive subcarriers in the frequency domain and, for a normal cyclic prefix in each orthogonal frequency-division multiplexing (OFDM) symbol, seven consecutive OFDM symbols in the time domain (one slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as transmitting device such as the UE 115 or the base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Figure 2:
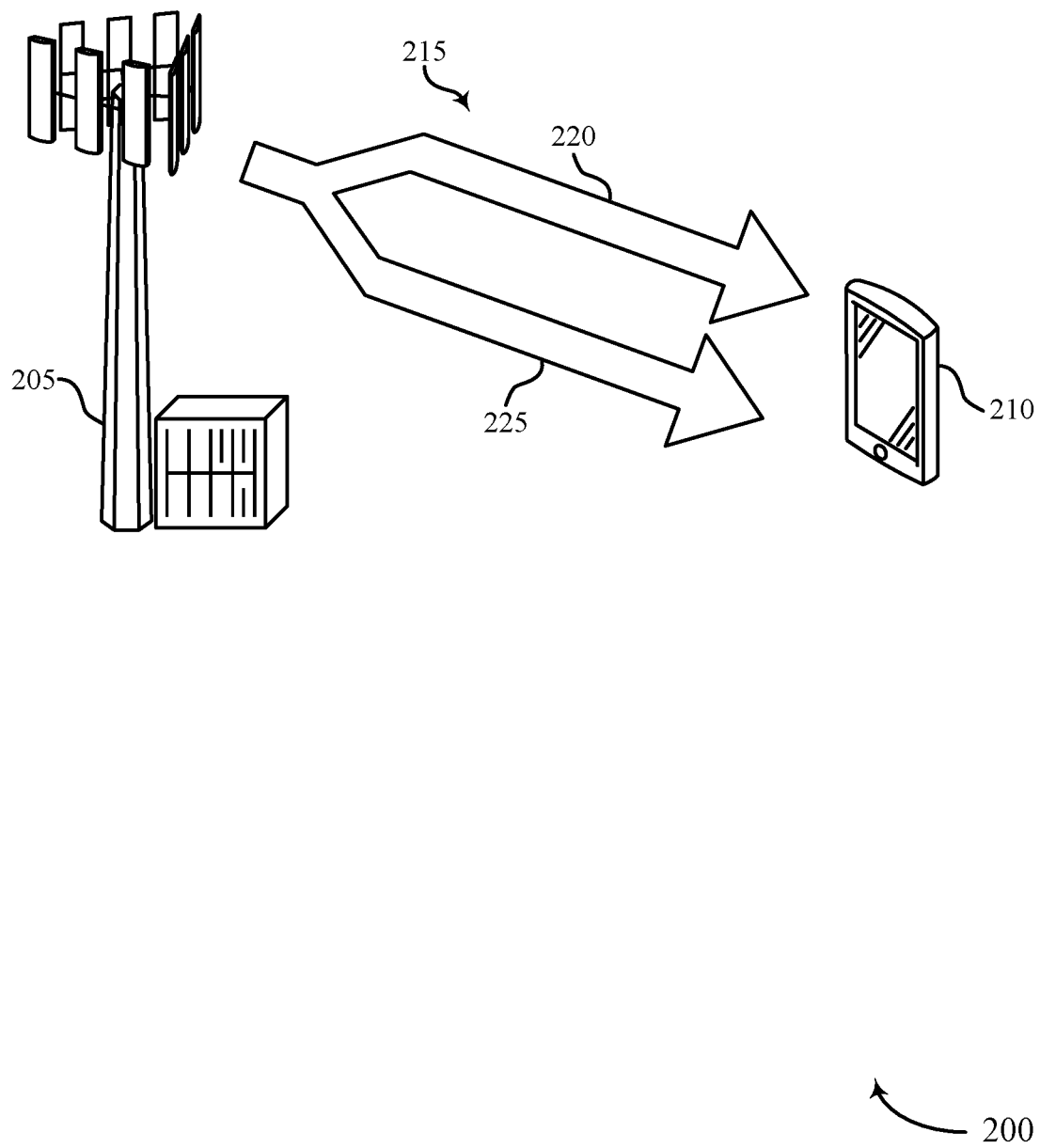
FIG. 2 illustrates an example of a wireless communication system that supports packet duplication at a PDCP entity in accordance with aspects of the present disclosure.

FIG. 2 illustrates an example of a wireless communication system 200 that supports packet duplication at a PDCP entity in accordance with various aspects of the present disclosure. In some examples, the wireless communication system 200 may implement aspects of wireless communication system 100. Communication instances on multiple paths may be established at the PDCP entity and duplicate packets may be transmitted along the multiple paths to improve link reliability between entities in the wireless communication system 200. In establishing communication of duplicate packets over distinct paths (sometimes referred to as "legs") the PDCP entity may reset each instance of the distinct paths. Resetting each instance may include discarding pending data packets stored at a buffer of the path during communication establishment. The cleared data packets may include data pending for new transmission or data pending for retransmission. Following reset of each RLC instance, packet transmission of at least duplicate packets over the RLC instances may be reestablished and implemented. By communicating the same packet of data by multiple legs the likelihood that a receiving device receives at least one of the packets may be increased. In some examples, transmitting duplicate packets using different paths may help the wireless communication system 200 meet transmission requirements for some types of traffic (e.g., ultra-low-latency, ultra-reliable packets).

The wireless communication system 200 may include a base station 205 and a UE 210. In some examples, the base station 205 may communicate duplicate data with the UE 210 using a communication link 215. The communication link 215 may include default leg 220 and a duplicate leg 225 different from the default leg 220. The default leg 220 may be configured to communicate a packet of information (e.g., message, transmission) and the duplicate leg 225 may be configured to communicate a duplicate packet of information. Because the duplicate packet is a copy of the original packet, in many instances, the terms duplicate packet and original packet may be used interchangeably. While FIG. 2 illustrates the duplicate information being transmitted from the base station 205 to the UE 210, in other examples, the UE 210 may transmit duplicate information to the base station 205. As such, a transmitting device may be either a base station 205 or a UE 210 and a receiving device may be either a base station 205 or a UE 210. The wireless communication system 200 may be an example of the wireless communication system 100 described with reference to FIG. 1. The base station 205 may be an example of the base stations 105 described with reference to FIG. 1. The UE 210 may be an example of the UEs 115 described with reference to FIG. 1. The communication link 215 may be an example of the communication links 125 described with reference to FIG. 1.

The transmitting device (e.g., base station 205 in FIG. 2), may receive a packet at a PDCP entity from a higher entity or layer. Such a packet may be an IP packet, in some examples. The PDCP entity may copy or duplicate the packet to create a duplicate packet. In some instances, the duplicate packet may be an exact replica for the original packet. The transmitting device (e.g., base station 205 in FIG. 2) may transmit the original packet and the duplicate packet to the receiving device (e.g., UE 210 in FIG. 2) using two different logical channels. As such, the likelihood that at least one of the original packet or the duplicate packet is received by the receiving device (e.g., UE 210) may be increased.

The transmitting device may determine an activation of packet duplication and create the duplicate packets at the PDCP entity of the transmitting device. In some cases, packet duplication may refer to implementation of a packet duplication mode. In other cases, packet duplication may refer to the duplication of packets as part of a packet duplication mode. The determination may be based on indication from one or more of a RRC message, a PDCP control protocol data unit (PDU), a MAC control element (CE), or control channel signaling (e.g., physical downlink control channel (PDCCH), physical uplink control channel (PUCCH), etc.). In some cases, an RRC entity may activate packet duplication configure the PDCP for duplication. To support duplication, the transmitting device (which may be either a base station or a UE) may be configured with a plurality of RLC entities to handle the duplicates. In other instances, the transmitting device may support a default RLC entity while another RLC entity from a separate transmitting device may be used for the duplication. In some instances, the different RLC entities and/or associated structures may be referred to as "legs". In some examples, the wireless communication system 200 may support one leg in addition to a primary leg (i.e., the transmitting device may have a default RLC entity and one additional duplicate RLC entity). In other examples, the wireless communication system 200 may support multiple additional legs for duplicates. For example, the wireless communication system 200 may include two legs, three legs, four legs, five legs, six legs, etc. In some instances, a one-to-one mapping of legs to logical channels exists. In some cases, the original packet and a duplicate copy (or two duplicate packets) may not be transmitted using the same transport block. The PDCP entity in the wireless communication system 200 may support a plurality of modes of operation. Such modes of operation may work using similar principles as the various modes of RLC entities (e.g., transparent mode, acknowledged mode, or unacknowledged mode). In some cases, as part of the different modes, the transmitting device may generate different types of bearers for the RLC entities (e.g., a duplication bearer in the duplication mode). The duplication bearer may be established when communication link 215 is established and may be based in part on supported duplication for PDCP, configured by the RRC entity.

The PDCP entity may copy or duplicate an original packet for transmission over the default RLC entity to create a duplicate packet directed through duplicate RLC entities configured by the activated PDCP packet duplication. In some instances, the duplicate packet is an exact replica of the original packet. The transmitting device (e.g., base station 205 in FIG. 2) may transmit the original packet and the duplicate packet to the receiving device (e.g., UE 210 in FIG. 2) on different logical channels (i.e., the default RLC entity and a duplicate RLC entity). In this manner, the likelihood that at least one of the original packet or the duplicate packet is received by the receiving device (e.g., UE 210) is increased. The PDCP entity may implement methods for ensuring frequency diversity in transmission of the duplicate packets and therefore promote enhanced performance over communication link 215.

In some cases, RLC instances of a packet duplication context at the transmitting device (e.g., base station 205 in FIG. 2) may be reset as part of a PDCP packet duplication deactivation and/or reactivation procedure. The packet duplication deactivation and/or reactivation procedure may be implemented by an RRC entity. The packet duplication deactivation and/or reactivation procedure may be based on one or more indication parameters or properties of the RLC entities associated with the packet duplication context. For example, in some cases, the transmitting device (e.g., base station 205 in FIG. 2) may determine whether a parameter satisfies a threshold and activate and/or deactivate packet duplication at the PDCP entity. In some cases, activation/deactivation of packet duplication may be based on link parameters. In other cases activation/deactivation of packet duplication may be based on the types of data being transmitted. The transmitting device may select which link parameters to use when determining whether to activate/deactivate. In some cases, packet duplication deactivation and/or reactivation may be associated with the suspension or reestablishment of a packet duplication mode at the transmitting device. In other cases, packet duplication deactivation and/or reactivation may be associated with the suspension or initiation of duplicating packets as part of a packet duplication mode.

When the transmitting device (e.g., base station 205 in FIG. 2) determines that packet duplication should be deactivated, one or more RLC instances previously configured to support packet duplication at the PDCP entity may be reset.

Upon deactivation of the duplication of packets, the duplicate RLC entity may have to clear its buffers of packets. To do this, a discard procedure may be initiated. The discard procedure may be captured as part of special procedures implemented by the RRC entity for the duplication bearer. Throughout the discard procedure at the duplicate RLC entity, communication may be maintained at the default RLC entity. In doing so, data packet transmission may be maintained at the default RLC entity throughout deactivation of packet duplication at the duplicate RLC entity. For example, the wireless communication system 200 may support one RLC instance in addition to a primary RLC entity (i.e., the transmitting device may have a default RLC entity and one additional duplicate RLC entity) for transmitting an original data packet and a duplicate copy. Based on the initiated PDCP packet duplication deactivation by the RRC entity, the duplicate RLC entity may be reset. In resetting the RLC entity and determining deactivation of packet duplication at the PDCP entity, the transmitting device may discard data pending within the buffer of the duplicate RLC entity. The data may include both new transmission data packets and retransmission data packets previously stored within the buffer of the duplicate RLC entity for potential transmission. Data packet transmission may be maintained at the default RLC entity throughout the deactivation and buffer discard procedure of the duplicate RLC entity. Following the resetting of the RLC entity, the transmitting device may reestablish communication via the duplicate RLC entity. In some cases, reestablishment of communication at the duplicate RLC entity may correspond to an iterated initiation of PDCP packet duplication activation at the transmitting device. In other examples, the wireless communication system 200 may support multiple additional RLC entities for duplicates. Similarly, based on the initiated PDCP packet duplication deactivation by the RRC entity, the additional RLC entities may be reset.

As part of the packet duplication deactivation and RLC entity reset, the transmitting device (e.g., base station 205 in FIG. 2) may transmit one or more PDUs to the receiving device (e.g., UE 210 in FIG. 2) as an indication of RLC entity reset and/or the discarding of stored packets within the one or more corresponding RLC entities (e.g., duplicate RLC entities). The discarding of stored packets within the one or more duplicate RLC entities may correspond to secondary node (SN) holes for data communication over communication link 215. As a result, to promote efficient handling for reception at the receiving device, the one or more PDUs may be transmitted by the transmitting device. The one or more PDUs may include an RLC control PDU, an RLC data PDU with a discard flag contained within the header, or an RLC data PDU with an empty RLC payload (i.e., absent of data), or a combination.

Additionally or alternatively, the transmitting device may perform RLC reestablishment for the one or more RLC entities associated with the packet duplication deactivation. In some cases, the transmitting device may implement the reestablishment according to a timing threshold received from the network. The temporal duration of the timing interval may be configured by the network. For example, the transmitting device may implement a timing interval or delay following determination of PDCP packet duplication deactivation over the duplicate RLC entity and reception of a configured time instance provided via RRC signaling protocols. In some cases, upon determining the timer has expired, the transmitting device may perform RLC reestablishment at the RLC entities previously configured for packet duplication at the PDCP entity. In other cases, the transmitting device may receive an additional indication from the network for RLC entity reestablishment. Based on the connection reestablishment indication (e.g., timer expiration, indication reception) the transmitting device may reestablish the RLC entities of the prior packet duplication context. Reestablishment of the RLC entities of the packet duplication context may include establishing data communication at each of the corresponding RLC entities. Following communication establishment, each of the reestablished RLC entities may perform data transmission and/or reception. In some cases, reestablishment of the RLC entities may include initiation of PDCP packet duplication activation, including duplicated packet transmission over each of the RLC entities associated with the reestablishment. As such, the RLC entities may coordinate packet data transmission as part of a PDCP packet duplication procedure.

When the transmitting device (e.g., base station 205 in FIG. 2) determines reactivation of PDCP packet duplication, one or more RLC instances previously configured to support duplication at the PDCP entity may be reset. The transmitting device may determine packet duplication reactivation according to a received network indication via a RRC message, a PDCP control PDU a MAC CE, or control channel signaling (e.g., PDCCH, PUCCH, etc.). For example, the wireless communication system 200 may support one RLC instance in addition to a primary RLC entity (i.e., the transmitting device may have a default RLC entity and one additional duplicate RLC entity) for transmitting an original data packet and a duplicate copy. In response to the one or more network indications, PDCP packet duplication may be reactivated at the transmitting device by an RRC entity, and the duplicate RLC entity may be reset. In resetting the duplicate RLC entity and determining reactivation of packet duplication at the PDCP entity, the transmitting device may discard data pending within the buffer of the duplicate RLC entity at packet duplication reestablishment. The data may include both new transmission data packets and retransmission data packets previously stored within the buffer of the duplicate RLC entity for potential transmission. Throughout the discard procedure at the duplicate RLC entity, communication may be maintained at the default RLC entity. In doing so, data packet transmission may be maintained at the default RLC entity throughout deactivation of packet duplication at the duplicate RLC entity. In other examples, the wireless communication system 200 may support multiple additional RLC entities for duplicates. Similarly, based on the initiated PDCP packet duplication reactivation by the RRC entity, the additional RLC entities may be reset. In some examples, the determination by the transmitting device may be based on an indication from the PDCP entity. In other examples, the determination by the transmitting device may be based on the present status of PDCP packet duplication at the transmitting device. That is, the transmitting device may determine reactivation and resetting of RLC entities for packet duplication based on determination that PDCP packet duplication is currently activated for the PDCP entity.

As part of the packet duplication reactivation and RLC entity reset, the transmitting device (e.g., base station 205 in FIG. 2) may transmit one or more PDUs to the receiving device (e.g., UE 210 in FIG. 2) as an indication of RLC entity reset and discarding of stored packets within the one or more corresponding RLC entities. The discarding of stored packets within the one or more duplicate RLC entities may correspond to SN holes for data communication over communication link 215. As a result, to promote efficient handling for reception at the receiving device, the one or more PDUs may be transmitted by the transmitting device. The one or more PDUs may include an RLC control PDU, an RLC data PDU with a discard flag contained within the header, or an RLC data PDU with an empty RLC payload (i.e., absent of data), or a combination.

Following reactivation packet duplication at the PDCP entity of the transmitting device, the transmitting device may perform RLC reestablishment for the one or more RLC entities associated with the packet duplication reactivation procedure. The transmitting device may implement RLC reestablishment based on the determination that PDCP packet duplication is currently activated or reactivated for the PDCP entity. In other cases, the transmitting device may receive an additional indication from the network for RLC entity reestablishment. Based on the connection reestablishment indication the transmitting device may reestablish the RLC entities of the prior packet duplication context. Reestablishment of the RLC entities of the packet duplication context may include establishing data communication at each of the corresponding RLC entities. In some cases, reestablishment of the RLC entities may include initiation of PDCP packet duplication activation, including duplicated packet transmission over each of the RLC entities associated with the reestablishment. As such, the RLC entities may coordinate packet data transmission as part of a PDCP packet duplication procedure.

Figure 3A:
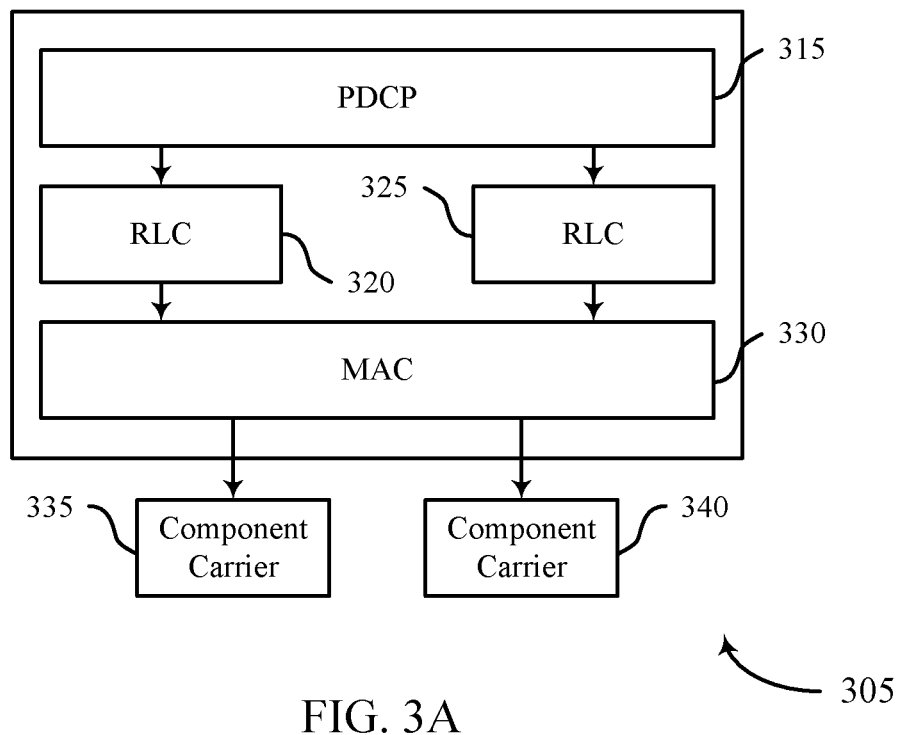
FIGS. 3A and 3B illustrate examples of protocol stacks that support packet duplication at a PDCP entity in accordance with aspects of the present disclosure.
Figure 3B:
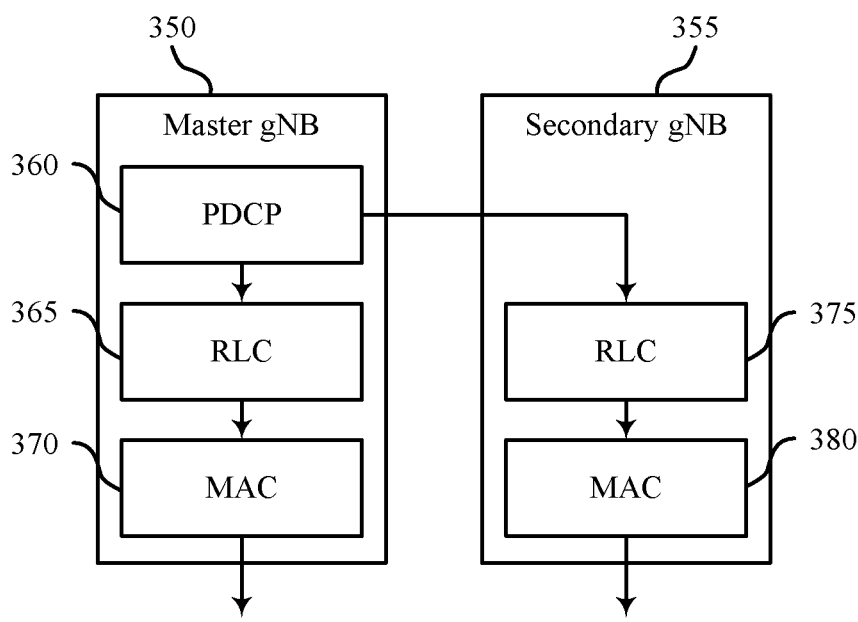

FIGS. 3A and 3B illustrate examples of protocol stacks 305, 310 that support packet duplication at a PDCP entity in accordance with various aspects of the present disclosure. In some examples, the protocol stacks 305, 310 may implement aspects of wireless communication system 100. Packet duplication may be implemented in conjunction with carrier aggregation or dual connectivity. The specific procedures of packet duplication may be different based on whether carrier aggregation or dual connectivity is being used to communicate the duplicate packets. In FIG. 3A illustrates a protocol stack 305 used for packet duplication in carrier aggregation. FIG. 3B illustrates a protocol stack 310 used for packet duplication in dual connectivity.

In carrier aggregation cases, the protocol stack 305 for duplicating packets may include a PDCP entity 315, a default RLC entity 320, a secondary RLC entity 325, a MAC entity 330, and one or more component carriers 335, 340. In some examples, the protocol stack 305 may include any number of RLC entities (e.g., two, three, four five, six). In carrier aggregation, the protocol stack 305 may include a single MAC entity that services more than one RLC entity. As such, the wireless communication system may include additional data and/or additional signaling to enable the MAC layer to handle the plurality of RLC entities 320, 325.

To ensure frequency diversity of duplicated packets, the transmitting device may transmit the duplicated packets on different component carriers. For example, the transmitting device may transmit the original packet on a first component carrier and may transmit the duplicated packet on a second component carrier different from the first component carrier. In some cases, each RLC entity (e.g., RLC entities 320 and 325) may be mapped to a different component carrier (e.g., component carriers 335 and 340) or a different set of component carriers. Such a mapping may ensure that the duplicated packets are transmitted using different radio frequency spectrum bands. In some examples, RRC signaling may be used to map RLC entities 320, 325 to their respective component carriers 335, 340. Such signaling may include data that indicates an identifier for each RLC entity and data that indicates the list of available component carriers.

In some examples of carrier aggregation, the RLC entities 320, 325 may be configured to transmit their respective packets on different transport blocks. In such examples, the link control protocol may multiplex a single packet (either an original packet or a duplicate packet) for the same resource block in a given transport block. In some cases, the link control protocol may perform these functions at the time of multiplexing and assembly.

Dual connectivity allows UEs to receive data simultaneously from different base stations (e.g., a master base station 350 and a secondary base station 355) in order to boost the performance of a communication link. In dual connectivity cases, the protocol stack 310 for duplicating packets may include at least one of a PDCP entity 360, a first RLC entity 365, or a first MAC entity 370 associated with the master base station 350, and a second RLC entity 375 and a second MAC entity 380 associated with the secondary base station 355. In dual connectivity, the PDCP entity 360 associated with the master base station 350 may receive an original packet from a higher entity or layer and may duplicate the original packet to create a duplicated packet. The PDCP entity 360 may forward the original packet to the first RLC entity 365 and the duplicated packet to the second RLC entity 375 associated with the secondary base station 355. The dual connectivity case for duplicating packets may be implemented in either an uplink context or a downlink context. As such, the entities discussed regarding dual connectivity may be part of a base station or a UE, depending on the context and the communication. In some examples, a base station may be referred to as a gNB.

Figure 4:
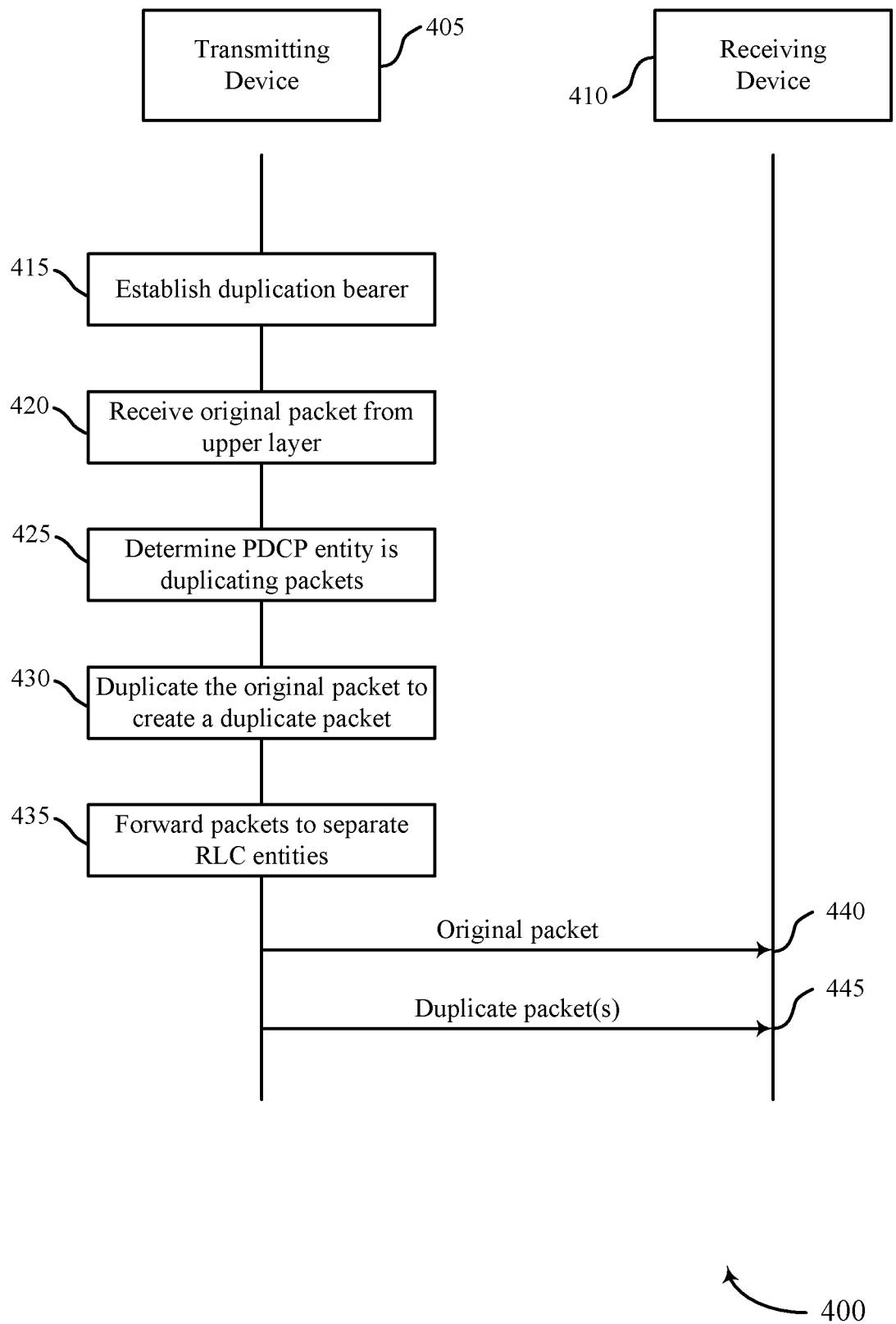
FIG. 4 illustrates an example of a communication scheme that supports packet duplication at a PDCP entity in accordance with aspects of the present disclosure.

FIG. 4 illustrates an example of a communication scheme 400 that supports packet duplication at a PDCP entity in accordance with various aspects of the present disclosure. In some examples, the communication scheme 400 may implement aspects of wireless communication system 100. The communication scheme 400 illustrates an example of packet duplication performed by a transmitting device 405. The transmitting device 405 may desire to transmit duplicate information or duplicate packets to a receiving device 410 to improve the likelihood that the receiving device 410 receives at least one packet of the set of copied packets being transmitted. The transmitting device 405 may be any entity or device in a communications network and the receiving device 410 may be any entity or device in a communications network. For example, in an uplink context, the transmitting device 405 may be a UE (e.g., UEs 115, 210) and the receiving device 410 may be a base station (e.g., base stations 105, 205). In a downlink context, the transmitting device 405 may be a base station (e.g., base stations 105, 205) and the receiving device 410 may be a UE (e.g., UEs 115, 210). In other contexts, the transmitting device 405 and the receiving device 410 may be any combination of entities or devices in the communications network.

At block 415, the transmitting device 405 may establish a duplication bearer. When establishing a duplication bearer, the transmitting device 405 may generate one or more additional RLC entities to convey duplicate packets to the receiving device 410. Such RLC entities may form a logical channels or legs through which a packet may travel. In some examples, the wireless communication system 200 may support one leg in addition to a primary leg (i.e., transmitting device 405 may have a default RLC entity and one additional duplicate RLC entity). In other examples, the wireless communication system 200 may support multiple additional legs for duplicates. Such logical channel or legs may be different from the default logical channel or leg typically used by the transmitting device 405 to communicate packets. When not transmitting duplicate packets, the PDCP entity of the transmitting device 405 may forward packets to the RLC entity. When duplicating packets, the PDCP entity of the transmitting device 405 may forward each copy of a packet to different RLC entity. To handle this kind of forwarding, the transmitting device 405 may establish the duplication bearer. When establishing the duplication bearer, the transmitting device 405 may generate any number of RLC entities. The number of RLC entities established may be based on the number of duplicate packets being generated from an original packet. The duplication bearer may be established when a communication link between the transmitting device 405 and the receiving device 410 is established. In some examples, the duplication bearer may be established when the PDCP entity of the transmitting device 405 enters a duplication mode.

At block 420, the transmitting device 405 may receive an original packet from a higher layer. In some examples, the original packet is an internet protocol (IP) packet received from an IP layer. In other examples, the original packet may be received from the RRC entity.

At block 425, the transmitting device 405 may determine whether the PDCP entity of the transmitting device 405 is actively generating and transmitting duplicate packets to the receiving device 410. The transmitting device 405 may be configured to transmit packets normally (i.e., without duplication) to the receiving device 410 under certain conditions and to transmit duplicate packets to the receiving device 410 under other conditions. That is, the transmitting device 405 may determine when packet duplication may be activated or deactivated at the PDCP entity for duplicate packet transmission over generated RLC entities.

In some cases, transmitting device 405 may reset RLC instances of the packet duplication context as part of a PDCP packet duplication activation and/or deactivation procedure. The packet duplication activation and/or deactivation procedure may be implemented by an RRC entity. The packet duplication activation and/or deactivation procedure may be based on one or more indication parameters or properties of the RLC entities associated with the packet duplication context. In addition, packet duplication activation and/or deactivation may be implemented based on a configurable context of the transmitting device 405, as established by the network. In resetting the duplicate RLC entities and determining activation and/or deactivation of packet duplication at the PDCP entity, the transmitting device 405 may discard data pending within the buffer of duplicate RLC entities. The data may include both new transmission data packets and retransmission data packets previously stored within the buffer of the duplicate RLC entities for potential transmission. In some cases, the buffers of the duplicate RLC entities may be cleared upon deactivation of packet duplication. In other cases, the buffers of the duplicate RLC entities may be cleared upon activation or reactivation of packet duplication. During the clearing of stored data in the buffer of the duplicate RLC entities, communication may be maintained at the default RLC entity. In doing so, data packet transmission may be maintained at the default RLC entity during packet duplication activation and/or deactivation.

As part of the RLC entity reset, the transmitting device 405 may transmit one or more PDUs to receiving device 410 as a signaling indication of RLC entity reset and discarding of stored packets within the one or more corresponding RLC entities. The discarding of stored packets within the one or more duplicate RLC entities may correspond to SN holes for data communication over an established communication link. As a result, to promote efficient handling for reception at the receiving device, the one or more PDUs may be transmitted by the transmitting device 405. The one or more PDUs may include an RLC control PDU, an RLC data PDU with a discard flag contained within the header, or an RLC data PDU with an empty RLC payload (i.e., absent of data), or a combination.

Selectively duplicating packets may be accomplished in a variety of ways. In some cases, the transmitting device 405 may activate or deactivate the duplication of packets based on a static configuration. In the static configuration, the network may enable and/or disable duplication of packets using RRC signaling. In static configurations, when a PDCP entity of the transmitting device 405 is in a duplication mode, the duplication of packets may be performed. In contrast, when the PDCP entity of the transmitting device 405 is not in a duplication mode, the transmitting device 405 may not duplicate packets. In the static configuration, the RRC signaling may activate or deactivate the duplication mode of the PDCP entity, which in turn determines whether packets are duplicated.

In some cases, the transmitting device 405 may activate or deactivate the duplication of packets based on a dynamic configuration. In a dynamic configuration, when the PDCP entity of the transmitting device 405 is in a duplication mode, the transmitting device 405 may selectively duplicate packets based on one or more conditions. For example, when in duplication mode, the transmitting device 405 may determine whether certain conditions exist by measuring link conditions or by examining the types of data being communicated. If the correct conditions are identified, the transmitting device 405 may activate the duplication of packets. If other conditions are identified, the transmitting device 405 may deactivate the duplication of packets. The conditions for dynamically determining whether to duplicate packets may be based on measured link conditions or the type of data being sent. In such dynamic configurations, the duplication mode may provide a framework for activating or deactivating the duplication of packets, whereas, in a static configuration, packets may always be duplicated when the transmitting is in the duplication mode. To track whether packet duplication is activated during a dynamic configuration of a duplication mode, the transmitting device 405 may maintain an activation status, sometimes referred to as a duplication status. As various activation conditions and/or deactivation conditions are met, the transmitting device may alter the activation status. In some examples, the activation status may be a single bit or a single symbol indicating whether packet duplication is active or not. In some examples, the transmitting device 405 may modify the activation status based on an activation threshold being satisfied or a deactivation threshold being satisfied.

In some examples, if link conditions drop below a threshold, the transmitting device 405 may begin duplicating packets. The transmitting device 405 may measure the pertinent link parameters locally. In some cases, the transmitting device 405 may receive data indicating the pertinent link parameters from other devices of the communication network. The link parameters that may be identified by the transmitting device 405 may be at least a packet loss rate associated with a default RLC entity, a packet loss rate associated with one or more secondary RLC entities, a data rate associated with the default RLC entity, a data rate associated with the one or more secondary RLC entities, a channel quality indicator associated with the default RLC entity, a channel quality indicator associated with the one or more secondary RLC entities, an application packet type, a transport block size associated with the default RLC entity, a transport block size associated with the one or more secondary RLC entities, or a combination.

In some examples, the transmitting device 405 may activate or deactivate the duplication of packets based on the type of traffic being communicated. Different types of traffic may require different performance by the communications network. For example, some traffic may include requirements that the traffic be received with a certain amount of time (e.g., low-latency traffic), some traffic may include requirements that the traffic be received with a certain reliability (e.g., ultra-reliable traffic), other requirements may be present, or a combination (e.g., ultra-reliable low-latency communications). In some instances, the transmitting device 405 may determine that the original packet is URLLC traffic. The transmitting device 405 may duplicate the original packet based on the original traffic being URLLC. The transmitting device 405 may duplicate the original packet to improve the likelihood that at least one of the copies of the original packet or the original packet itself are received by the receiving device 410. Thus, the likelihood that the URLLC information is received within its requirements may be higher than without duplication of the packets.

At block 430, the transmitting device 405 may duplicate the original packet to create one or more duplicate packets. The PDCP entity of the transmitting device 405 may be configured to generate a fixed number of duplicate packets (e.g., one, two three, four, five, six, etc.). The original packet and the one or more duplicate packets together may be referred to as a set of copied packets. In some examples, the number of duplicate packets created may be based on the number of RLC entities that are supported in the duplication mode. In some examples, the PDCP entity of the transmitting device 405 may support a default RLC entity and one additional RLC entity, and therefore, the set of copied packets may include two packets: the original packet and one duplicate packet.

At block 435, the transmitting device 405 may forward each packet in the set of copied packets to different RLC entities. As such, each packet in the set of copied packets may be communicated to the receiving device 410 using a different logical channel or a different leg. For example, the transmitting device 405 may forward the original packet to the default RLC entity and the duplicate packet to the additional RLC entity, or vice versa.

The transmitting device 405 may transmit both the original packet 440 and the one or more duplicate packet(s) 445 to the receiving device 410. In some examples, the transmission of the packets 440, 445 may be done using different transport blocks. In some examples, the transmission of the packets 440, 445 may be done using different radio frequency spectrum bands. The transmission of the packets 440, 445 may transmitted using carrier aggregation procedures or dual connectivity procedures. In some examples, the transmission of some of the packets 440, 445 may be delayed or canceled based on one or more procedures.

Figure 5:
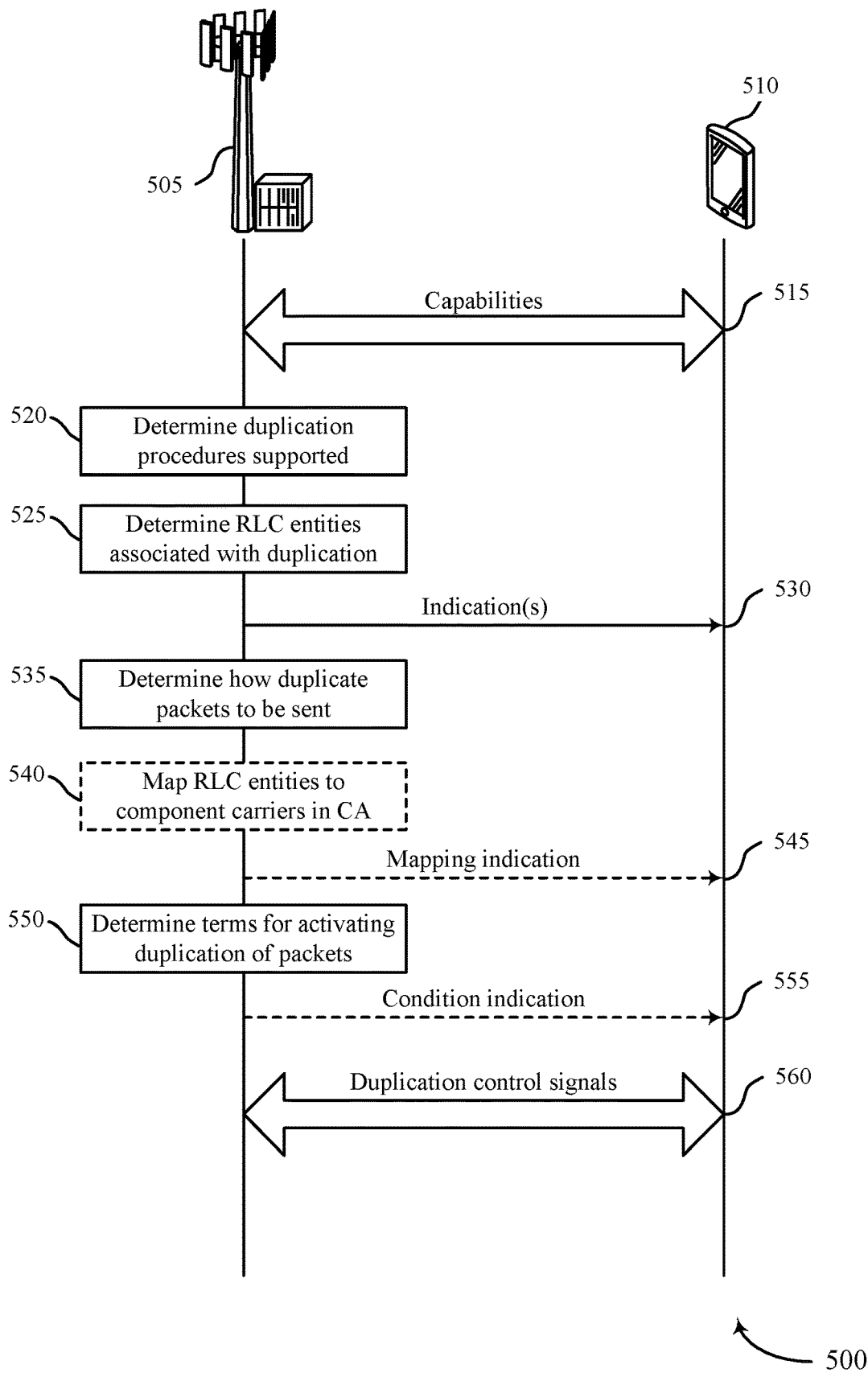
FIG. 5 illustrates an example of a communication scheme that supports packet duplication at a PDCP entity in accordance with aspects of the present disclosure.

FIG. 5 illustrates an example of a communication scheme 500 that supports packet duplication at a PDCP entity in accordance with various aspects of the present disclosure. In some examples, the communication scheme 500 may implement aspects of wireless communication system 100. The communication scheme 500 illustrates an example of establishing the duplication of packets for a communication link. Not all devices in a communications network may support the duplication of packets. Procedures for establishing the duplication of packets may account for such variances in devices and/or may be configured to establish the duplication bearer. The communication scheme 500 may be used with the communication scheme 400 described with reference to FIG. 4. The communication scheme 500 may be implemented between a base station 505 and a UE 510. The base station 505 may be an example of the base stations 105, 205 described with reference to FIGS. 1 and 2 or an example of the transmitting device 405 or receiving device 410 described with reference to FIG. 4. The UE 510 may be an example of the UEs 115, 210 described with reference to FIGS. 1 and 2 or an example of the transmitting device 405 or receiving device 410 described with reference to FIG. 4.

At block 515, the base station 505 and the UE 510 may exchange indications of the capabilities of the respective devices. For example, the base station 505 and the UE 510 may indicate whether the base station 505 and the UE 510 are capable of duplicating packets. In some examples, capabilities for duplicating packets may be indicated as a bearer type in control signaling. In some examples, capabilities for duplicating packets may be indicated as a PDCP mode in control signaling. In some examples, capabilities for duplicating packets may be indicated by RRC.

At block 520, the base station 505 may determine whether duplication procedures are supported by one or both devices that are part of the communication link. If both the base station 505 and the UE 510 are capable of sending and/or receiving duplicate packets, the base station 505 may execute certain functions. If the UE 510 is not capable of duplicating packets, the base station 505 may not perform certain functions related to allowing the UE 510 to enter a duplication mode. In the case base station 505 is not capable of duplicating packets, duplicate packets may not be sent or received in some circumstances because the duplication bearer may not be established properly. In some circumstances, duplicate packets may be transmitted to an entity or device that cannot duplicate packets. In these circumstances, the entity or device may process the received packets like normal. In some circumstances, duplicate packets may be transmitted only devices that include the ability to send and/or receive duplicate packets. Based on the determination, the base station 505 may establish a communication link that supports the duplication of packets with the UE 510.

At block 525, the base station 505 may determine RLC entities associated with the duplication of packets. As part of determining the RLC entities, the base station 505 may determine which RLC entity is the default RLC entity. When the duplication of packets is deactivated, the PDCP entity of a transmitting device may still forward packets to the default RLC entity. In effect, the default RLC entity is the RLC entity that remains active even when packets are not duplicated. The remaining RLC entities may be enabled or disabled based on whether a transmitting device is duplicating packets.

The base station 505 may transmit indication(s) 530 to the UE 510 indicating one or more various link identifiers, link parameters, RLC entity identifiers, RLC entity parameters, state variables, the default RLC entity, or a combination. In some examples, the default RLC entity or an additional RLC entity may be indicated using an RLC channel ID (e.g., in a carrier aggregation case). In some examples, the default RLC entity or an additional RLC entity may be indicated using an indication for a master cell group (MCG) or a secondary cell group (SCG) (e.g., in a dual connectivity case). In some examples, the default RLC entity or an additional RLC entity may be indicated using ul-DataSplit-DRB-ViaSCG in the dual connectivity case. In some examples, the default RLC entity or an additional RLC entity may be indicated as a link ID.

In some examples, the indication 530 may indicate a default duplication activation status. For example, the base station 505 may indicate that the UE should duplicate packets as a default status. In other examples, the base station 505 may indicate that the UE should not duplicate packets as a default status. In some instances, the indication 530 may include a single digit or a Boolean value representing whether duplication of packets should be active or inactive. The indication 530 may indicate that a PDCP entity of the UE 510 should operate in a duplication mode (e.g., a static configuration). The indication 530 may indicate that the PDCP entity of the UE 510 should operate in a duplication mode and the status of the duplication of packets (e.g., a dynamic configuration). In some instances, the information and determinations described regarding the indication 530 may also be applied to the base station 505 as well as the UE 510.

At block 535, the base station 505 may determine how duplicate packets are to be transmitted between the base station 505 and the UE 510. For example, the base station 505 may determine whether the duplicate packets are to be communicated using carrier aggregation procedures or whether the duplicate packets are to be communicated using dual connectivity, or whether the duplicate packets are to be communicated using other types of procedures. In some examples, the base station 505 may determine whether to use a static configuration of a duplication mode or a dynamic configuration of a duplication mode.

At block 540, when carrier aggregation is being used, the base station 505 may map RLC entities to component carriers in carrier aggregation. In some cases, each RLC entity may be mapped to a unique component carrier or a unique set of component carriers. In these cases, each RLC entity/component carrier pair is mutually exclusive from another RLC entity/component carrier pair. As such, when the set of copied packets are transmitted using carrier aggregation, each packet of the set of copied packets may be transmitted using different frequency resources. Such a configuration may ensure that the frequency diversity of transmitted packets.

In some examples, the base station 505 may determine whether a MAC transport block may be used to send a packet at the MAC entity. In some cases, the determination may be based on a RLC-CC mapping rule. In some cases, the determination may be based on whether the duplicate of the packet has been transmitted on the same transport block. In some cases, the determination may be based on whether data from the partner logical channel (e.g., the other RLC entity configured for the same duplication bearer) has been multiplexed in the same transport block.

The base station 505 may transmit a mapping indication 545 to the UE 510. The mapping indication 545 may indicate what component carriers (or sets of component carriers) are associated with which RLC entities. In some examples, the mapping indication 545 may be signaled in a format that includes an RLC entity ID and a component carrier group. In some examples, the component carrier group may be represented as a list. In some examples, the component carrier group may be represented as a component carrier group (CCG) ID. In some examples, the CCG ID to CC mapping may be preconfigured.

At block 550, the base station 505 may determine conditions for activating the duplication of packets. In some examples, regardless of whether a static configuration is used or a dynamic configuration is used, the base station 505 may determine when packets should be duplicated and when they should not be duplicated. When the base station 505 directs duplication (e.g., static configurations or downlink cases in dynamic configurations), the base station 505 may determine whether a parameter satisfies a threshold. The base station 505 may activate or deactivate packet duplication based on this determination. In some cases, activation or deactivation of packet duplication may be based on link parameters. In other cases activation or deactivation of packet duplication may be based on the types of data being transmitted. The base station 505 may select which link parameters to use when determining whether to activate or deactivate. The link parameters may include one or more of a packet loss rate associated with a default RLC entity, a packet loss rate associated with one or more secondary RLC entities, a data rate associated with the default RLC entity, a data rate associated with the one or more secondary RLC entities, a channel quality indicator associated with the default RLC entity, a channel quality indicator associated with the one or more secondary RLC entities, an application packet type, a transport block size associated with the default RLC entity, a transport block size associated with the one or more secondary RLC entities, or a combination.

The base station 505 may use the identified parameters and the identified thresholds to activate or deactivate a duplication mode at a PDCP entity at either the base station 505 and/or the UE 510 (e.g., a static configuration). In other examples, the base station 505 may use the identified parameter and identified thresholds to activate or deactivate packet duplication at a PDCP entity for devices (e.g., base station 505 and/or UE 510) that are already operating in a duplication mode (e.g., a dynamic configuration).

In some cases, base station 505 may reset RLC instances of the packet duplication context as part of a PDCP packet duplication activation and/or deactivation procedure. The packet duplication activation and/or deactivation procedure may be implemented by an RRC entity. The packet duplication activation and/or deactivation procedure may be based on one or more indication parameters or properties of the RLC entities associated with the packet duplication context. In addition, packet duplication activation and/or deactivation may be implemented based on a configurable context of the base station 505, as established by the network. In resetting the duplicate RLC entities and determining activation and/or deactivation of packet duplication at the PDCP entity, the base station 505 may discard data pending within the buffer of duplicate RLC entities. The data may include both new transmission data packets and retransmission data packets previously stored within the buffer of the duplicate RLC entities for potential transmission.

As part of the RLC entity reset, the base station 505 may transmit one or more PDUs to UE 510 as a signaling indication of RLC entity reset and discarding of stored packets within the one or more corresponding RLC entities. The discarding of stored packets within the one or more duplicate RLC entities may correspond to SN holes for data communication over an established communication link. As a result, to promote efficient handling for reception at the receiving device, the one or more PDUs may be transmitted by the base station 505. The one or more PDUs may be transmitted as part of condition indication 555. The one or more PDUs may include an RLC control PDU, an RLC data PDU with a discard flag contained within the header, or an RLC data PDU with an empty RLC payload (i.e., absent of data), or a combination.

Following activation/deactivation of packet duplication at the PDCP entity of the base station 505, the base station 505 may perform RLC reestablishment for the one or more RLC entities associated with the packet duplication reactivation procedure. In the case of packet duplication deactivation, the base station 505 may implement the reestablishment according to a timing threshold received from the network. The temporal duration of the timing interval may be configured by the network. For example, the base station 505 may implement a timing interval or delay following determination of PDCP packet duplication deactivation over the duplicate RLC entity and reception of a configured time instance provided via RRC signaling protocols. In some cases, upon determining the timer has expired, the base station 505 may perform RLC reestablishment at the RLC entities previously configured for packet duplication at the PDCP entity. In other cases, the base station 505 may receive an additional indication from the network for RLC entity reestablishment. Based on the connection reestablishment indication (e.g., timer expiration, indication reception) the base station 505 may reestablish the RLC entities of the prior packet duplication context. In the case of packet duplication activation, the base station 505 may implement RLC reestablishment based on the determination that PDCP packet duplication is currently activated or reactivated for the PDCP entity. In other cases, the base station 505 may receive an additional indication from the network for RLC entity reestablishment. Based on the connection reestablishment indication the base station 505 may reestablish the RLC entities of the prior packet duplication context. Reestablishment of the RLC entities of the packet duplication context may include establishing data communication at each of the corresponding RLC entities. The RLC entities of base station 505 may then perform data packet transmission and/or reception in association with the established data connection corresponding to UE 510. In some cases, reestablishment of the RLC entities may include initiation of PDCP packet duplication activation, including duplicated packet transmission over each of the RLC entities associated with the reestablishment. As such, the RLC entities of base station 505 may coordinate duplicate packet data transmission as part of a PDCP packet duplication procedure.

In some dynamic configurations, the base station 505 may transmit a condition indication 555 to the UE 510. The condition indication 555 may include an indication of the parameters to be used to activate or deactivate the duplication of packets and/or the activation thresholds and/or deactivation thresholds associated with the identified parameters. The condition indication 555 may further include one or more PDU indications of RLC entity reset and discarding of stored packets within the one or more corresponding RLC entities established for communication at base station 505. Using the information of the condition indication 555, the UE 510 can determine locally whether to activate or deactivate the duplication of packets (e.g., in a dynamic configuration). In some examples, the UE 510 may determine current duplication of packets status based on a parameter satisfying the activation or deactivation threshold received from the base station 505. In some examples, the UE 510 may determine current duplication of packets status based on the default activation status indication received during connection establishment. In some examples, the UE 510 may determine current duplication of packets status based on the current duplication of packets status indication received from the base station 505.

The base station 505 and the UE 510 may exchange duplication control signals 560 while a communication link exists between the two devices. Such duplication control signals 560 may be used to activate or deactivate duplication modes, duplication of packets, or a combination. The duplication control signals 560 may be used to maintain the duplication bearer. The duplication control signals 560 may be used to adjust the duplication bearer and/or other related features while the communication link is active.

In some examples, the base station 505 and the UE 510 may reconfigure a communication link between the two entities. In such reconfigurations, the duplication support may be reconfigured as well using some of the techniques described herein.

Figure 6A:
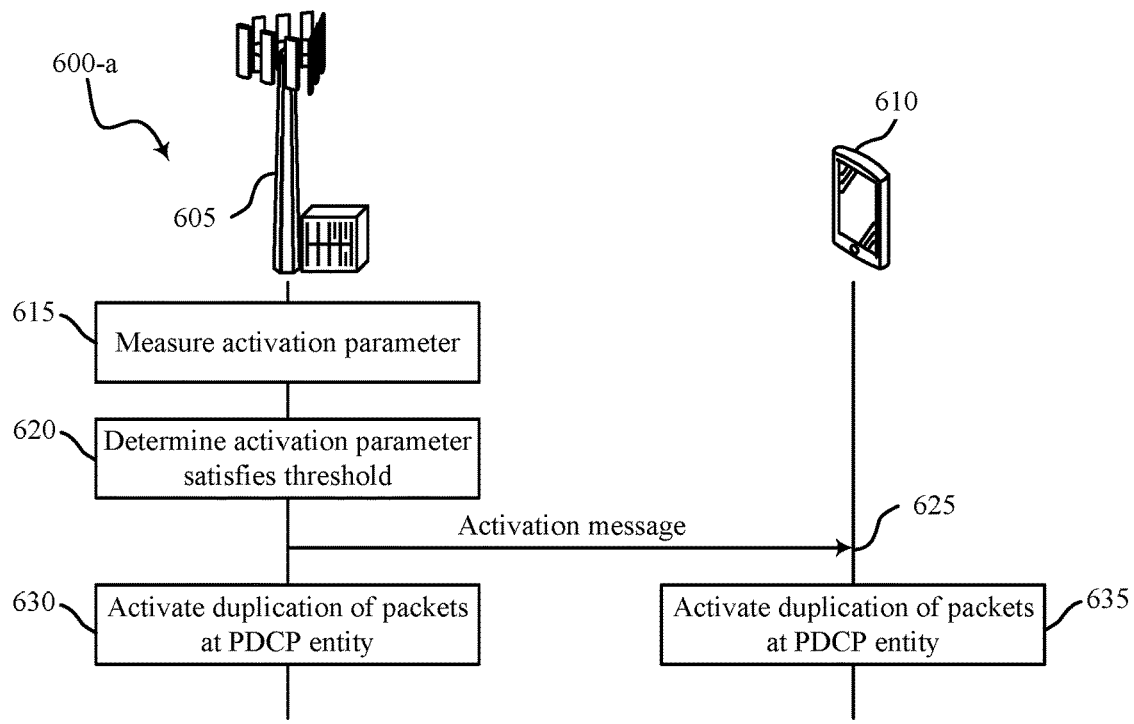
FIGS. 6A and 6B illustrate examples of communication schemes that support packet duplication at a PDCP entity in accordance with aspects of the present disclosure.
Figure 6B:
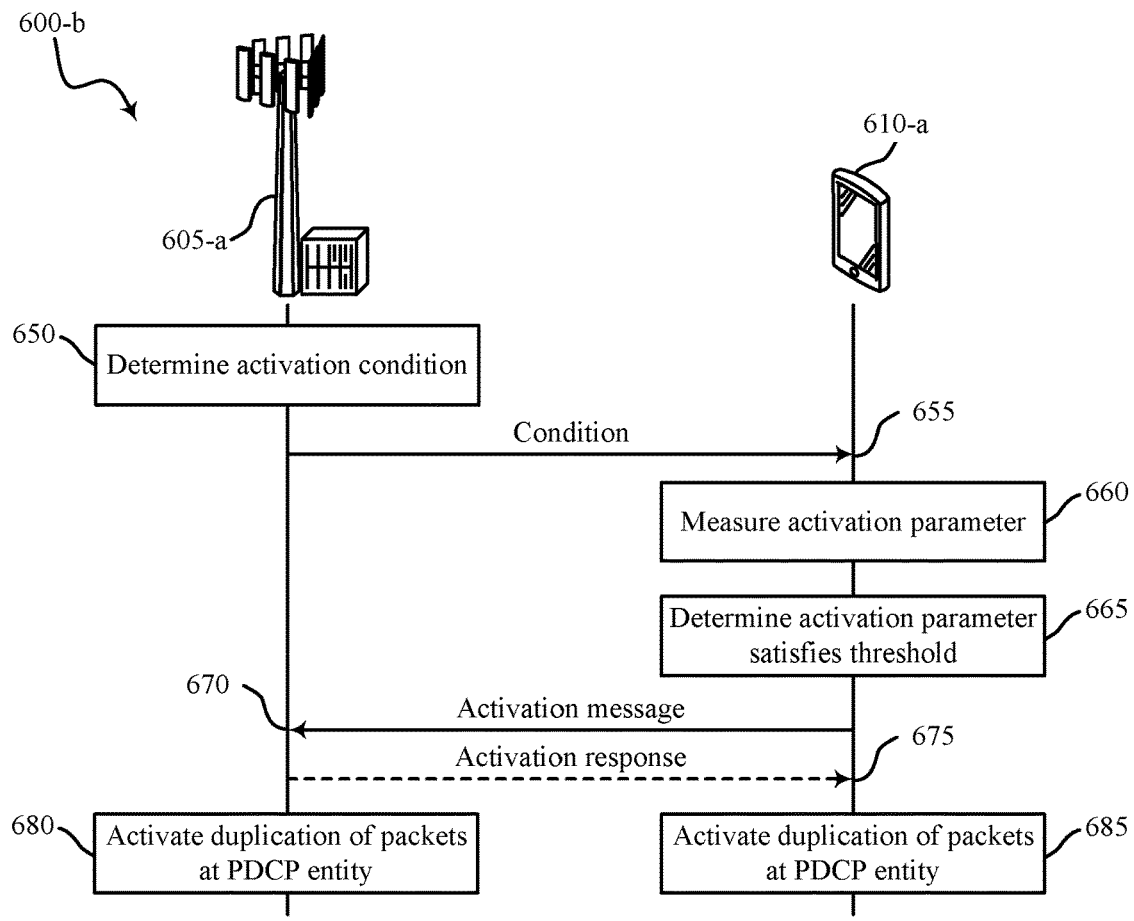

FIGS. 6A and 6B illustrate examples of communication schemes 600-a, 600-b that support packet duplication at a PDCP entity in accordance with various aspects of the present disclosure. In some examples, the communication schemes 600-a, 600-b may implement aspects of wireless communication system 100. The communication schemes 600-a, 600-b illustrate examples of activating packet duplication in a variety of circumstances. In FIG. 6A, a communication scheme 600-a illustrates procedures for when a base station 605 activates the duplication of packets. In FIG. 6B, a communication scheme 600-b illustrates procedures for when a UE 610 activates the duplication of packets. The communication schemes 600-a, 600-b may be used in any combination with communication schemes 400 and 500 described with reference to FIGS. 4 and 5. The communication schemes 600-a, 600-b may be implemented between a base station 605 and a UE 610. The base station 605 may be an example of the base stations 105, 205, 505 described with reference to FIGS. 1, 2, and 5 or an example of the transmitting device 405 or receiving device 410 described with reference to FIG. 4. The UE 610 may be an example of the UEs 115, 210, 510 described with reference to FIGS. 1, 2, and 5 or an example of the transmitting device 405 or receiving device 410 described with reference to FIG. 4.

The communication scheme 600-a illustrates a situation where the base station 605 activates or deactivates the duplication of packets. The base station 605 may initiate the duplication of packets in a variety of situations, including in a static configuration and in downlink situations of a dynamic configuration of the duplication mode. For example, in a static configuration, the base station 605 may activate or deactivate the duplication mode at the PDCP entity of either the base station 605 or the UE 610 based on the procedures described herein. In another example, in a downlink situation of a dynamic configuration, the base station 605 may activate or deactivate the duplication of packets of PDCP entities already in a duplication mode. The PDCP entities may be associated with the base station 605 or the UE 610.

At block 615, the base station 605 may measure one or more activation parameters. The activation parameter may be a link parameter or a type of the data being transmitted. In some circumstances, the base station 605 may have already determined which parameters should be measured (e.g., at block 550 described with reference to FIG. 5). In some cases, measuring the activation parameter may be determining a type of traffic that is requesting to be communicated using the communication link. In a downlink context, the base station 605 may evaluate the type of traffic waiting to be transmitted to the UE 610. In an uplink context, the base station 605 may evaluate the type of traffic based on a scheduling request or other control signaling received from the UE 610. The activation parameter may be an example of one of the parameters described with reference to FIG. 4 or 5.

At block 620, the base station 605 may determine that the activation parameter satisfies an activation threshold. For example, if a measured packet loss rate associated with the communication link exceeds the activation threshold, the base station 605 may activate the duplication of packets. The base station 605 may activate the duplication of packets to improve the likelihood (e.g., reliability) that the receiving device receives at least one packet of a set of copied packets. Such an action may improve the likelihood that the information contained in the set of copied packets is received by the receiving device. In other examples, the base station 605 may determine that different thresholds are satisfied based on different parameters. For example, the base station 605 may determine that a type of traffic should be sent using duplicate packets (e.g., URLLC traffic).

The base station 605 may transmit an activation message 625 to the UE 610 based on determining the activation parameter satisfies the threshold. In a downlink context, the activation message 625 may indicate to the UE 610 that sets of copied packets are to be transmitted. In an uplink context, the activation message 625 may indicate to the UE 610 to begin duplicating packets.

In a static configuration, the activation message 625 may indicate that a PDCP entity of the UE 610 should enter a duplication mode, and therefore begin duplicating packets. In a dynamic configuration, the activation message 625 may indicate that the PDCP entity of the UE 610 (which may already be operating in a duplication mode) should begin duplicating packets that are transmitted to the base station 605.

In some examples, the activation message 625 may be delivered by a PDCP control PDU. In some examples, the activation message 625 may be delivered by a MAC CE. In some examples, the activation message 625 may be delivered by a RRC message. In some examples, the activation message 625 may be delivered by a flag in a PDCP header. In some examples, the activation message 625 may be delivered by PDCCH.

At block 630, the base station 605 may activate the duplication of packets based on determining that the activation parameter satisfies the threshold. Activating the duplication of packets may include causing a PDCP entity of the base station 605 to enter a duplication mode or by altering a duplication status of a PDCP entity already in a duplication mode. In some examples, at block 630, the base station 605 may be configured to receive duplicated packets. In some examples, a duplication status may be referred to as an activation status.

At block 635, the UE 610 may activate the duplication of packets based on receiving the activation message 625. Activating the duplication of packets may include causing a PDCP entity of the UE 610 to enter a duplication mode or by altering a duplication status of a PDCP entity already in a duplication mode. In some examples, at block 635, the UE 610 may be configured to receive duplicated packets.

The communication scheme 600-b illustrates a situation where the UE 610-a activates or deactivates the duplication of packets. The UE 610-a may initiate the duplication of packets in a variety of situations. For example, in an uplink situation of a dynamic configuration, the UE 610-a may activate or deactivate the duplication of packets of PDCP entities already in a duplication mode. The PDCP entities may be associated with the base station 605-a or the UE 610-a.

At block 650, the base station 605-a may determine an activation condition to be used by the UE 610-a. The activation condition may include one or more activation parameters and/or one or more activation thresholds. The functions of block 650 may be an example of the functions described in block 550 with reference to FIG. 5. In some examples, the base station 605-a may determine the activation condition when the communication link between the base station 605-a and the UE 610-a is established. In some examples, the base station 605-a may determine the activation condition when one or both of the base station 605-a and the UE 610-a enter the duplication mode.

The base station 605-a may transmit activation condition 655 to the UE 610-a. The UE 610-a may use the activation condition to determine whether UE 610-a should duplicate packets or not. In some examples, the activation condition 655 may be delivered by a PDCP control PDU. In some examples, the activation condition 655 may be delivered by a MAC CE. In some examples, the activation condition 655 may be delivered by a RRC message. In some examples, the activation condition 655 may be delivered by a flag in a PDCP header. In some examples, the activation condition 655 may be delivered by PDCCH.

At block 660, the UE 610-a may measure an activation parameter. At block 665, the UE 610-a may determine whether the activation parameter satisfies the activation threshold. Blocks 660 and 665 may be examples of blocks 615 and 620 described above, at the perspective of the UE 610-a rather than the base station 605-a. As such, a full description of these functions is not repeated. A person of ordinary skill in the art would understand various modifications to the functions of blocks 615 and 620 so they are performed by the UE 610-a.

The UE 610-a may transmit an activation message 670 to the base station 605-a based on determining the activation parameter satisfies the threshold. In an uplink context, the activation message 670 may indicate to the base station 605-a that sets of copied packets are to be transmitted. In a downlink context, the activation message 670 may indicate to the base station 605-a to begin duplicating packets. In some instances, the activation message 670 may be an example of the activation message 625.

In some examples, the activation message 670 may be delivered by a PDCP control PDU. In some examples, the activation message 670 may be delivered by a MAC CE. In some examples, the activation message 670 may be delivered by a RRC message. In some examples, the activation message 670 may be delivered by a flag in a PDCP header. In some examples, the activation message 670 may be delivered by PUCCH. The response message 675 may be communicated using one of these different methods, with modifications for downlink signaling (e.g., PDCCH instead of PUCCH).

In some instances, the base station 605-a may transmit a response message 675 based on receiving the activation message 670. The response message 675 may include an acknowledgement or a negative acknowledgement that the activation message 670 was received. In some cases, the response message 675 may indicate that the base station 605-a is activating its duplication of packet procedures (either through entering the duplication mode or changing its duplication mode status).

At block 680, the base station 605-a may activate the duplication of packets based on receiving the activation message 670. Activating the duplication of packets may include causing a PDCP entity of the base station 605-a to enter a duplication mode or by altering a duplication status of a PDCP entity already in a duplication mode. In some examples, at block 680, the base station 605-a may be configured to receive duplicated packets.

At block 685, the UE 610-a may activate the duplication of packets based on determining that the activation parameter satisfies the threshold. Activating the duplication of packets may include causing a PDCP entity of the UE 610-*a* to enter a duplication mode or by altering a duplication status of a PDCP entity already in a duplication mode. In some examples, at block 685, the UE 610-*a* may be configured to receive duplicated packets.

Figure 7A:
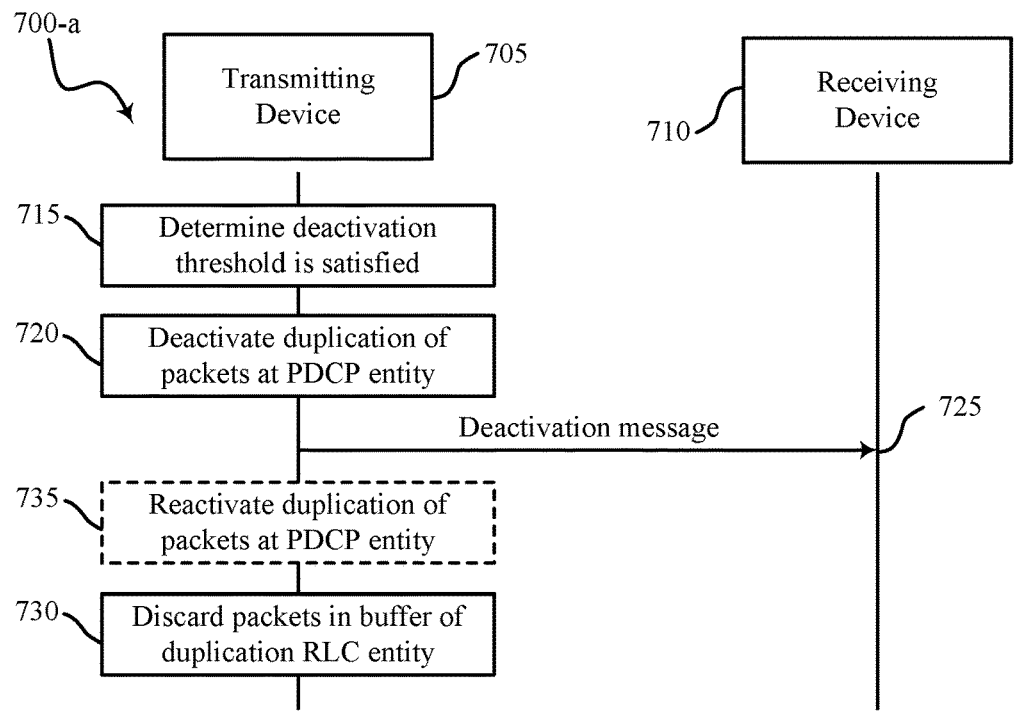
FIGS. 7A and 7B illustrate examples of communication schemes that support packet duplication at a PDCP entity in accordance with aspects of the present disclosure.
Figure 7B:
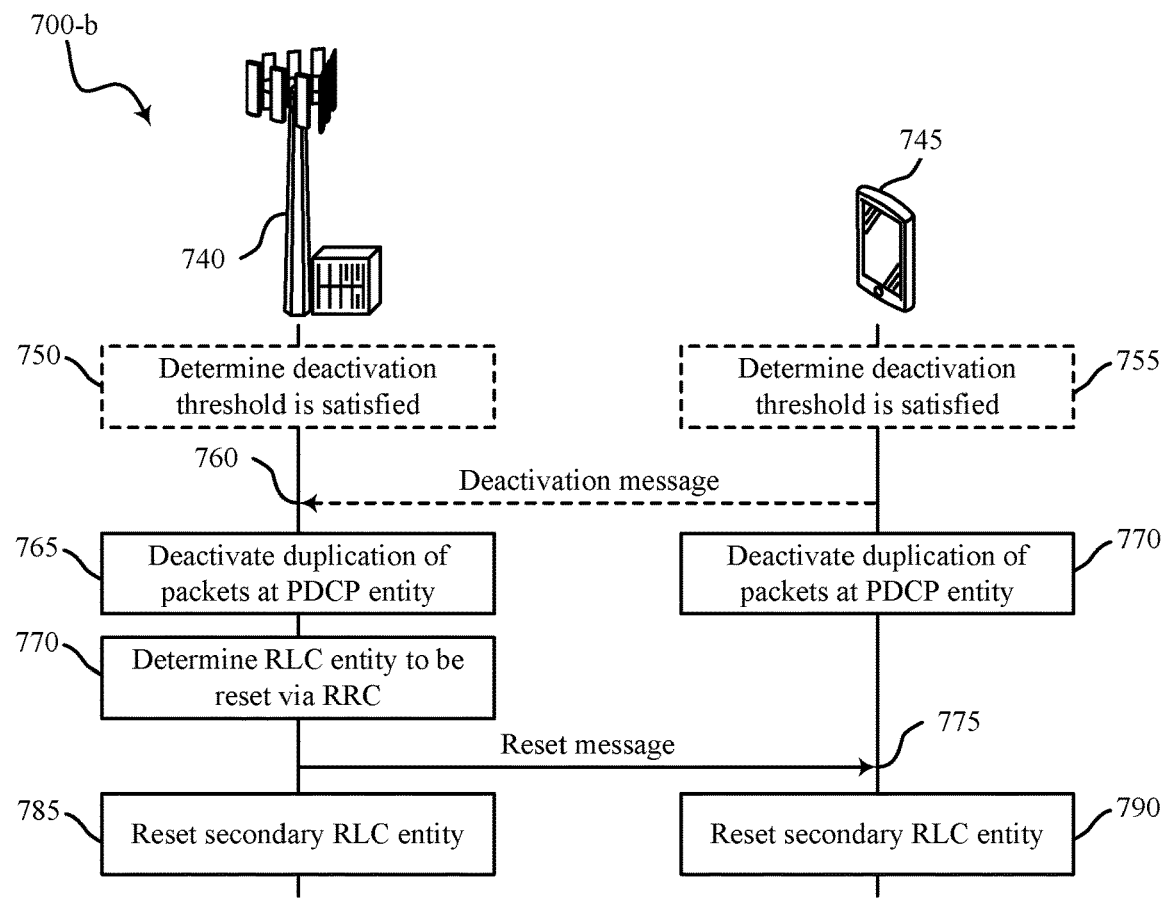

FIGS. 7A and 7B illustrate examples of communication schemes 700-*a*, 700-*b* that support packet duplication at a PDCP entity in accordance with various aspects of the present disclosure. In some examples, the communication schemes 700-*a*, 700-*b* may implement aspects of wireless communication system 100. The communication schemes 700-*a*, 700-*b* illustrate examples of deactivating packet duplication in a variety of circumstances, including how RLC entities may be handled upon ceasing to duplicate packets. In FIG. 7A, a communication scheme 700-*a* illustrates some procedures for RLC entity handling when ceasing to duplicate packets. In FIG. 7B, a communication scheme 700-*b* illustrates some additional or alternative procedures for RLC entity handling when ceasing to duplicate packets. The communication schemes 700-*a*, 700-*b* may be used in any combination with communication scheme 400, 500, and 600 described with reference to FIGS. 4, 5, and 6. The communication scheme 700-*a* may be implemented using a transmitting device 705 and a receiving device 710. The transmitting device 705 may be an example of the transmitting device 405 described with reference to FIG. 4. The receiving device 710 may be an example of the receiving device 410 described with reference to FIG. 4. The communication scheme 700-*b* may be implemented using a base station 740 and a UE 745. The base station 740 may be an example of the base stations 105, 205, 505, 605 described with reference to FIGS. 1, 2, 5, and 6 or an example of the transmitting devices 405, 705 or receiving devices 410, 710 described with reference to FIGS. 4 and 7. The UE 745 may be an example of the UEs 115, 210, 510, 610 described with reference to FIGS. 1, 2, 5, and 6 or an example of the transmitting device 405, 705 or receiving device 410, 710 described with reference to FIGS. 4 and 7.

When packet duplication is deactivated, a secondary RLC entity may already have some packets stored in its buffer. Deactivation procedures may provide ways to manage the data stored in the secondary RLC entity's buffer upon deactivation.

In some examples, upon deactivation of packet duplication, the secondary RLC entity of a transmitting device 705 may continue to transmit packets until the buffer of the secondary RLC entity is empty. In such an example, transmitting device 705 may cease adding new data to the secondary RLC entity's buffer. In such examples, the transmitting device 705, clears the buffer of the secondary RLC entities through normal transmission procedures.

In other examples, upon deactivation of packet duplication, the secondary RLC entity configured to support packet duplication may be reset. In such an example, transmitting device 705 may discard data pending within the buffer of the duplicate RLC entity. The data may include both new transmission data packets and retransmission data packets previously stored within the buffer of the duplicate RLC entity for potential transmission. The discarded packets may be include packets that are pending for acknowledgement or negative acknowledgement, pending for retransmission, or pending for new transmission, or a combination. In other examples, the transmitting device 705 may clear its buffer through a variety of other procedures.

Communication scheme 700-*a* illustrates an example of clearing the buffers of secondary RLC entities using explicit commands. At block 715, the transmitting device 705 may determine that a deactivation threshold is satisfied by a deactivation parameter. In some cases, the transmitting device 705 may measure the deactivation parameter. In other cases, the transmitting device 705 may receive an indication of the deactivation parameter from another device (e.g., the receiving device 710). In some circumstances, a base station may have already determined which deactivation parameters should be measured by the transmitting device 705 (e.g., at block 550 described with reference to FIG. 5). In some cases, measuring the activation parameter may be determining a type of traffic that is requesting to be communicated using the communication link.

Deactivation parameters may be similar to activation parameters. Deactivation parameters may include one or more of a packet loss rate associated with a default RLC entity, a packet loss rate associated with one or more secondary RLC entities, a data rate associated with the default RLC entity, a data rate associated with the one or more secondary RLC entities, a channel quality indicator associated with the default RLC entity, a channel quality indicator associated with the one or more secondary RLC entities, an application packet type, a transport block size associated with the default RLC entity, a transport block size associated with the one or more secondary RLC entities, or a combination.

At block 720, the transmitting device 705 may deactivate packet duplication based on determining that the deactivation parameter satisfies the deactivation threshold. In some cases, deactivating packet duplication may include causing the PDCP entity of the transmitting device 705 (and/or a PDCP entity of the receiving device 710) to exit a duplication mode (e.g., in a static configuration). In some cases, deactivating packet duplication may include causing the PDCP entity of the transmitting device 705 (and/or a PDCP entity of the receiving device 710) to change its duplication status (e.g., in a dynamic configuration). In such cases, the PDCP entities may be operating in a duplication mode, and the status of the duplication mode may indicate whether packets should be duplicated.

The transmitting device 705 may transmit a deactivation message 725 to the receiving device 710 based on determining that the deactivation parameter satisfies the threshold. In some examples, the deactivation message 725 may indicate to the receiving device 710 that sets of copied packets are ceasing to be transmitted. In some examples, the deactivation message 725 may indicate to the receiving device 710 to cease duplicating packets or cease sending duplicating packets.

In a static configuration, the deactivation message 725 may indicate that a PDCP entity of the receiving device should exit a duplication mode, and therefore cease duplicating packets. In a dynamic configuration, the deactivation message 725 may indicate that the PDCP entity of the receiving device 710 should cease duplicating packets.

In some examples, the deactivation message 725 may include an indication of a current left edge of the secondary RLC entities to the receiving device 710. In some examples, the receiving device 710 may move the current left edge of the secondary RLC entities based on the indication.

In some examples, the deactivation message 725 may be delivered by a PDCP control PDU. In some examples, the deactivation message 725 may be delivered by a MAC CE. In some examples, the deactivation message 725 may be delivered by a RRC message. In some examples, the deactivation message 725 may be delivered by a flag in a PDCP header. In some examples, the deactivation message 725 may be delivered by PDCCH or PUCCH.

At block 730, the transmitting device 705 may discard packets stored in buffers of secondary RLC entities based on deactivating the duplication of packets. The discarded packets may include new transmission and/or retransmission data stored in the buffers. The discarded packets may be include packets that are pending for acknowledgement or negative acknowledgement, pending for retransmission, or pending for new transmission, or a combination. In some examples, a PDCP entity of the transmitting device 705 may indicate to the secondary RLC entities to discard all packets in the buffer of the secondary RLC entity. In some examples, an indication may cause the secondary RLC entity to discard some of the packets in its buffer and to transmit other packets in its buffer.

In some cases, at block 735, the transmitting device 705 may refrain from discarding the packets in the buffers of the secondary RLC entities until after duplication of packets has been reactivated. In such cases, the buffers of the secondary RLC entities may be reset before assigning sequence numbers for a new instance of packet duplication (as part of reactivation of the duplication of packets). In these situations, while the duplication of packets is disabled, the buffers may continue to store data without transmitting the data, in some cases.

In other cases, at block 735, the transmitting device 705 may discard the packets in the buffers of the secondary RLC entities directly following the determination of packet duplication deactivation. In such cases, the buffers of the secondary RLC entities may be reset without packet duplication reactivation. The discard procedure may be captured as part of special procedures implemented by the RRC entity for the duplication bearer.

In some cases, the receiving device 710 may also discard packets in the buffers of its secondary RLC entities. Such actions, may be based at least in part on receiving the deactivation message 725.

In some examples, signaling indication of the discarding of new transmission and/or retransmission data within the buffer of duplicate RLC entities may be delivered via a PDU. Transmitting device 705 may signal the PDU indication within deactivation message 725 or within a separate message. within deactivation message 725. The PDU may include an RLC control PDU, an RLC data PDU with a discard flag contained within the header, or an RLC data PDU with an empty RLC payload (i.e., absent of data), or a combination.

Additionally or alternatively, in some cases, transmitting device 705 may perform RLC reestablishment for the one or more RLC entities associated with the packet duplication deactivation. In some cases, transmitting device 705 may implement the reestablishment according to a timing threshold received from the network. The temporal duration of the timing interval may be configured by the network. For example, transmitting device 705 may implement a timing interval or delay following determination of PDCP packet duplication deactivation over the duplicate RLC entity and reception of a configured time instance provided via RRC signaling protocols. In some cases, upon determining the timer has expired, transmitting device 705 may perform RLC reestablishment at the RLC entities previously configured for packet duplication at the PDCP entity. In other cases, transmitting device 705 may receive an additional indication from the network for RLC entity reestablishment. Based on the connection reestablishment indication (e.g., timer expiration, indication reception) transmitting device 705 may reestablish the RLC entities of the prior packet duplication context. Reestablishment of the RLC entities of the packet duplication context may include establishing data communication at each of the corresponding RLC entities. The RLC entities of transmitting device 705 may then perform data packet transmission and/or reception in association with the established data connection corresponding to receiving device 710. In some cases, reestablishment of the RLC entities may include initiation of PDCP packet duplication activation, including duplicated packet transmission over each of the RLC entities associated with the reestablishment. As such, the RLC entities of transmitting device 705 may coordinate duplicate packet data transmission as part of a PDCP packet duplication procedure.

Communication scheme 700-b illustrates an example of clearing the buffers of secondary RLC entities using RLC reset procedures. In the communication scheme 700-b, deactivating of the duplication of packets is done in the RRC. In some cases, a RRC entity of the transmitting device 705 may determine that packet duplication should be deactivated. The determination of the RRC entity may be based on an indication of the PDCP entity, in some cases. In other cases, the determination of the RRC entity may be based on an indication included in an RRC message, a PDCP control PDU, a MAC CE, or PDCCH. The transmitting device 705 may use RLC reset procedures to clear the buffers of the secondary RLC entities upon deactivating packet duplication.

In a downlink context, at block 750, the base station 740 may determine that a deactivation threshold is satisfied by a deactivation parameter. The functions of block 750 may be examples of the functions described in block 715. At block 765, the base station 740 may deactivate duplication packets at the PDCP entity. The functions of block 765 may be examples of the functions described in block 720.

In an uplink context, at block 755, the UE 745 may determine that a deactivation threshold is satisfied by a deactivation parameter. The functions of block 755 may be examples of the functions described in block 715. The UE 745 may transmit a deactivation message 760 to the base station 740 based on determining the deactivation threshold is satisfied. The deactivation message 760 may be an example of the deactivation message 725 described above. At block 770, the UE 745 may deactivate duplication packets at the PDCP entity. The functions of block 770 may be examples of the functions described in block 720.

In either the downlink context the or the uplink context, at block 770, the base station 740 may determine that the secondary RLC entities should be reset via the RRC entity. The RRC entity of the base station 740 may indicate to the PDCP entity of the base station 740 which RLC entities should be reset.

At block 785, the RRC entity of the base station 740 may reset the RLC entities of the base station 740. By resetting the RLC entities, the buffers of those RLC entities may be cleared and all of the packets therein may be discarded. The discarded packets may include new transmission and/or retransmission data stored in the buffers of the RLC entities. The discarded packets may be include packets that are pending for acknowledgement or negative acknowledgement, pending for retransmission, or pending for new transmission, or a combination.

When secondary RLC entities of the UE 745 are to be reset, the base station 740 may transmit a reset message 775 to the UE 745. The reset message 775 may indicate which RLC entities of the UE 745 should be reset. In some examples, the reset message 775 may be delivered by a PDCP control PDU. In some examples, the reset message 775 may be delivered by a MAC CE. In some examples, the reset message 775 may be delivered by a RRC message. In some examples, the reset message 775 may be delivered by a flag in a PDCP header. In some examples, the reset message 775 may be delivered by PDCCH. In some examples, the PDCP entity of the UE 745 may be configured to reset the indicating RLC entities.

As part of the packet duplication deactivation and RLC entity reset, the base station 740 may transmit one or more PDUs to the receiving device as a signaling indication of RLC entity reset and discarding of stored packets within the one or more corresponding RLC entities. The one or more PDUs may include an RLC control PDU, an RLC data PDU with a discard flag contained within the header, or an RLC data PDU with an empty RLC payload (i.e., absent of data), or a combination.

In some examples, the reset procedures may not be implemented until after a new instance of packet duplication is reactivated, similar to the functions of block 735. For example, following reactivation packet duplication at the PDCP entity of the base station 740, the base station 740 may perform RLC reestablishment for the one or more RLC entities associated with the packet duplication reactivation procedure. The base station 740 may implement RLC reestablishment based on the determination that PDCP packet duplication is currently activated or reactivated for the PDCP entity. In other cases, the base station 740 may receive an additional indication from the network for RLC entity reestablishment. Based on the connection reestablishment indication the base station 740 may reestablish the RLC entities of the prior packet duplication context. Reestablishment of the RLC entities of the packet duplication context may include establishing data communication at each of the corresponding RLC entities. The RLC entities of transmitting device 705 may then perform data packet transmission and/or reception in association with the established data connection corresponding to receiving device 710. In some cases, reestablishment of the RLC entities may include initiation of PDCP packet duplication activation, including duplicated packet transmission over each of the RLC entities associated with the reestablishment. As such, the RLC entities of transmitting device 705 may coordinate duplicate packet data transmission as part of a PDCP packet duplication procedure.

In some examples, the transmitting device may refrain from resetting the RLC entities (e.g., discarding the packets in the buffers of the secondary RLC entities) until after packet duplication has been reactivated. In such cases, the secondary RLC entities may be reset before assigning sequence numbers for a new instance of packet duplication (as part of reactivation of the duplication of packets). In these situations, while packet duplication is disabled, the buffers may continue to store data without transmitting the data, in some cases.

Figure 8:
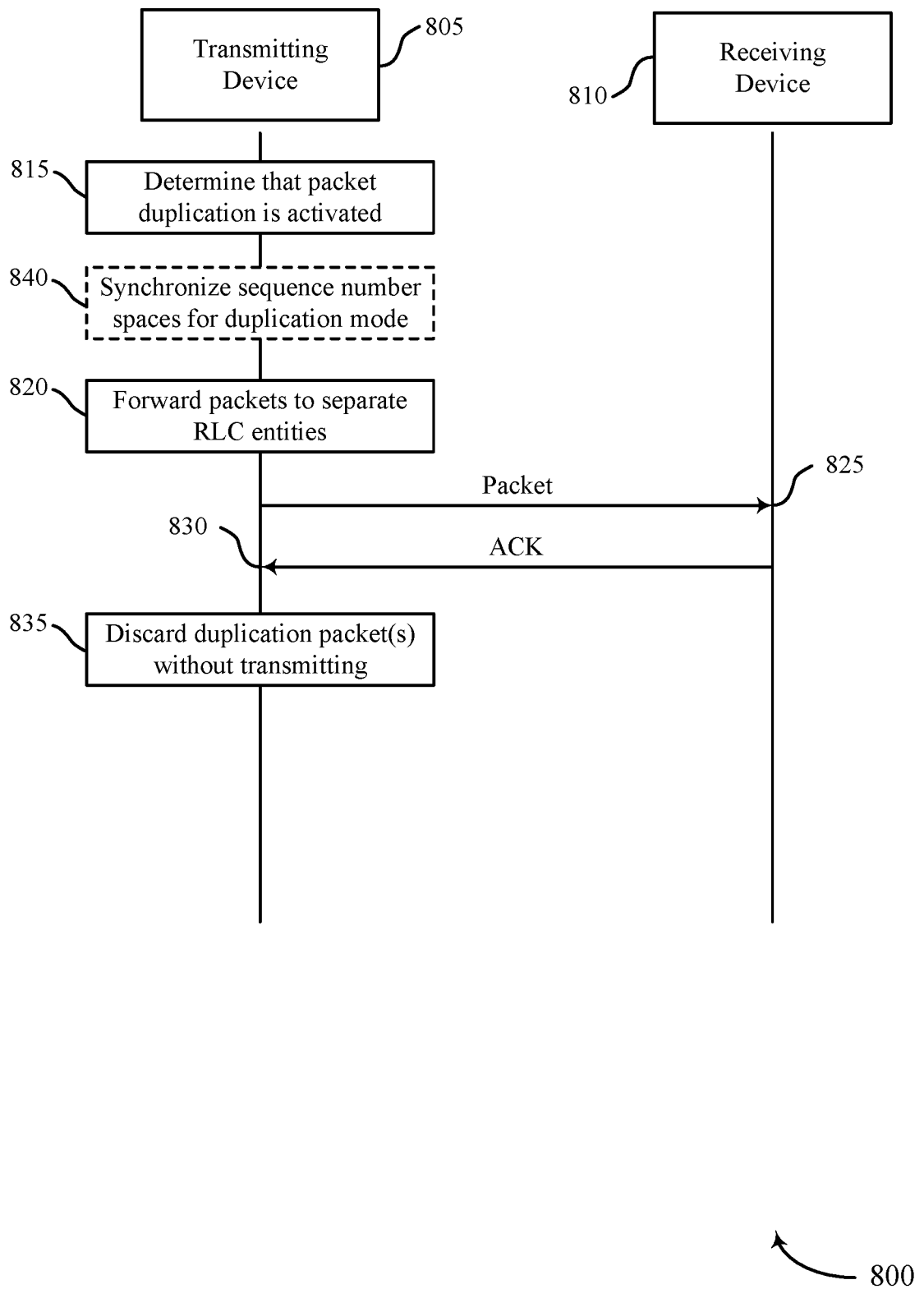
FIG. 8 illustrates an example of a communication scheme that supports packet duplication at a PDCP entity in accordance with aspects of the present disclosure.

FIG. 8 illustrates an example of a communication scheme 800 that supports packet duplication at a PDCP entity in accordance with various aspects of the present disclosure. In some examples, the communication scheme 800 may implement aspects of wireless communication system 100. The communication scheme 800 may be used in any combination with communication schemes 400, 500, 600, and 700 described with reference to FIGS. 4, 5, 6, and 7. The communication scheme 800 may be implemented using a transmitting device 805 and a receiving device 810. The transmitting device 805 may be an example of the transmitting devices 405, 705 described with reference to FIGS. 4 and 7. The receiving device 810 may be an example of the receiving devices 410, 710 described with reference to FIGS. 4 and 7.

The communication scheme 800 illustrates procedures for discarding duplicate packets based on one of the packets being successfully received. When one RLC entity successfully delivers a packet, the other packets in the set of copied packets may become redundant. Transmitting such a redundant packet may be considered a waste of communication resources because the information included in the packet has already been received. As packets are forwarded to two or more RLC entities and transmitted using different logical channels, the timing of the two "legs" may become offset. In some cases, an RLC entity may be behind (e.g. slower) another RLC entity. Such a time difference between RLC entities may mitigate some of the advantages of transmitting duplicate packets. The advantages may be mitigated because one or more of the set of copied packets may be transmitted in a time-frame more in line with other feedback procedures.

The transmitting device 805 and the receiving device 810 may use acknowledgements (ACKs) and/or negative acknowledgements (NACKs) to discard packets of the set of copied packets based on the successfully receipt of at least one of the packets of the set of copied packets. The communication scheme 800 illustrates at least two feedback procedures: a first feedback procedure that utilizes ACKs and a second feedback procedure that utilizes sequence number synchronization and ACKs.

Functions of the communication scheme 800 will first be described with reference to the first feedback procedure. At block 815, the transmitting device 805 may determine that packet duplication at the transmitting device 805 is activated. If packet duplication is activated, the transmitting device 805 may create sets of copied packets for transmission rather than just transmitting one packet. To determine whether packet duplication is activated, the transmitting device 805 may determine if its PDCP entity is operating in a duplication mode and/or identify a status of the packet duplication procedures. In some instances, the transmitting device 805 may maintain a current status of packet duplication, which may be a single bit or a collection of bits stored on the transmitting device 805. In some examples, the determination by the transmitting device 805 may be based on an indication from an RRC message, a PDCP control PDU, a MAC CE, a PDCCH, or a combination. In some examples, the determination by the transmitting device 805 may be based on an indication from its PDCP entity.

At block 820, while duplicating packets, the transmitting device 805 may forward the set of copied packets to separate RLC entities, including a default RLC entity and one or more RLC entities. Due to different latencies of the different RLC entities and their associated legs, the packets of the set of copied packets may arrive at the receiving device 810 at different times.

After forwarding packets to RLC entities, the transmitting device 805 may transmit a packet selected from the set of copied packets to the receiving device 810. The packet 825 may include identical information or data as the other packets of the set of copied packets. After receiving the packet 825, the receiving device 810 may determine whether the packet 825 was successfully decoded or successfully received. The receiving device 810 may generate and transmit an ACK 830 based on determining that the packet 825 was successfully decoded. In some cases, the receiving device 810 may generate and transmit a NACK based on determining that the packet 825 failed to be successfully decoded or received.

The ACK 830 may include an indication that packet 825 was successfully decoded or received. In some examples, the ACK 830 may be an RLC ACK. In such examples, the ACK 830 may be received by an RLC entity of the transmitting device 805. In some examples, the RLC entity of the transmitting device 805 that transmitted the packet 825 is the RLC entity that receives the ACK 830 (whether a default RLC entity or a secondary RLC entity). In some examples, the ACK 830 may be based on a PDCP sequence number. In some examples, the ACK 830 may be based on a RLC sequence number. In some examples, the ACK 830 may be received from a PDCP entity of the receiving device 810. In some examples, the ACK 830 may be received from an RLC entity of the receiving device 810.

Upon receiving the ACK 830, at block 840, the transmitting device 805 may discard the untransmitted packets of the set of copied packets based on receiving the ACK 830. To do this, the transmitting device 805 may indicate to the remaining RLC entities to clear their buffers of the remaining packets of the set of copied packets. In some examples, the RLC entity of the transmitting device 805 that receives the ACK 830 may instruct the other RLC entities of the transmitting device 805 to discard untransmitted packets related to the ACK 830.

In some cases, such a feedback procedure may cause the RLC entities of the transmitting device 805 to have holes in their transmissions packets. Such holes may complicate some feedback procedures. In some examples, to account for these holes, the transmitting device 805 may use a move receive window (MRW) solution. In some examples, the transmitting device 805 may transmit an indication to the receiving device 810 about the discarded packets.

Functions of the communication scheme 800 now will be described with reference to the second feedback procedure that involves sequence number synchronization. The functions of the second feedback procedure are similar to the functions of the first feedback procedure and include details about how the packet transmissions and the ACK transmissions are synchronized.

At block 840, the transmitting device 805 may synchronize the sequence number spaces for transmissions made during a duplication mode and/or while packets are actively being duplicated. To synchronize the sequence numbers, the transmitting device 805 may perform a number of procedures. The transmitting device 805 may determine, using its RRC entity or its PDCP entity, the current state variables of the default RLC entity. The current state variables of the default RLC entity may include a current left edge of a transmission window, a current next sequence number, a last packet submitted to a lower layer by the RLC default (e.g., MAC entity of the transmitting device 805), or a combination. In some examples, the default RLC entity may indicate its current left edge and next sequence number before packet duplication was activated.

The transmitting device 805, using an RRC entity or a PDCP entity, may receive the state variables from the default RLC entity. The transmitting device 805 may determine a beginning RLC sequence number for one or more secondary RLC entities based on the state variables of the default RLC number. The transmitting device 805 may indicate, by its RRC entity or its PDCP entity, the beginning sequence number to the one or more secondary RLC entities.

The one or more secondary RLC entities may set their state variables based on the state variables of the default RLC entity. The one or more secondary RLC entities may set their beginning sequence number based on the indication. In some cases, setting a beginning sequence number may include setting corresponding state variables of the secondary RLC entities and moving a RLC transmission window based on the state variables of the first RLC entity. In some examples, the transmitting device 805 may notify its PDCP entity of the current left edge and the next sequence number of the default RLC entity from the RRC entity of the transmitting device 805. In some examples, the transmitting device 805 may forward, from the PDCP entity to the relevant RLC entities, all packets corresponding to the current left edge and the next sequence number of the default RLC entity. In some examples, the transmitting device 805 may send, from the RLC entity, the beginning RLC sequence number to the RLC entity of the receiving device 810.

Upon receiving the ACK 830, another synchronization of state variables may be executed by the transmitting device 805. The RLC entity that is associated with the ACK 830 may indicate to other RLC entities the current left edge of the RLC entity associated with ACK 830 based on receiving the ACK 830. In some examples, the indication may be based on other RLC entities, the current left edge of other RLC entities, or other factors. In some examples, the indication may be based on forwarding a status report to other RLC entities of the transmitting device 805. The transmitting device 805 may adjust the beginning transmission window on all other RLC entities (e.g., RLC entities not directly associated with the ACK 830). In some examples, the transmitting device 805 may notify one or more corresponding RLC entities of the receiving device 810 to move a receive window.

Figure 9:
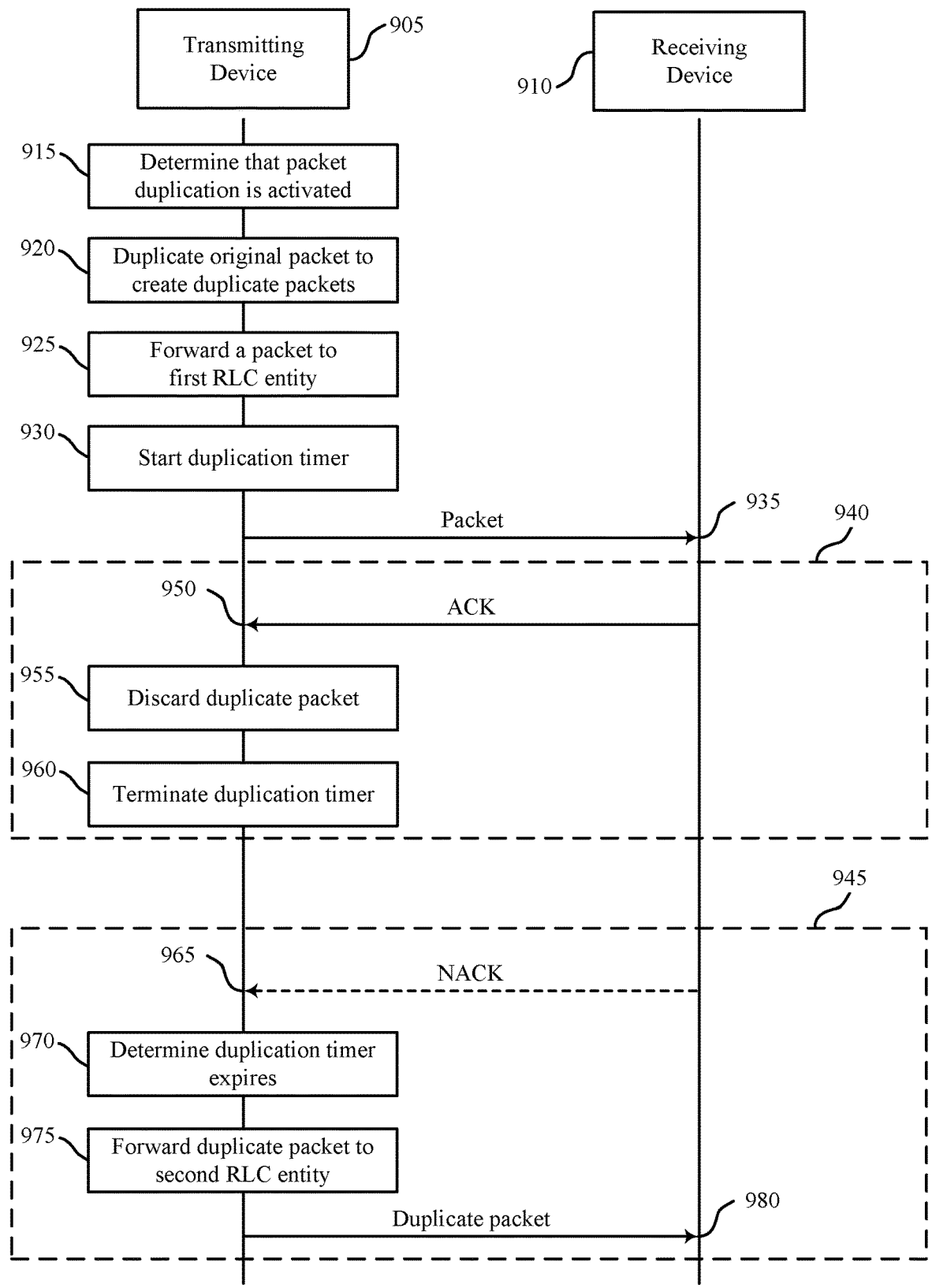
FIG. 9 illustrates an example of a communication scheme that supports packet duplication at a PDCP entity in accordance with aspects of the present disclosure.

FIG. 9 illustrates an example of a communication scheme 900 that supports packet duplication at a PDCP entity in accordance with various aspects of the present disclosure. In some examples, the communication scheme 900 may implement aspects of wireless communication system 100. The communication scheme 900 illustrates procedures for delaying a transmission of duplicate packets to reduce unnecessary use of communication resources. If one packet is successfully decoded by a receiving device 910, transmitting additional duplicates of that one packet is redundant and a waste communication resources. The communication scheme 900 may be used in any combination with communication schemes 400, 500, 600, 700, and 800 described with reference to FIGS. 4, 5, 6, 7, and 8. The communication scheme 900 may be implemented using a transmitting device 905 and a receiving device 910. The transmitting device 905 may be an example of the transmitting devices 405, 705, 805 described with reference to FIGS. 4, 7, and 8. The receiving device 910 may be an example of the receiving devices 410, 710, 810 described with reference to FIGS. 4, 7, and 8.

At block 915, the transmitting device 905 may determine that packet duplication at the transmitting device 905 is activated. If packet duplication is activated, the transmitting device 905 may create sets of copied packets for transmission rather than just transmitting one packet. To determine whether packet duplication is activated, the transmitting device 905 may determine if its PDCP entity is operating in a duplication mode and/or identify a status of the packet duplication procedures. In some instances, the transmitting device 905 maintains a current status of packet duplication, which may be a single bit or a collection of bits stored on the transmitting device 905. In some examples, the determination by the transmitting device 905 may be based on an indication from an RRC message, a PDCP control PDU, a MAC CE, a PDCCH, or a combination. In some examples, the determination by the transmitting device 905 may be based on an indication from its PDCP entity.

Upon receiving a packet from a higher layer, at block 920, the PDCP entity of transmitting device 905 may duplicate the received packet to create duplicate packets. The received packet and the duplicate packets may comprise a set of copied packets that include identical or nearly identical information. At block 925, the PDCP entity of the transmitting device 905 may forward one packet of the set of copied packets to an RLC entity. This packet 935 may be transmitted to the receiving device 910 by the RLC entity.

In some examples, multiple packets may be sent to the RLC entity for transmission. In some cases, each of the multiple packets may include different information and may not be copies of each other. A maximum amount of new packets sent to a single RLC entity may be controlled by a transmission window. The transmission window may be defined by a state variable of the RLC entity that indicates the left edge of the window and the a size of the window. In some cases, the transmission window size may be configured by a base station.

At block 930, upon forwarding the packet 935 to the receiving device 910, the transmitting device 905 may start a duplication timer. The duplication timer may be configured to indicate when another duplicate packet of the packet 935 may be transmitted to the receiving device 910. The duplication timer may indicate a time that is sufficient to transmit the packet 935 and receive and ACK 950 or NACK 965 back from the receiving device 910. A duplicate packet may be transmitted to the receiving device based on whether an ACK 950 is received, a NACK is received, or whether the timer expires without receiving an ACK. In some examples, the duplication timer may be associated with one or more packets by a state variable VD(X). In some examples, more than one duplication timer may be used at the same time. If multiple duplication timers are being used, each duplication timer of the transmitting device may be associated with a different state variable.

Box 940 illustrates procedures and/or functions that occur if the packet 935 is successfully decoded or received by the receiving device 910. Box 945 illustrates procedures and/or functions that occur if the packet 935 fails to be successfully decoded or received by the receiving device 910.

When the packet 935 is successfully decoded or received, the receiving device 910 may generate and transmit an ACK 950. The ACK 950 may indicate which packet 935 was successfully received. In some examples, the ACK 950 may indicate that multiple packets in the transmission were received from a single RLC entity of the transmitting device 905. The ACK 950 may be an example of the ACK 830 described with reference to FIG. 8. In some examples, the ACK 950 may be delivered by a PDCP control PDU. In some examples, the ACK 950 may be delivered by a MAC CE. In some examples, the ACK 950 may be delivered by a RRC message. In some examples, the ACK 950 may be delivered by a flag in a PDCP header. In some examples, the ACK 950 may be delivered by PDCCH or PUCCH.

At box 955, upon receiving the ACK 950 before the duplication timer expires, the transmitting device may discard the packets that are duplicates of the packet 935. For example, the transmitting RLC entity (of packet 935) may receive the ACK 950. The transmitting RLC entity may then inform the other RLC entities to discard their duplicate packets. In some examples, the PDCP entity or the RRC entity of the transmitting device 905 may indicate to the other RLC entities to discard their duplicate packets.

At box 960, the transmitting device 905 may terminate the duplication timer associated with the ACK 950. In some examples, this may provide another way for duplicate packets to be prevented from being transmitted because the condition for transmitting (e.g., duplication timer expires) may not occur.

In some examples, the ACK 950 may include a sequence number of a last successfully decoded packet by the receiving device 910. If the sequence number of the last successfully delivered packet is greater than a state variable (VD(X)) associated with the transmitting device 905, the packets with sequence number less than the state variable may be discarded by the transmitting device 905. The PDCP entity of the transmitting device 905 may update another state variable (VD(A)) to the next sequence number after the first state variable (VD(X)).

In some examples, the ACK 950 may include sequence numbers for each successfully decoded packet by the receiving device 910. The PDCP entity of the transmitting device 905 may discard the duplicate packets associated with the sequence numbers indicating the ACK 950. The PDCP entity of the transmitting device 905 may update a state variable (VD(A)) to one greater than the last discarded packet's sequence number.

In some examples, the transmitting device 905 may update its state variables based on the ACK 950 (e.g., based on the sequence number(s) that have been received). Discarding duplicate packets may be based on the updated state variables. In some examples, the PDCP entity of the transmitting device 905 may update the left edge of the first RLC entity.

When the packet 935 fails to be successfully decoded or received, the receiving device 910 may generate and transmit a NACK 965. In other examples, the receiving device 910 may not transmit a NACK 965. In such situations, the deactivation timer may be used by the transmitting device 905 to determine when other duplicate packets should be transmitted.

At block 970, the transmitting device 905 may determine that the duplication timer has expired. Such an expiration of the duplication timer may be because no ACK 950 was received from the receiving device 910. In some examples, the transmitting device 905 may determine whether an ACK was received or not at the time the duplication timer expires.

At block 975, the PDCP entity of the transmitting device 905 may forward a duplicate packet to a second RLC entity different from a first RLC entity based on the duplication timer expiring and an ACK 950 not being received. The second RLC entity of the transmitting device 905 may then transmit the duplicate packet 980 to the receiving device 910. In some examples, all of the duplicate packets associated with the packet 935 are transmitted upon the duplication timer expiring. In some examples, the duplicate packets 980 may be packets with sequence numbers less than one or more state variables of the transmitting device 905 and associated with the expired duplication timer. In some examples, the duplicate packets 980 may be packets associated with the expired duplication timer.

Figure 10A:
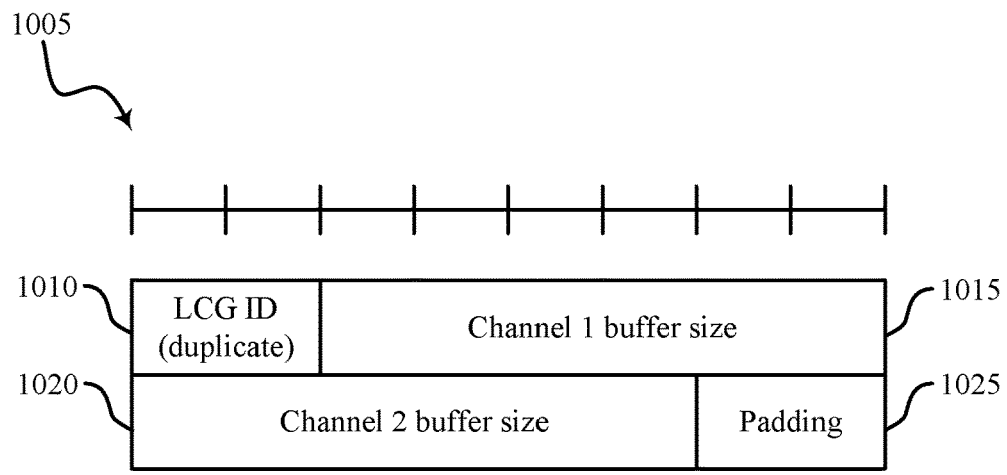
FIGS. 10A and 10B illustrate examples of message structures that support packet duplication at a PDCP entity in accordance with aspects of the present disclosure.
Figure 10B:
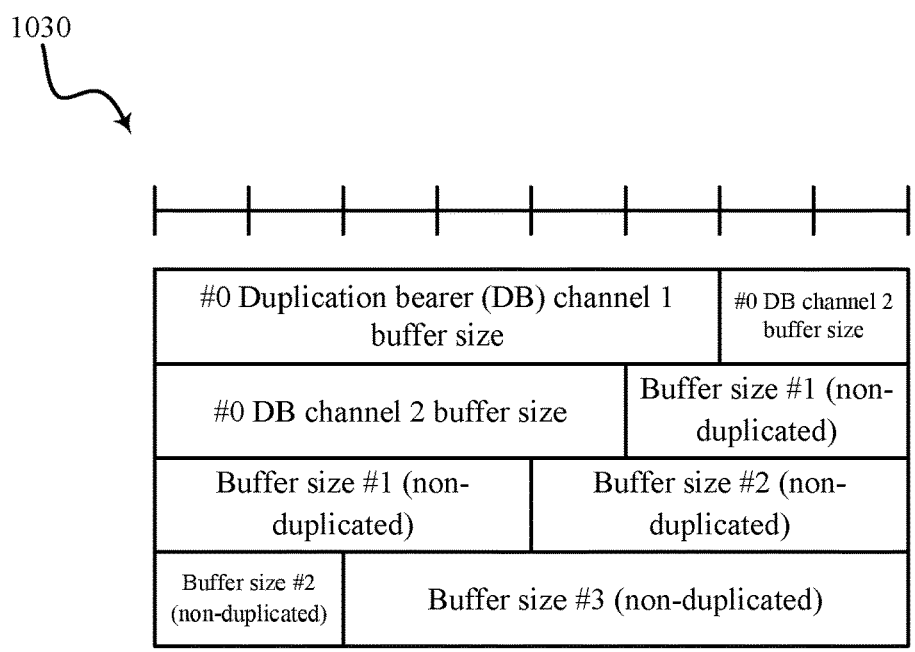

FIGS. 10A and 10B illustrate examples of message structures 1005, 1030 that support packet duplication at a PDCP entity in accordance with various aspects of the present disclosure. In some examples, the message structures 1005, 1030 may implement aspects of wireless communication system 100. The message structures 1005, 1030 relate to BSRs for devices that support duplication mode. When duplicate packets are transmitted using carrier aggregation, one PDCP entity of a transmitting device may be associated with multiple RLC entities. As such, typical BSR reporting may not provide suitable accuracy for base station scheduling. Some BSR reporting may be based on a one-to-one mapping of PDCP entities to RLC entities. In such BSR reporting, a logical channel (RLC entity) may represent one data radio bearer (e.g., PDCP entity) of a transmitting device. In some typical BSR reports, the amount PDCP data not yet forwarded to an RLC entity by a PDCP entity may be reported and/or the amount of RLC data pending for transmission or retransmission may be reported.

A duplication BSR may be transmitted by a transmitting device based on a packet duplication activation status. In some examples, the duplication BSR may indicate a bearer type (e.g., duplication bearer or not). In some examples, the duplication BSR may indicate a BSR type (e.g., duplication BSR or not). In some examples, a MAC entity of the transmitting device may compute the BSR associated with a duplication bearer.

In some examples, a transmitting device may generate and transmit a duplication BSR per resource block (e.g., per PDCP entity). In such examples, the duplication BSR may include PDCP data yet to be forwarded to RLC entities and some data indicator based on the data at each RLC entity that pending transmission or retransmission. The data indicator related to the RLC entities may be a maximum amount of data, a minimum amount of data, or an average amount of data.

In some cases, the duplication BSR may include a maximum amount of data waiting to be transmitted by one or more RLC entities. In some cases, the transmitting device may determine the maximum amount of data by adding the pending data from the different RLC entities together. In other cases, the transmitting device may determine a maximum amount of data by identifying the RLC entity that has the greatest amount of pending data and reporting that amount of pending data (for the identified RLC entity) in the duplication BSR report.

In some cases, the duplication BSR may include a minimum amount of data waiting to be transmitted by one or more RLC entities. In some cases, the transmitting device may determine a minimum amount of data by identifying the RLC entity that has the least amount of pending data and reporting that amount of pending data (for the identified RLC entity) in the duplication BSR report.

In some cases, the duplication BSR may include an average of the amount of data waiting to be transmitted by the one or more RLC entities. In some cases, the transmitting device may add the amount of pending data for each RLC entity together and divide that sum by the number of RLC entities. Such a calculation may arrive at an average of pending data for the RLC entities associated with the PDCP entity. Other averaging algorithms are also included within the scope of this disclosure. For example, the average amount of pending data for RLC entities may be abed on a mean algorithm, a median algorithm, a mode algorithm, or a combination.

In some examples, a transmitting device may generate and transmit a duplication BSR that indicates the amount of pending data for each RLC entity associated with the PDCP entity. Such a duplication BSR may be more accurate than a duplication BSR that reports an approximation (e.g., max, min, or average) of pending data at the RLC entities. Such a duplication BSR may include pending data of the PDCP entity and pending data for each RLC entity that corresponds to the PDCP entity.

Examples of duplication BSRs that indicate the amount of pending data for each RLC entity associated with the PDCP entity are illustrated in FIGS. 10A and 10B. The message structure 1005 may include a short duplication BSR that includes a LCG ID 1010, a RLC channel 1 buffer size 1015, a RLC channel 2 buffer size 1020, and padding 1025. The message structures 1030 may include a long duplication BSR that may include an organized set of buffer sizes. In some examples, the buffer sizes in the long duplication BSR (of message structure 1030) may be in an order of a radio bearer ID. The buffer sizes of the long duplication BSR (of message structure 1030) may begin with buffer sizes of buffers that do not support duplication and buffer sizes of each RLC entity for bearers that support duplication following.

Figure 11:
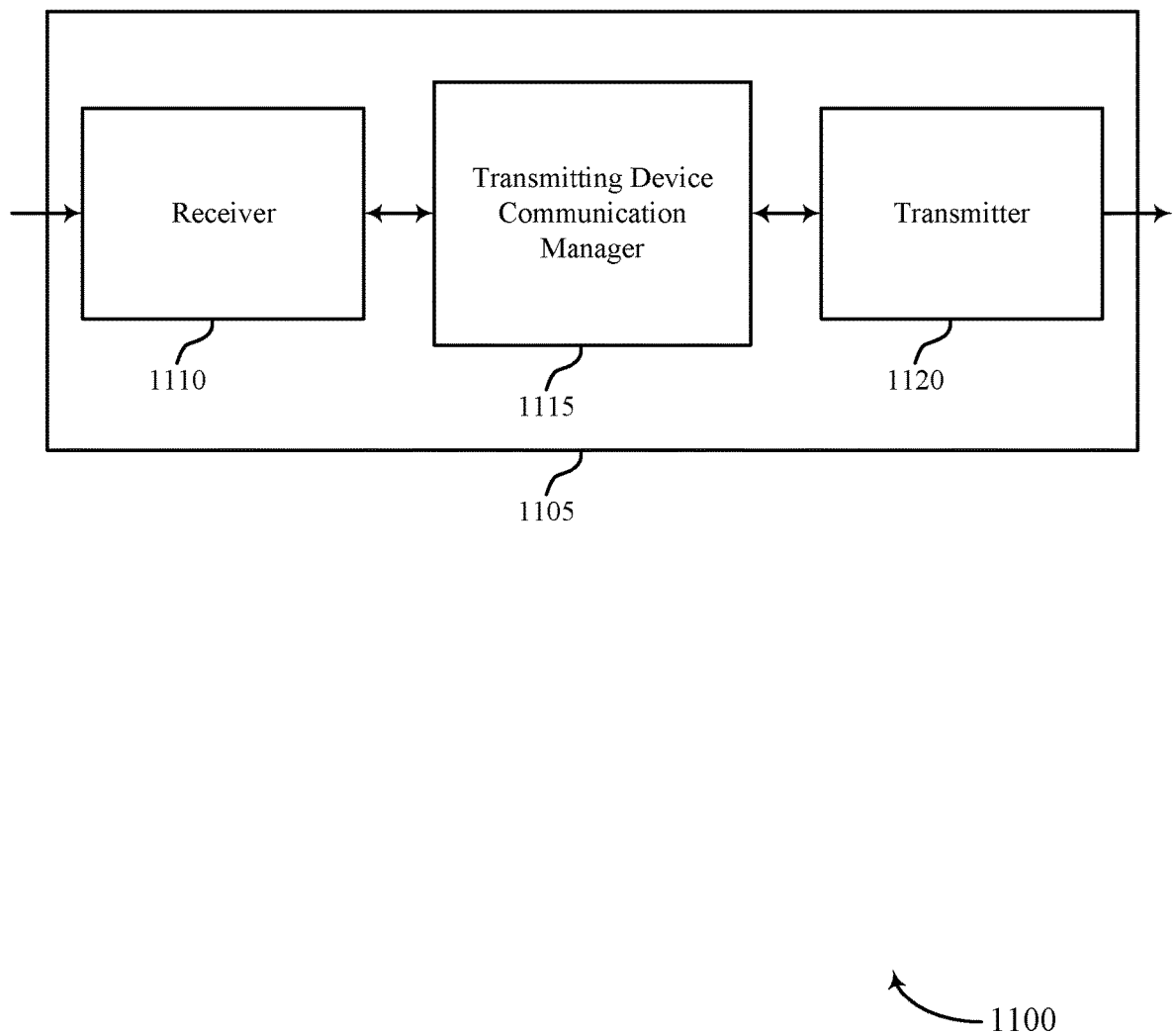
FIGS. 11 through 13 illustrate block diagrams of a device that supports packet duplication at a PDCP entity in accordance with aspects of the present disclosure.

FIG. 11 shows a block diagram 1100 of a wireless device 1105 that supports packet duplication at a PDCP entity in accordance with aspects of the present disclosure. Wireless device 1105 may be an example of a transmitting entity. As such, the wireless device 1105 may be an example of aspects of transmitting device such as the UE 115 or the base station 105 as described herein. Wireless device 1105 may include receiver 1110, transmitting device communication manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to packet duplication at a PDCP entity, etc.). Information may be passed on to other components of the device. The receiver 1110 may be an example of aspects of the transceiver 1435 described with reference to FIG. 14. The receiver 1110 may utilize a single antenna or a set of antennas.

Transmitting device communication manager 1115 may be an example of aspects of the UE communication manager 1415 and/or the base station communication manager 1515 described with reference to FIGS. 14 and 15. Transmitting device communication manager 1115 and/or at least some of its various sub-components may be implemented in hardware, software executed by a processor, firmware, or any combination. If implemented in software executed by a processor, the functions of the transmitting device communication manager 1115 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination designed to perform the functions described in the present disclosure. The transmitting device communication manager 1115 and/or at least some of its various sub-components may be physically located at various positions, including being distributed such that portions of functions are implemented at different physical locations by one or more physical devices. In some examples, transmitting device communication manager 1115 and/or at least some of its various sub-components may be a separate and distinct component in accordance with various aspects of the present disclosure. In other examples, transmitting device communication manager 1115 and/or at least some of its various sub-components may be combined with one or more other hardware components, including but not limited to an I/O component, a transceiver, a network server, another computing device, one or more other components described in the present disclosure, or a combination in accordance with various aspects of the present disclosure.

Transmitting device communication manager 1115 may configure a bearer to support duplication of packets for a PDCP entity of a transmitting device, determine, based at least in part on an activation status, that the bearer supports duplication of packets, and duplicate a first PDCP packet to create a second PDCP packet that is a copy of the first PDCP packet based on the PDCP entity operating in a duplication mode.

Transmitting device communication manager 1115 may duplicate, at a transmitting device, a first PDCP packet to create a second PDCP packet that is a copy of the first PDCP packet based on the PDCP entity operating in a duplication mode for duplication of packets, forward the first PDCP packet to a first RLC entity and the second PDCP packet to a second RLC entity, deactivate the duplication of packets using the second RLC entity, and discard packets stored in a buffer of the second RLC entity based on deactivating the duplication of packets using the second RLC entity.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas. Transmitter 1120 may forward the first PDCP packet to a first RLC entity and the second PDCP packet to a second RLC entity.

Figure 12:
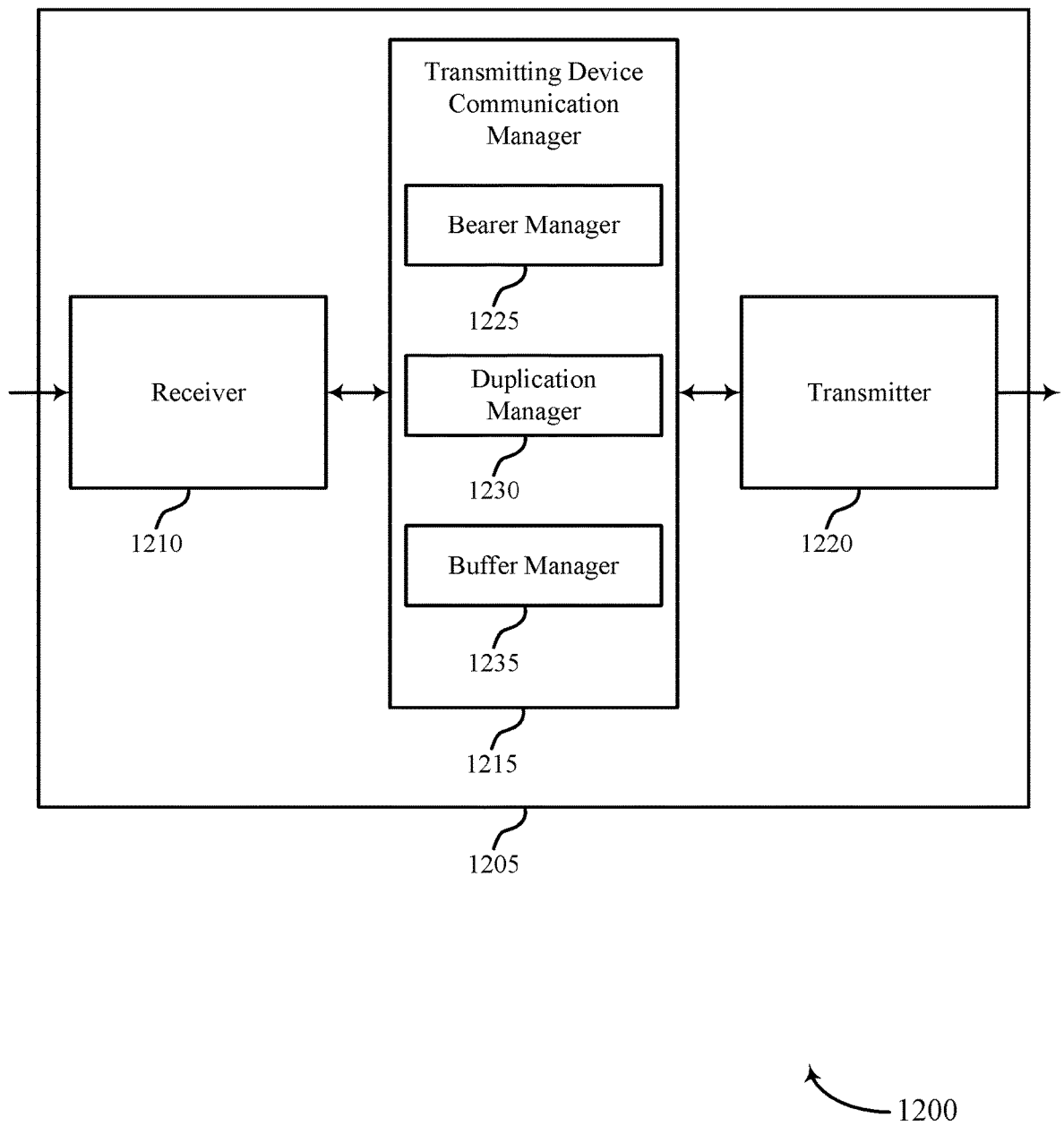

FIG. 12 shows a block diagram 1200 of a wireless device 1205 that supports packet duplication at a PDCP entity in accordance with aspects of the present disclosure. Wireless device 1205 may be an example of aspects of a wireless device 1105 or transmitting device such as the UE 115 or the base station 105 as described with reference to FIG. 11. Wireless device 1205 may include receiver 1210, transmitting device communication manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to packet duplication at a PDCP entity, etc.). Information may be passed on to other components of the device. The receiver 1210 may be an example of aspects of the transceiver 1435 described with reference to FIG. 14. The receiver 1210 may utilize a single antenna or a set of antennas.

Transmitting device communication manager 1215 may be an example of aspects of the UE communication manager 1415 and/or the base station communication manager 1515 described with reference to FIGS. 14 and 15. Transmitting device communication manager 1215 may also include bearer manager 1225, duplication manager 1230, and a buffer manager 1235.

Bearer manager 1225 may configure a bearer to support duplication of packets for a PDCP entity of a transmitting device and determine, based at least in part on an activation status, that the bearer supports duplication of packets. Bearer manager 1225 may forward the first PDCP packet to a first RLC entity and the second PDCP packet to a second RLC entity, deactivate the duplication of packets using the second RLC entity, configure a bearer to support the duplication of packets for a PDCP entity of the transmitting device, where duplicating the first PDCP packet is based on configuring the bearer, and determine, based at least in part on an activation status, that a bearer supports the duplication of packets, where duplicating the first PDCP packet is based on determining that the bearer supports the duplication of packets.

Duplication manager 1230 may duplicate a first PDCP packet to create a second PDCP packet that is a copy of the first PDCP packet based on the PDCP entity operating in a duplication mode, receive an indication to activate or deactivate the duplication of packets during the duplication mode, and activate the duplication of packets during the duplication mode of the PDCP entity based on the dynamic duplication parameter satisfying the activation threshold. In some cases, the duplication mode including one mode of a set of modes of operation of the PDCP entity. In some cases, the duplication mode includes a set of conditions for duplicating packets. In some cases, the duplication mode includes a set of procedures for processing data at the PDCP entity that are different from procedures specified by other modes of operation of the PDCP entity. Duplication manager 1230 may duplicate, at a transmitting device, a first PDCP packet to create a second PDCP packet that is a copy of the first PDCP packet based on the PDCP entity operating in a duplication mode for duplication of packets. In some cases, the duplication mode includes one mode of a set of modes of operation of the PDCP entity. In some cases, the duplication mode includes a set of conditions for duplicating packets.

Buffer manager 1235 may initiate a reset procedure for the second RLC entity upon deactivating the duplication of packets using the second RLC entity, where discarding the packets is based on initiating the reset procedure upon deactivating the duplication of packets, initiate a reset procedure for the second RLC entity upon reactivating the second RLC entity, where discarding the packets is based on initiating the reset procedure, and discard packets stored in a buffer of the second RLC entity based on deactivating the duplication of packets using the second RLC entity. In some cases, the packets are pending for acknowledgement or negative acknowledgement, pending for retransmission, or pending for new transmission, or a combination.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
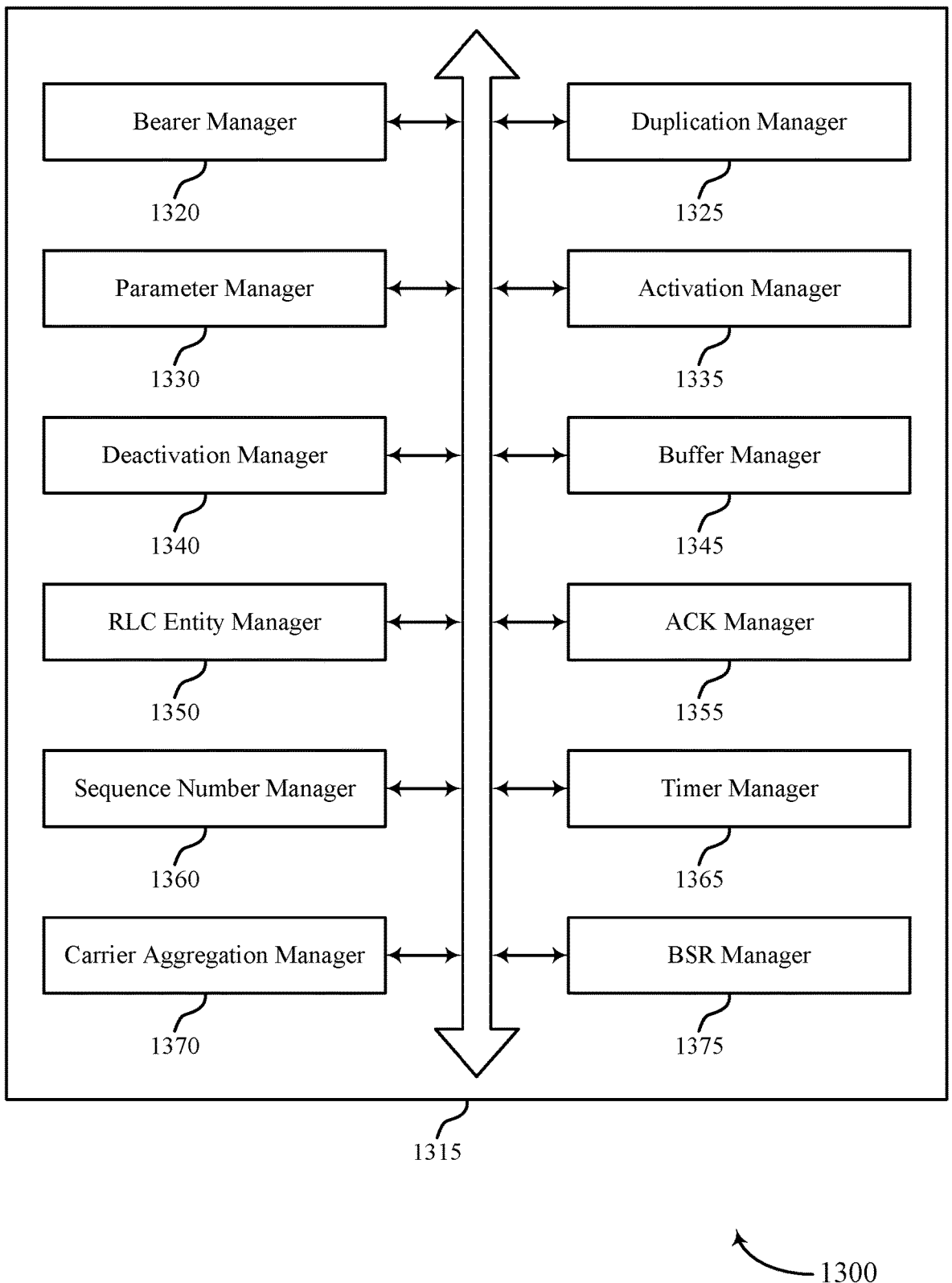

FIG. 13 shows a block diagram 1300 of a transmitting device communication manager 1315 that supports packet duplication at a PDCP entity in accordance with aspects of the present disclosure. The transmitting device communication manager 1315 may be an example of aspects of a transmitting device communication manager 1115, a transmitting device communication manager 1215, a UE communication manager 1415, or a base station communication manager 1515 described with reference to FIGS. 11, 12, 14, and 15. The transmitting device communication manager 1315 may include bearer manager 1320, duplication manager 1325, parameter manager 1330, activation manager 1335, deactivation manager 1340, buffer manager 1345, RLC entity manager 1350, acknowledgement (ACK) manager 1355, sequence number manager 1360, timer manager 1365, carrier aggregation manager 1370, and BSR manager 1375. Each of these modules may communicate, directly or indirectly, with one another (e.g., via one or more buses).

Bearer manager 1320 may configure a bearer to support duplication of packets for a PDCP entity of a transmitting device and determine, based at least in part on an activation status, that the bearer supports duplication of packets. Bearer manager 1320 may forward the first PDCP packet to a first RLC entity and the second PDCP packet to a second RLC entity, deactivate the duplication of packets using the second RLC entity, configure a bearer to support the duplication of packets for a PDCP entity of the transmitting device, where duplicating the first PDCP packet is based on configuring the bearer, and determine, based at least part on an activation status, that a bearer supports the duplication of packets, where duplicating the first PDCP packet is based on determining that the bearer supports the duplication of packets.

Duplication manager 1325 may duplicate a first PDCP packet to create a second PDCP packet that is a copy of the first PDCP packet based on the PDCP entity operating in a duplication mode, receive an indication to activate or deactivate the duplication of packets during the duplication mode, and activate the duplication of packets during the duplication mode of the PDCP entity based on the dynamic duplication parameter satisfying the activation threshold. In some cases, the duplication mode including one mode of a set of modes of operation of the PDCP entity. In some cases, the duplication mode includes a set of conditions for duplicating packets. In some cases, the duplication mode includes a set of procedures for processing data at the PDCP entity that are different from procedures specified by other modes of operation of the PDCP entity.

Duplication manager 1325 may duplicate, at a transmitting device, a first PDCP packet to create a second PDCP packet that is a copy of the first PDCP packet based on the PDCP entity operating in a duplication mode for duplication of packets. In some cases, the duplication mode includes one mode of a set of modes of operation of the PDCP entity. In some cases, the duplication mode includes a set of conditions for duplicating packets.

Parameter manager 1330 may determine that a dynamic duplication parameter satisfies an activation threshold and receive a message that indicates the dynamic duplication parameter and the activation threshold, where determining that the dynamic duplication parameter satisfies the activation threshold is based on the message. In some cases, the dynamic duplication parameter includes, a packet loss rate associated with the first RLC entity, a packet loss rate associated with the second RLC entity, a data rate associated with the first RLC entity, a data rate associated with the second RLC entity, a channel quality indicator associated with the first RLC entity, a channel quality indicator associated with the second RLC entity, an application packet type, a transport block size associated with the first RLC entity, a transport block size associated with the second RLC entity, or combinations thereof.

Activation manager 1335 may receive a control message from a base station and activate the duplication of packets during the duplication mode based on receiving the control message. Activation manager 1335 may activate or reactivating the duplication of packets using the second RLC entity during the duplication mode and receive a message that activates or reactivates the duplication of packets using the second RLC entity, where activating or reactivating the duplication of packets using the second RLC entity is based on receiving the message. In some cases, the message is a RRC message, a PDCP control PDU, a MAC CE, or a physical downlink control channel, or a combination.

Deactivation manager 1340 may deactivate the second RLC entity based on receiving a command to deactivate the duplication of packets during the duplication mode and transmit packets stored in a buffer of the second RLC entity until the buffer is empty based on deactivating the second RLC entity.

Buffer manager 1345 may discard packets stored in a buffer of the second RLC entity based on deactivating the second RLC entity, discard the packets is based on reactivating the duplication of packets during the duplication mode after the duplication of packets during the duplication mode has been deactivated, and discard the second PDCP packet without transferring the second PDCP packet to the second RLC entity based on receiving the ACK. Buffer manager 1345 may initiate a reset procedure for the second RLC entity upon deactivating the duplication of packets using the second RLC entity, where discarding the packets is based on initiating the reset procedure upon deactivating the duplication of packets, initiate a reset procedure for the second RLC entity upon reactivating the second RLC entity, where discarding the packets is based on initiating the reset procedure, and discard packets stored in a buffer of the second RLC entity based on deactivating the duplication of packets using the second RLC entity. In some cases, the packets are pending for acknowledgement or negative acknowledgement, pending for retransmission, or pending for new transmission, or a combination.

RLC entity manager 1350 may initiate a reset procedure for the second RLC entity based on deactivating the second RLC entity, where discarding the packets is based on initiating the reset procedure, select the first RLC entity or the second RLC entity as a default RLC entity, and transmit an identification of the default RLC entity to a receiving device, coordinate a transfer of the first PDCP packet to the first RLC entity and the second PDCP packet to the second RLC entity based on a status of the first RLC entity and a status of the second RLC entity, configure the status of the first RLC entity and the status of the second RLC entity based on activating packet duplication, configure the status of the first RLC entity and the status of the second RLC entity based on deactivating packet duplication, and configure the status of the first RLC entity and the status of the second RLC entity based on reactivating packet duplication. In some cases, the transmitting device is using dual connectivity and the first RLC entity is associated with a first base station and the second RLC entity is associated with a second base station different from the first base station. In some cases, the coordinating of the transfer of the first PDCP packet and the second PDCP packet is based on delaying transmission of the second PDCP packet using a timer.

RLC entity manager 1350 may perform a RLC reestablishment procedure for the second RLC entity after deactivating the duplication of packets using the second RLC entity, determine that a duration after deactivating the duplication of packets using the second RLC entity satisfies a time threshold, where performing the RLC reestablishment procedure occurs after the duration satisfies the time threshold, and receive a message from a receiving device requesting that the RLC reestablishment procedure be performed, where performing the RLC reestablishment procedure occurs after receiving the message.

ACK manager 1355 may receive an ACK indicating that the first PDCP packet was received by a receiving device via the first RLC entity, refrain from transmitting the second PDCP packet via the second RLC entity based on receiving the ACK, and receive an ACK that the first PDCP packet was received by a receiving device before the timer expires. ACK manager 1355 may transmit an indicator that the packets stored in the buffer of the second RLC entity have been discarded. In some cases, the indicator is a RLC control protocol data unit (PDU), a RLC data PDU with a discard flag, or a RLC data PDU with an empty RLC payload, or a combination.

Sequence number manager 1360 may synchronize sequence numbers of the first RLC entity and the second RLC entity, where the ACK is associated with the first PDCP packet and the second PDCP packet based on the synchronized sequence numbers, identify a current left edge and a next sequence number of the first RLC entity, determine a state variable for the second RLC entity based on the current left edge and the next sequence number of the first RLC entity, adjust a state variable of the second RLC entity based on an updated state variable of the first RLC entity, and discard packets stored in a buffer of the second RLC entity based on adjusting the state variable of the second RLC entity. In some cases, the updated state variable of the first RLC entity is indicated to the second RLC by an indication from the PDCP entity, the first RLC entity, or an RRC entity.

Timer manager 1365 may activate a timer based on transferring the first data packet to the first RLC entity and determine that the timer expired without receiving an acknowledgement from a receiving device, where transferring the second PDCP packet is based on the timer expiring.

Carrier aggregation manager 1370 may transmit the first PDCP packet using a first component carrier having a first frequency spectrum band, the first component carrier being mapped to the first RLC entity, transmit the second PDCP packet using a second component carrier having a second frequency spectrum band different from the first frequency spectrum band, the second component carrier being mapped to the second RLC entity, and receive a message indicating the mapping of the first RLC entity to the first component carrier and the second RLC entity to the second component, where transmitting the first PDCP packet and the second PDCP packet is based on the message. In some cases, the transmitting device is using carrier aggregation and the first RLC entity and the second RLC entity are associated with a same base station.

BSR manager 1375 may transmit a first BSR for the first RLC entity, transmit a second BSR for the second RLC entity, and identify a buffer of an RLC entity that includes more data than any other buffer associated with other RLC entities. BSR manager 1375 may also transmit a single BSR that includes an amount of data of the identified buffer, identify a buffer of an RLC entity that includes less data than any other buffer associated with other RLC entities, average an amount of data stored in a first buffer of the first RLC entity with an amount of data stored in a second buffer of the second RLC entity, transmit a single BSR that includes the averaged amount of data, transmit a second BSR for the second RLC entity, transmit a single BSR that includes the first buffer status and the second buffer status, transmit a BSR associated with at least a bearer configured to support duplication of packets for a PDCP entity, and identify a first buffer status for a first buffer of the first RLC entity and a second buffer status for a second buffer of the second RLC entity, and transmit a single buffer status report that includes the first buffer status and the second buffer status. In some cases, the long duplication format includes a buffer size of bearers that do not support duplication. In some cases, the BSR includes a bearer type, information about whether the bearer is a duplication bearer, an indication of whether the BSR includes information per RLC entity or includes information per PDCP entity, or combinations thereof. In some cases, the BSR is transmitted using a short duplication format. In some cases, the short duplication format includes a logical channel identifier (LCID), a logical channel group identifier (LCG ID), a buffer size of the first RLC entity, a buffer size of the second RLC entity, padding, or combinations thereof. In some cases, the BSR is transmitted using a long duplication format. In some cases, the long duplication format includes information organized based on a radio bearer identifier.

Figure 14:
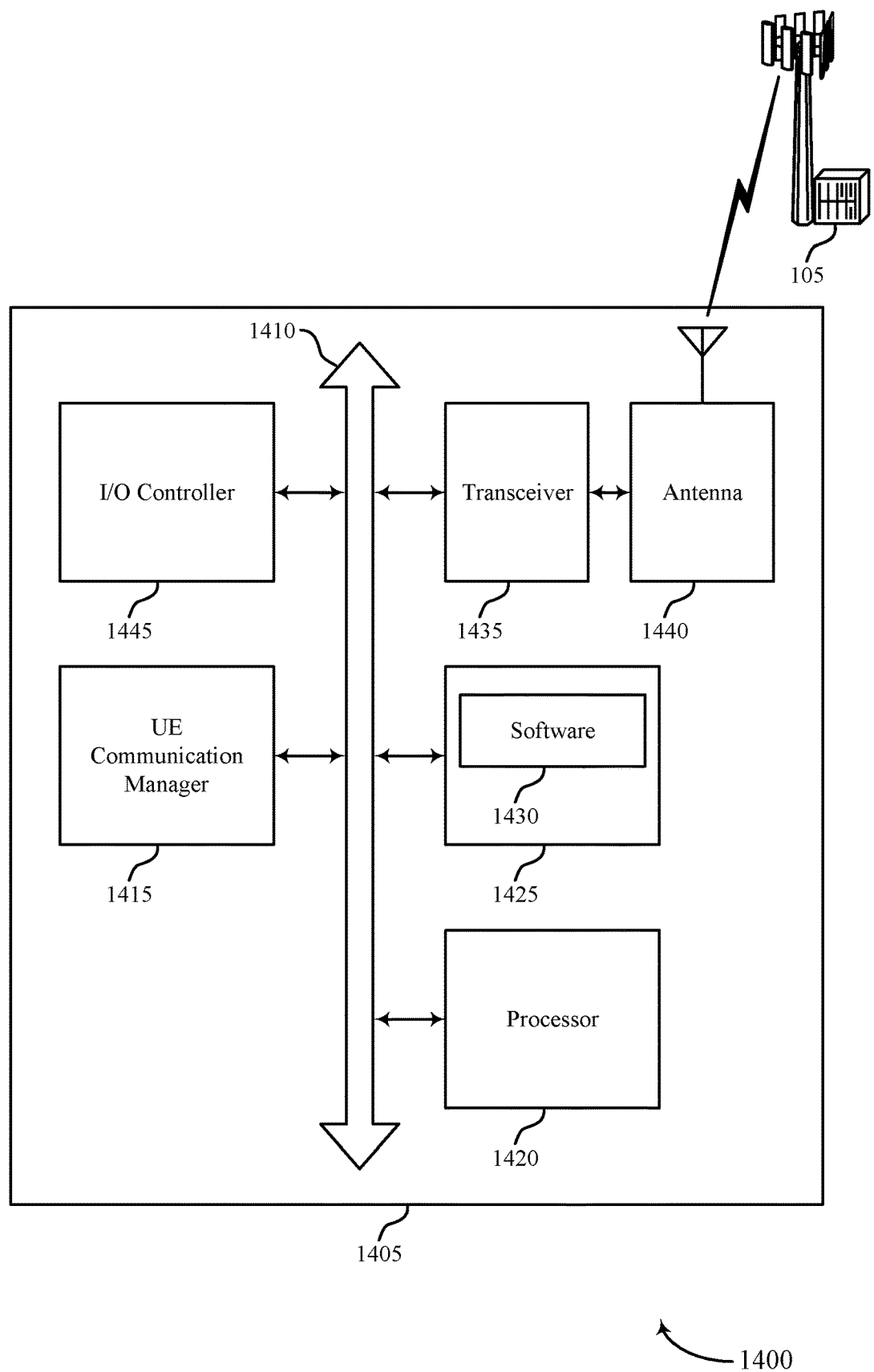
FIG. 14 illustrates a block diagram of a system including a user equipment (UE) that supports packet duplication at a PDCP entity in accordance with aspects of the present disclosure.

FIG. 14 shows a diagram of a system 1400 including a device 1405 that supports packet duplication at a PDCP entity in accordance with aspects of the present disclosure. Device 1405 may be an example of or include the components of wireless device 1105, wireless device 1205, or a UE 115 as described above, e.g., with reference to FIGS. 11 and 12. Device 1405 may include components for bi-directional voice and data communications including components for transmitting and receiving communications, including UE communication manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting packet duplication at a PDCP entity).

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 may contain, among other things, a basic input/output system (BIOS) which may control basic hardware or software operation such as the interaction with peripheral components or devices.

Software 1430 may include code to implement aspects of the present disclosure, including code to support packet duplication at a PDCP entity. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
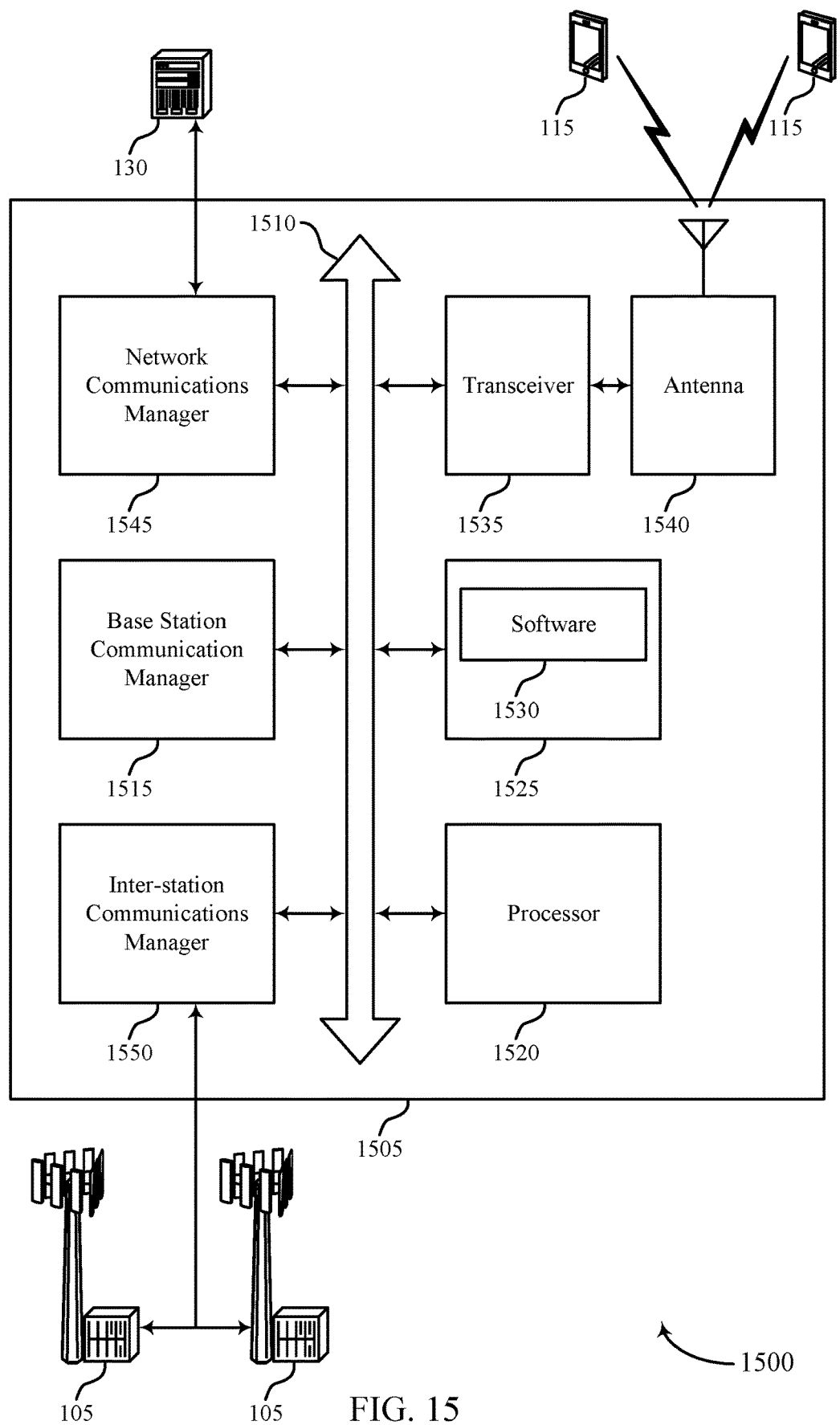
FIG. 15 illustrates a block diagram of a system including a base station that supports packet duplication at a PDCP entity in accordance with aspects of the present disclosure.

FIG. 15 shows a diagram of a system 1500 including a device 1505 that supports packet duplication at a PDCP entity in accordance with aspects of the present disclosure. Device 1505 may be an example of or include the components of wireless device 1205, wireless device 1305, or a base station 105 as described above, e.g., with reference to FIGS. 12 and 13. Device 1505 may include components for bi-directional voice and data communications including components for transmitting and receiving communications, including base station communication manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting packet duplication at a PDCP entity).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support packet duplication at a PDCP entity. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an Long Term Evolution (LTE)/LTE-A wireless communication network technology to provide communication between base stations 105.

Figure 16:
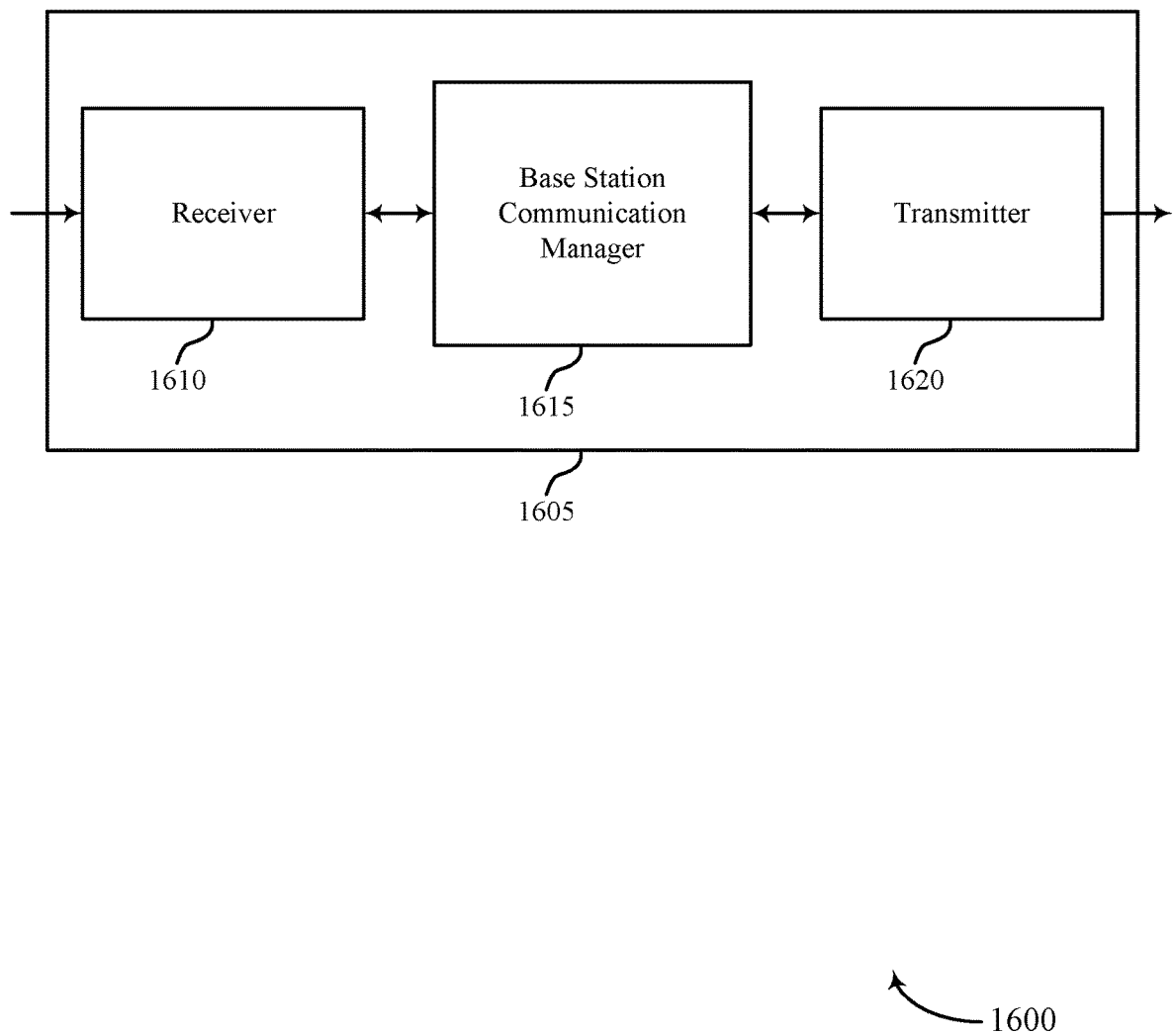
FIGS. 16 through 18 illustrate block diagrams of a device that supports packet duplication at a PDCP entity in accordance with aspects of the present disclosure.

FIG. 16 shows a block diagram 1600 of a wireless device 1605 that supports packet duplication at a PDCP entity in accordance with aspects of the present disclosure. Wireless device 1605 may be an example of aspects of a base station 105 as described herein. Wireless device 1605 may include receiver 1610, base station communication manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to packet duplication at a PDCP entity, etc.). Information may be passed on to other components of the device. The receiver 1610 may be an example of aspects of the transceiver 1935 described with reference to FIG. 19. The receiver 1610 may utilize a single antenna or a set of antennas.

Base station communication manager 1615 may be an example of aspects of the base station communication manager 1915 described with reference to FIG. 19. Base station communication manager 1615 and/or at least some of its various sub-components may be implemented in hardware, software executed by a processor, firmware, or any combination thereof. If implemented in software executed by a processor, the functions of the base station communication manager 1615 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communication manager 1615 and/or at least some of its various sub-components may be physically located at various positions, including being distributed such that portions of functions are implemented at different physical locations by one or more physical devices. In some examples, base station communication manager 1615 and/or at least some of its various sub-components may be a separate and distinct component in accordance with various aspects of the present disclosure. In other examples, base station communication manager 1615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communication manager 1615 may measure an activation parameter associated with packet duplication, determine that the activation parameter satisfies an activation threshold, and transmit an activation message indicating that duplicated packets are to be communicated between the base station and a UE based on determining that the activation parameter satisfies the activation threshold.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1935 described with reference to FIG. 19. The transmitter 1620 may utilize a single antenna or a set of antennas.

Figure 17:
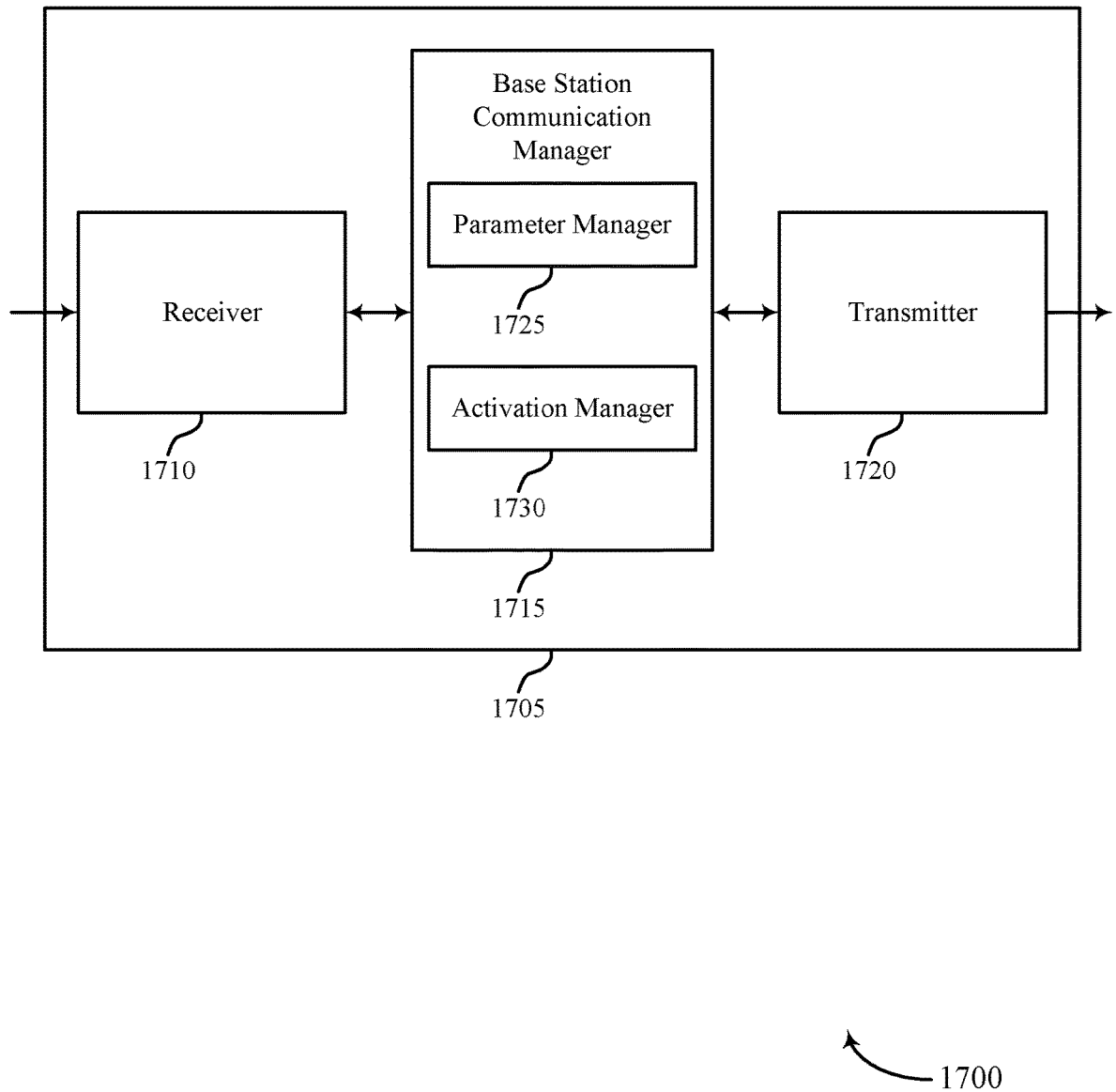

FIG. 17 shows a block diagram 1700 of a wireless device 1705 that supports packet duplication at a PDCP entity in accordance with aspects of the present disclosure. Wireless device 1705 may be an example of aspects of a wireless device 1605 or a base station 105 as described with reference to FIG. 16. Wireless device 1705 may include receiver 1710, base station communication manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to packet duplication at a PDCP entity, etc.). Information may be passed on to other components of the device. The receiver 1710 may be an example of aspects of the transceiver 1935 described with reference to FIG. 19. The receiver 1710 may utilize a single antenna or a set of antennas.

Base station communication manager 1715 may be an example of aspects of the base station communication manager 1915 described with reference to FIG. 19. Base station communication manager 1715 may also include parameter manager 1725 and activation manager 1730.

Parameter manager 1725 may measure an activation parameter associated with packet duplication. In some cases, the activation parameter is a packet loss rate or a channel quality indicator associated with a communication link between the base station and the UE.

Activation manager 1730 may determine that the activation parameter satisfies an activation threshold, transmit an activation message indicating that duplicated packets are to be communicated between the base station and a UE based on determining that the activation parameter satisfies the activation threshold, and receive a first PDCP packet from the UE and a second PDCP packet from the UE based on transmitting the activation message, the second PDCP packet being a copy of the first PDCP packet. In some cases, the activation message indicates that the UE is to transmit duplicated packets to the base station.

Transmitter 1720 may transmit signals generated by other components of the device. In some examples, the transmitter 1720 may be collocated with a receiver 1710 in a transceiver module. For example, the transmitter 1720 may be an example of aspects of the transceiver 1935 described with reference to FIG. 19. The transmitter 1720 may utilize a single antenna or a set of antennas.

Figure 18:
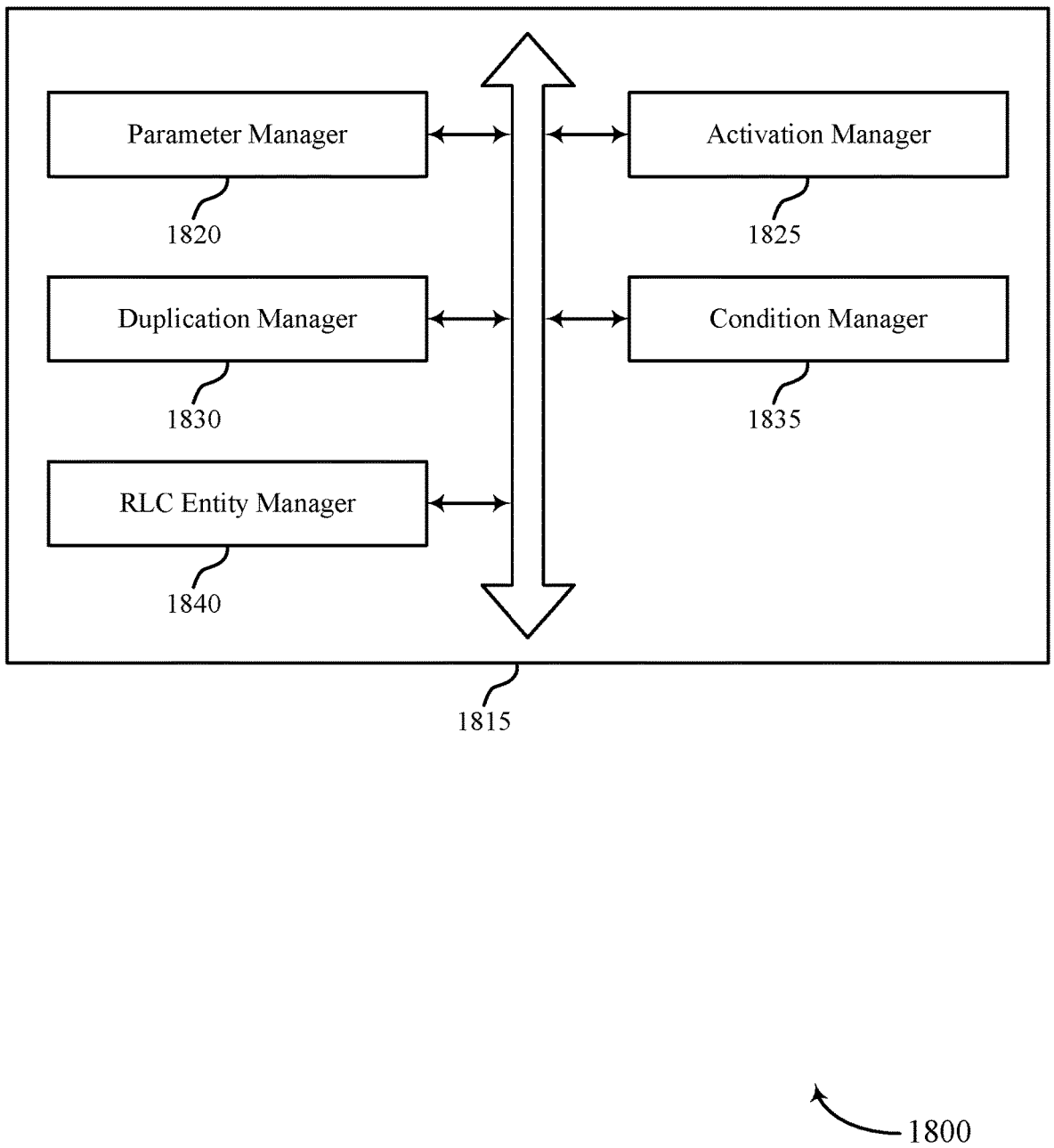

FIG. 18 shows a block diagram 1800 of a base station communication manager 1815 that supports packet duplication at a PDCP entity in accordance with aspects of the present disclosure. The base station communication manager 1815 may be an example of aspects of a base station communication manager 1915 described with reference to FIGS. 16, 17, and 19. The base station communication manager 1815 may include parameter manager 1820, activation manager 1825, duplication manager 1830, condition manager 1835, and RLC entity manager 1840. Each of these modules may communicate, directly or indirectly, with one another (e.g., via one or more buses).

Parameter manager 1820 may measure an activation parameter associated with packet duplication. In some cases, the activation parameter is a packet loss rate or a channel quality indicator associated with a communication link between the base station and the UE.

Activation manager 1825 may determine that the activation parameter satisfies an activation threshold, transmit an activation message indicating that duplicated packets are to be communicated between the base station and a UE based on determining that the activation parameter satisfies the activation threshold, and receive a first PDCP packet from the UE and a second PDCP packet from the UE based on transmitting the activation message, the second PDCP packet being a copy of the first PDCP packet. In some cases, the activation message indicates that the UE is to transmit duplicated packets to the base station.

Duplication manager 1830 may duplicate, by a PDCP entity of the base station, a first PDCP packet to create a second PDCP packet that is a copy of the first PDCP packet based on determining that the activation parameter satisfies the activation threshold.

Condition manager 1835 may transmit a condition for activating packet duplication that includes an indication of the activation parameter and the activation threshold.

RLC entity manager 1840 may select the first RLC entity or the second RLC entity as a default RLC entity and transmit an identification of the default RLC entity to the UE.

Figure 19:
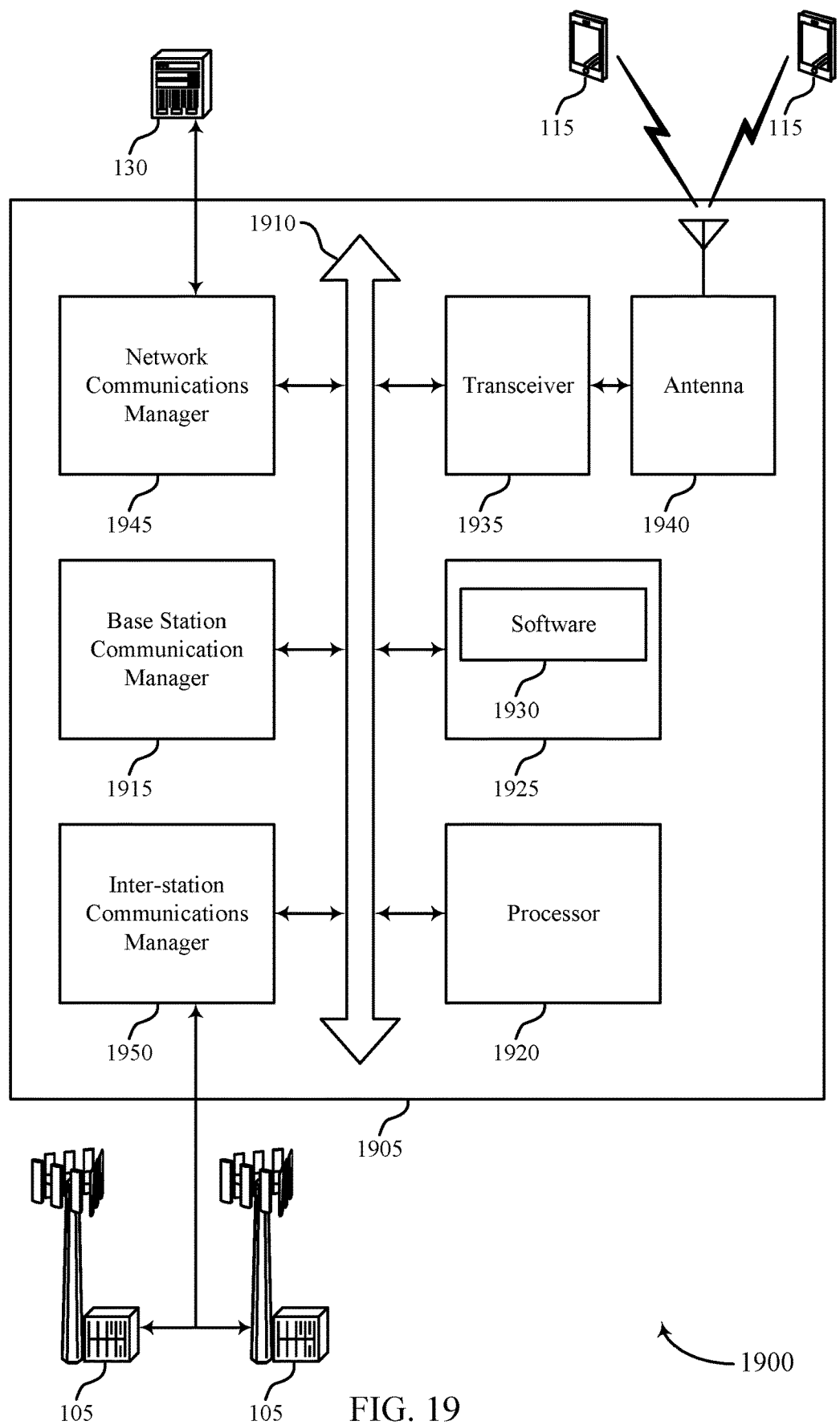
FIG. 19 illustrates a block diagram of a system including a base station that supports packet duplication at a PDCP entity in accordance with aspects of the present disclosure.

FIG. 19 shows a diagram of a system 1900 including a device 1905 that supports packet duplication at a PDCP entity in accordance with aspects of the present disclosure. Device 1905 may be an example of or include the components of base station 105 as described above, e.g., with reference to FIG. 1. Device 1905 may include components for bi-directional voice and data communications including components for transmitting and receiving communications, including base station communication manager 1915, processor 1920, memory 1925, software 1930, transceiver 1935, antenna 1940, network communications manager 1945, and inter-station communications manager 1950. These components may be in electronic communication via one or more buses (e.g., bus 1910). Device 1905 may communicate wirelessly with one or more UEs 115.

Processor 1920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting packet duplication at a PDCP entity).

Memory 1925 may include RAM and ROM. The memory 1925 may store computer-readable, computer-executable software 1930 including instructions that, when executed, cause the processor to perform various functions described herein. In some cases, the memory 1925 may contain, among other things, a BIOS which may control basic hardware or software operation such as the interaction with peripheral components or devices.

Software 1930 may include code to implement aspects of the present disclosure, including code to support packet duplication at a PDCP entity. Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas.

In some cases, the wireless device may include a single antenna 1940. However, in some cases the device may have more than one antenna 1940, which may be capable of concurrently transmitting or receiving multiple wireless transmissions.

Network communications manager 1945 may manage communications with the core network (e.g., via one or more wired backhaul links). For example, the network communications manager 1945 may manage the transfer of data communications for client devices, such as one or more UEs 115.

Inter-station communications manager 1950 may manage communications with other base station 105, and may include a controller or scheduler for controlling communications with UEs 115 in cooperation with other base stations 105. For example, the inter-station communications manager 1950 may coordinate scheduling for transmissions to UEs 115 for various interference mitigation techniques such as beamforming or joint transmission. In some examples, inter-station communications manager 1950 may provide an X2 interface within an LTE/LTE-A wireless communication network technology to provide communication between base stations 105.

Figure 20:
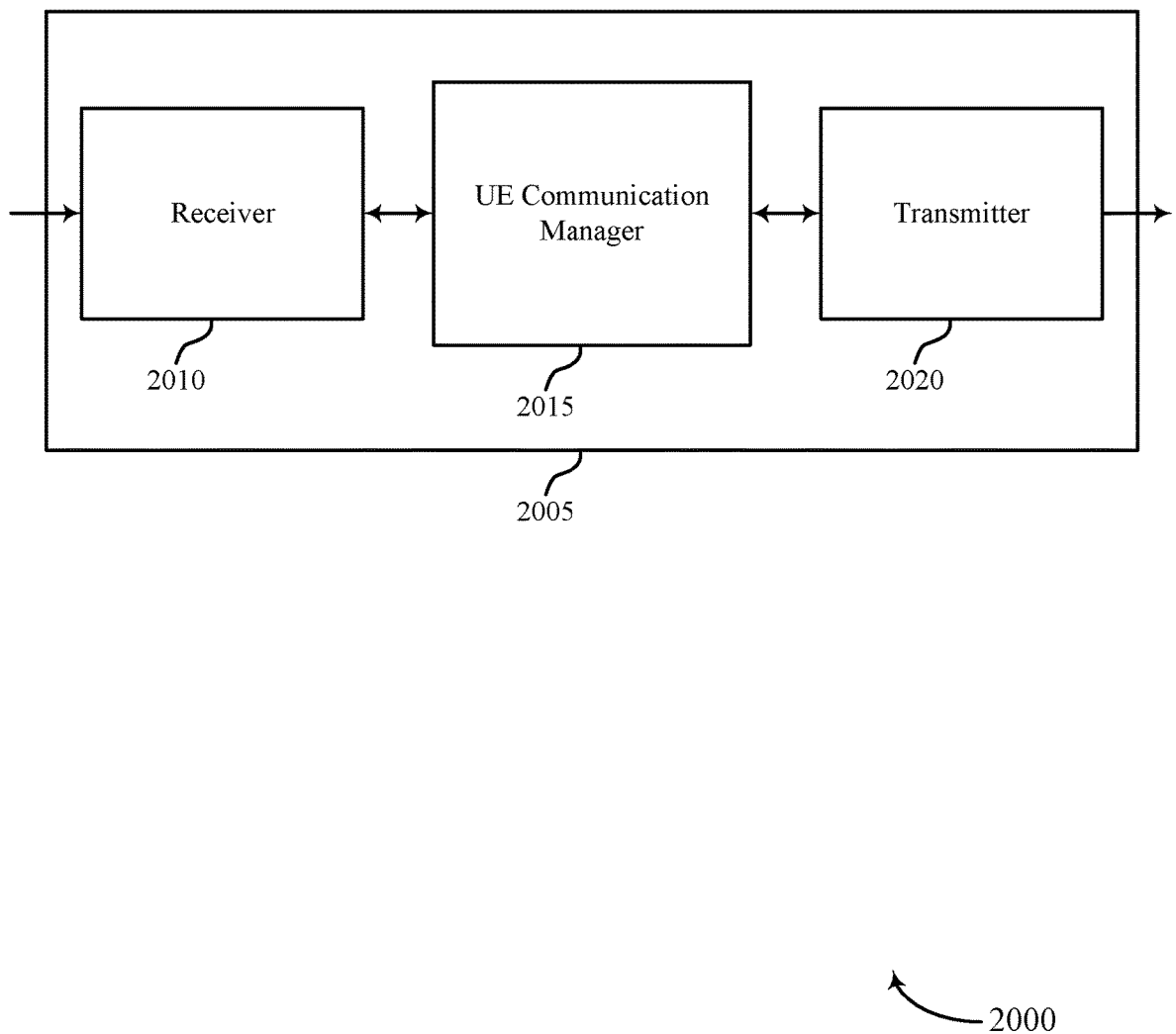
FIGS. 20 through 22 illustrate block diagrams of a device that supports packet duplication at a PDCP entity in accordance with aspects of the present disclosure.

FIG. 20 shows a block diagram 2000 of a wireless device 2005 that supports packet duplication at a PDCP entity in accordance with aspects of the present disclosure. Wireless device 2005 may be an example of aspects of a UE 115 as described herein. Wireless device 2005 may include receiver 2010, UE communication manager 2015, and transmitter 2020. Wireless device 2005 may also include a processor. Each of these components may be in communication with one another (e.g., via one or more buses).

Receiver 2010 may receive information such as packets, user data, or control information associated with various information channels (e.g., control channels, data channels, and information related to packet duplication at a PDCP entity, etc.). Information may be passed on to other components of the device. The receiver 2010 may be an example of aspects of the transceiver 2335 described with reference to FIG. 23. The receiver 2010 may utilize a single antenna or a set of antennas.

UE communication manager 2015 may be an example of aspects of the UE communication manager 2315 described with reference to FIG. 23. UE communication manager 2015 and/or at least some of its various sub-components may be implemented in hardware, software executed by a processor, firmware, or any combination thereof. If implemented in software executed by a processor, the functions of the UE communication manager 2015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communication manager 2015 and/or at least some of its various sub-components may be physically located at various positions, including being distributed such that portions of functions are implemented at different physical locations by one or more physical devices. In some examples, UE communication manager 2015 and/or at least some of its various sub-components may be a separate and distinct component in accordance with various aspects of the present disclosure. In other examples, UE communication manager 2015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communication manager 2015 may receive a condition for activating packet duplication from a base station, the condition including an indication of an activation parameter and an activation threshold, measure the activation parameter associated with packet duplication, determine that the activation parameter satisfies the activation threshold, and transmit an activation message indicating that duplicated packets are to be communicated between the base station and the UE based on determining that the activation parameter satisfies the activation threshold.

Transmitter 2020 may transmit signals generated by other components of the device. In some examples, the transmitter 2020 may be collocated with a receiver 2010 in a transceiver module. For example, the transmitter 2020 may be an example of aspects of the transceiver 2335 described with reference to FIG. 23. The transmitter 2020 may utilize a single antenna or a set of antennas.

Figure 21:
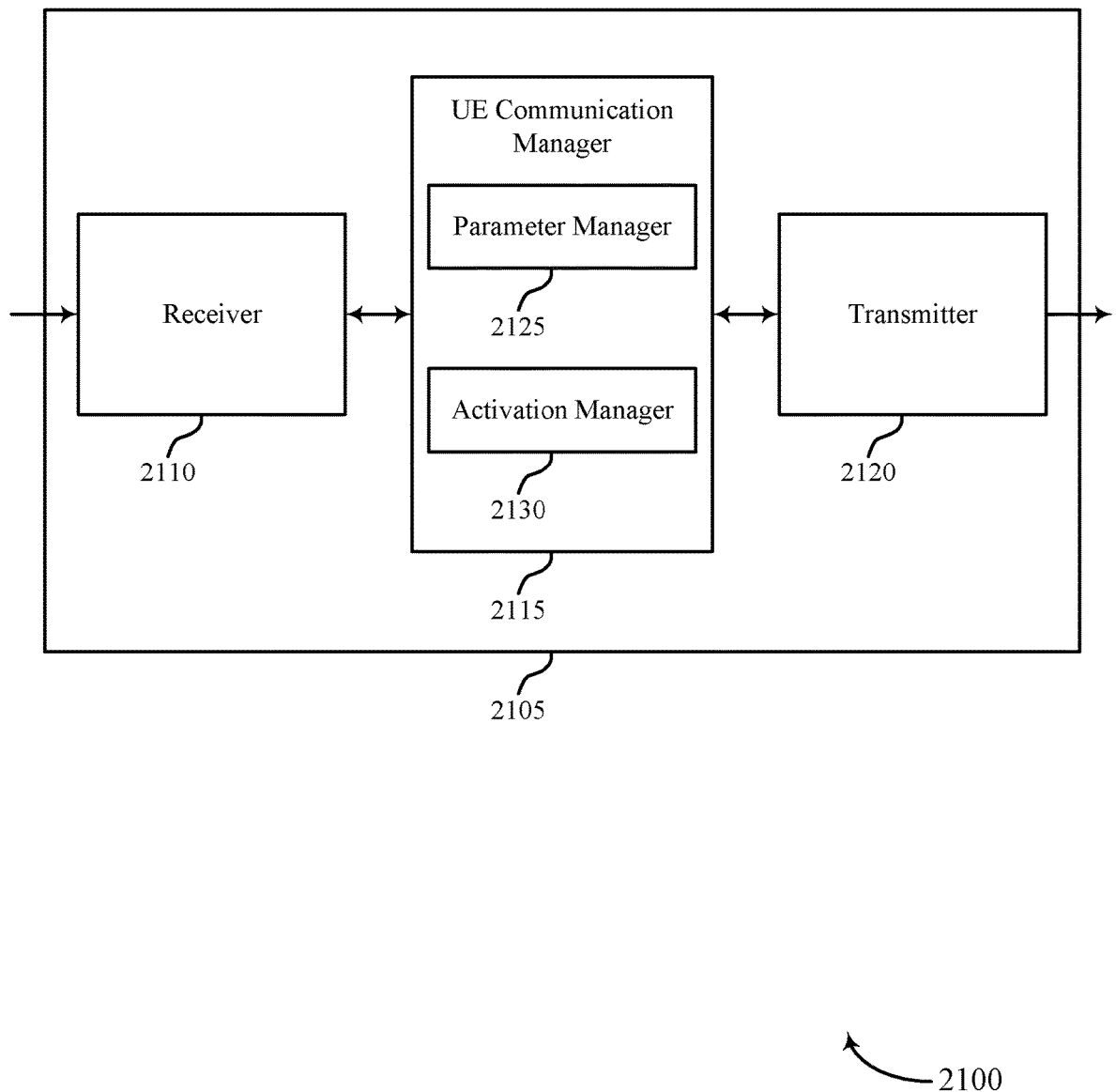

FIG. 21 shows a block diagram 2100 of a wireless device 2105 that supports packet duplication at a PDCP entity in accordance with aspects of the present disclosure. Wireless device 2105 may be an example of aspects of a wireless device 2005 or a UE 115 as described with reference to FIG. 20. Wireless device 2105 may include receiver 2110, UE communication manager 2115, and transmitter 2120. Wireless device 2105 may also include a processor. Each of these components may be in communication with one another (e.g., via one or more buses).

Receiver 2110 may receive information such as packets, user data, or control information associated with various information channels (e.g., control channels, data channels, and information related to packet duplication at a PDCP entity, etc.). Information may be passed on to other components of the device. The receiver 2110 may be an example of aspects of the transceiver 2335 described with reference to FIG. 23. The receiver 2110 may utilize a single antenna or a set of antennas.

UE communication manager 2115 may be an example of aspects of the UE communication manager 2315 described with reference to FIG. 23. UE communication manager 2115 may also include parameter manager 2125 and activation manager 2130.

Parameter manager 2125 may receive a condition for activating packet duplication from a base station, the condition including an indication of an activation parameter and an activation threshold and measure the activation parameter associated with packet duplication. In some cases, the activation parameter is a packet loss rate or a channel quality indicator associated with a communication link between the base station and the UE.

Activation manager 2130 may determine that the activation parameter satisfies the activation threshold and transmit an activation message indicating that duplicated packets are to be communicated between the base station and the UE based on determining that the activation parameter satisfies the activation threshold.

Transmitter 2120 may transmit signals generated by other components of the device. In some examples, the transmitter 2120 may be collocated with a receiver 2110 in a transceiver module. For example, the transmitter 2120 may be an example of aspects of the transceiver 2335 described with reference to FIG. 23. The transmitter 2120 may utilize a single antenna or a set of antennas.

Figure 22:
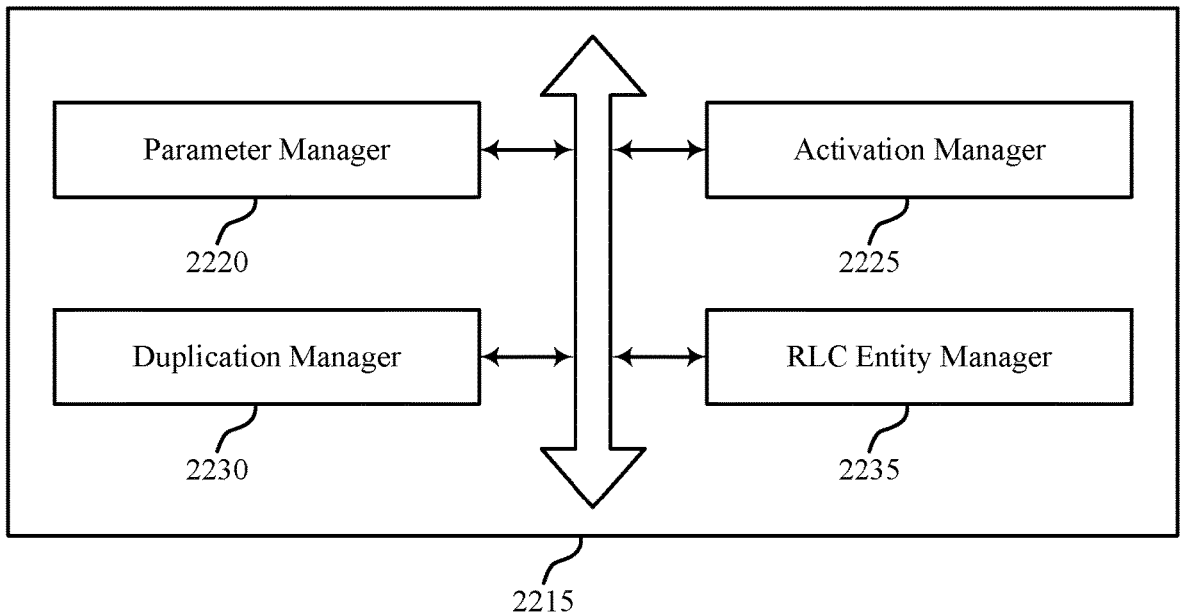

FIG. 22 shows a block diagram 2200 of a UE communication manager 2215 that supports packet duplication at a PDCP entity in accordance with aspects of the present disclosure. The UE communication manager 2215 may be an example of aspects of a UE communication manager 2315 described with reference to FIGS. 20, 21, and 23. The UE communication manager 2215 may include parameter manager 2220, activation manager 2225, duplication manager 2230, and RLC entity manager 2235. Each of these modules may communicate, directly or indirectly, with one another (e.g., via one or more buses).

Parameter manager 2220 may receive a condition for activating packet duplication from a base station, the condition including an indication of an activation parameter and an activation threshold and measure the activation parameter associated with packet duplication. In some cases, the activation parameter is a packet loss rate or a channel quality indicator associated with a communication link between the base station and the UE.

Activation manager 2225 may determine that the activation parameter satisfies the activation threshold and transmit an activation message indicating that duplicated packets are to be communicated between the base station and the UE based on determining that the activation parameter satisfies the activation threshold.

Duplication manager 2230 may duplicate, by a PDCP entity of the UE, a first PDCP packet to create a second PDCP packet that is a copy of the first PDCP packet based on determining that the activation parameter satisfies the activation threshold and transmit the first PDCP packet and the second PDCP packet to the base station based on determining that the activation parameter satisfies the activation threshold.

RLC entity manager 2235 may forward the first PDCP packet to a first RLC entity and the second PDCP packet to a second RLC entity different from the first RLC entity and receive an identification of a default RLC entity from the base station.

Figure 23:
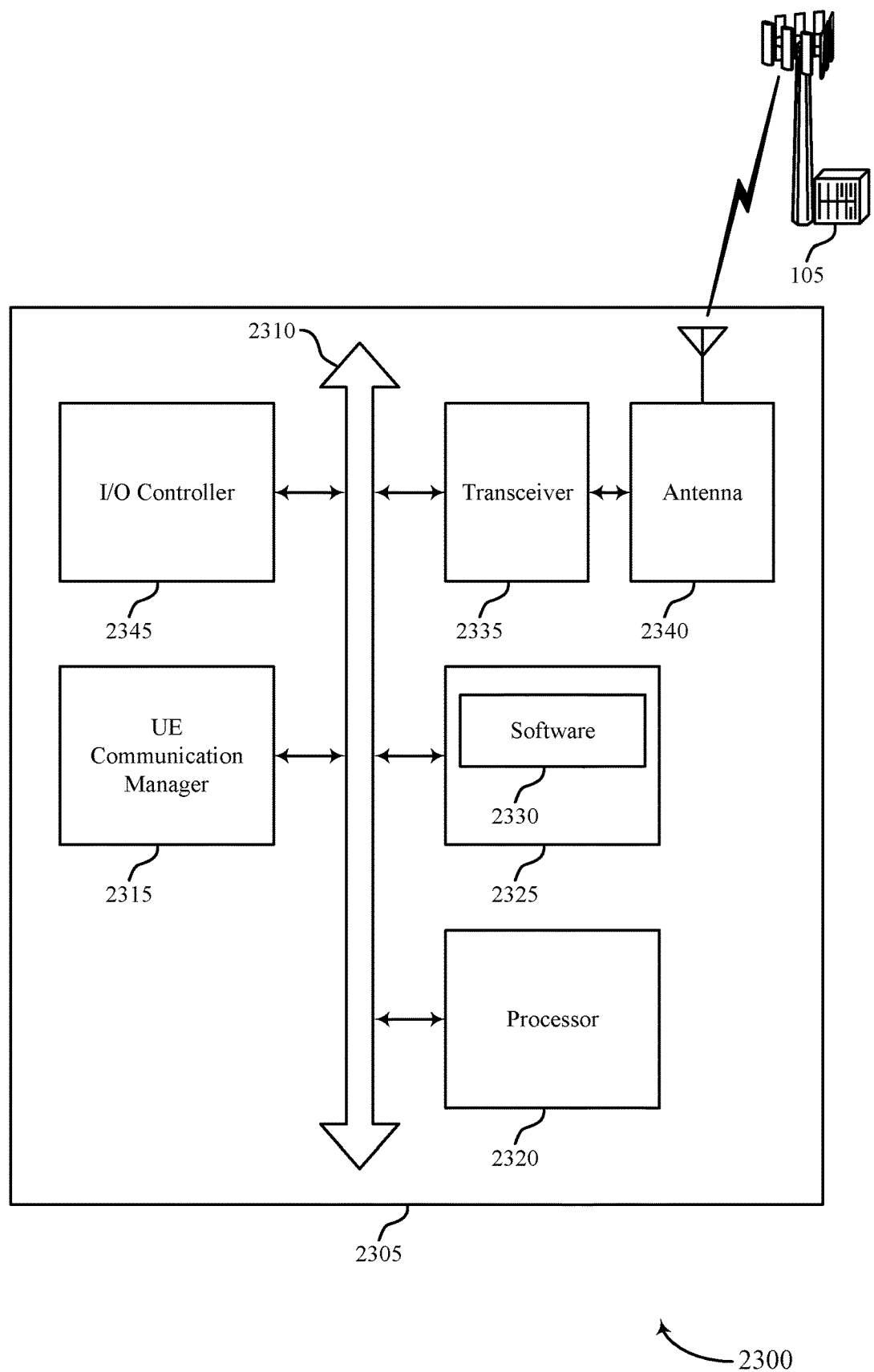
FIG. 23 illustrates a block diagram of a system including a UE that supports packet duplication at a PDCP entity in accordance with aspects of the present disclosure.

FIG. 23 shows a diagram of a system 2300 including a device 2305 that supports packet duplication at a PDCP entity in accordance with aspects of the present disclosure. Device 2305 may be an example of or include the components of UE 115 as described above, e.g., with reference to FIG. 1. Device 2305 may include components for bi-directional voice and data communications including components for transmitting and receiving communications, including UE communication manager 2315, processor 2320, memory 2325, software 2330, transceiver 2335, antenna 2340, and I/O controller 2345. These components may be in electronic communication via one or more buses (e.g., bus 2310). Device 2305 may communicate wirelessly with one or more base stations 105.

Processor 2320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2320 may be configured to operate a memory array using a memory controller. In other cases, a memory controller may be integrated into processor 2320. Processor 2320 may be configured to execute computer-readable instructions stored in a memory to perform various functions (e.g., functions or tasks supporting packet duplication at a PDCP entity).

Memory 2325 may include RAM and ROM. The memory 2325 may store computer-readable, computer-executable software 2330 including instructions that, when executed, cause the processor to perform various functions described herein. In some cases, the memory 2325 may contain, among other things, a BIOS which may control basic hardware or software operation such as the interaction with peripheral components or devices.

Software 2330 may include code to implement aspects of the present disclosure, including code to support packet duplication at a PDCP entity. Software 2330 may be stored in a non-transitory computer-readable medium such as system memory or other memory. In some cases, the software 2330 may not be directly executable by the processor but may cause a computer (e.g., when compiled and executed) to perform functions described herein.

Transceiver 2335 may communicate bi-directionally, via one or more antennas, wired, or wireless links as described above. For example, the transceiver 2335 may represent a wireless transceiver and may communicate bi-directionally with another wireless transceiver. The transceiver 2335 may also include a modem to modulate the packets and provide the modulated packets to the antennas for transmission, and to demodulate packets received from the antennas.

In some cases, the wireless device may include a single antenna 2340. However, in some cases the device may have more than one antenna 2340, which may be capable of concurrently transmitting or receiving multiple wireless transmissions.

I/O controller 2345 may manage input and output signals for device 2305. I/O controller 2345 may also manage peripherals not integrated into device 2305. In some cases, I/O controller 2345 may represent a physical connection or port to an external peripheral. In some cases, I/O controller 2345 may utilize an operating system such as iOS®, ANDROID®, MS-DOS®, MS-WINDOWS®, OS/2®, UNIX®, LINUX®, or another known operating system. In other cases, I/O controller 2345 may represent or interact with a modem, a keyboard, a mouse, a touchscreen, or a similar device. In some cases, I/O controller 2345 may be implemented as part of a processor. In some cases, a user may interact with device 2305 via I/O controller 2345 or via hardware components controlled by I/O controller 2345.

Figure 24:
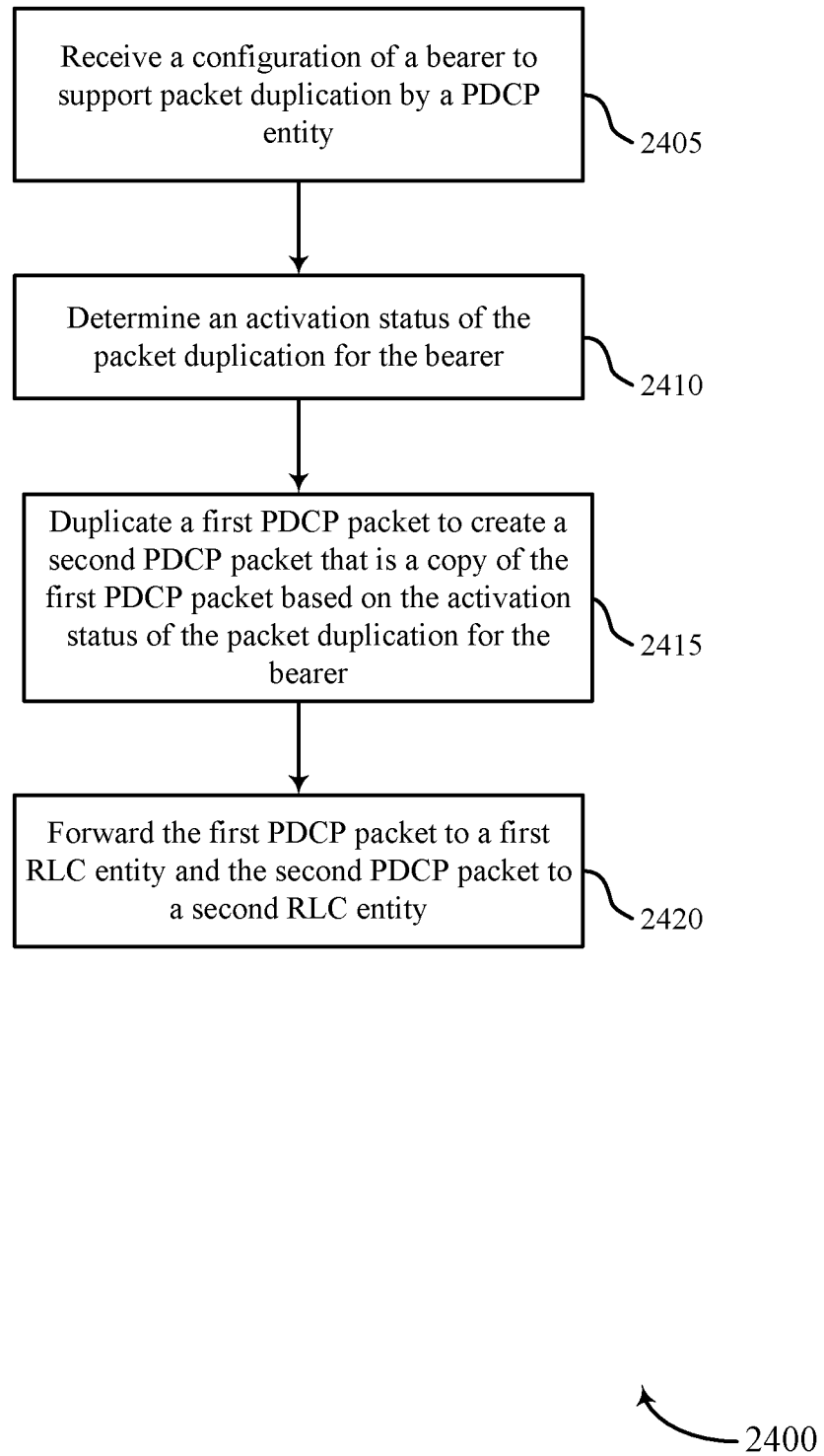
FIGS. 24 through 27 illustrate methods for packet duplication at a PDCP entity in accordance with aspects of the present disclosure.

FIG. 24 shows a flowchart illustrating a method 2400 for packet duplication at a PDCP entity in accordance with aspects of the present disclosure. The operations of method 2400 may be implemented by transmitting device such as the UE 115 or the base station 105 or its components as described herein. For example, the operations of method 2400 may be performed by a transmitting device communication manager as described with reference to FIGS. 11 through 13. In some examples, transmitting device such as the UE 115 or the base station 105 may execute a set of codes to control the functional elements of the device to perform the functions described below. Additionally or alternatively, the transmitting device such as the UE 115 or the base station 105 may perform aspects of the functions described below using special-purpose hardware.

At block 2405 the transmitting device such as the UE 115 or the base station 105 may receive a configuration of a bearer to support duplication of packets for a PDCP entity. The operations of block 2405 may be performed according to the methods described herein. In certain examples, aspects of the operations of block 2405 may be performed by a bearer manager as described with reference to FIGS. 11 through 13.

At block 2410 the transmitting device such as the UE 115 or the base station 105 may determine an activation status of the packet duplication for the bearer. The operations of block 2410 may be performed according to the methods described herein. In certain examples, aspects of the operations of block 2410 may be performed by a bearer manager as described with reference to FIGS. 11 through 13.

At block 2415 the transmitting device such as the UE 115 or the base station 105 may duplicate a first PDCP packet to create a second PDCP packet that is a copy of the first PDCP packet based at least in part on the activation status of the packet duplication for the bearer. The operations of block 2415 may be performed according to the methods described herein. In certain examples, aspects of the operations of block 2415 may be performed by a duplication manager as described with reference to FIGS. 11 through 13.

At block 2420 the transmitting device such as the UE 115 or the base station 105 may forward the first PDCP packet to a first RLC entity and the second PDCP packet to a second RLC entity. The operations of block 2420 may be performed according to the methods described herein. In certain examples, aspects of the operations of block 2420 may be performed by a transmitter as described with reference to FIGS. 11 through 13.

Figure 25:
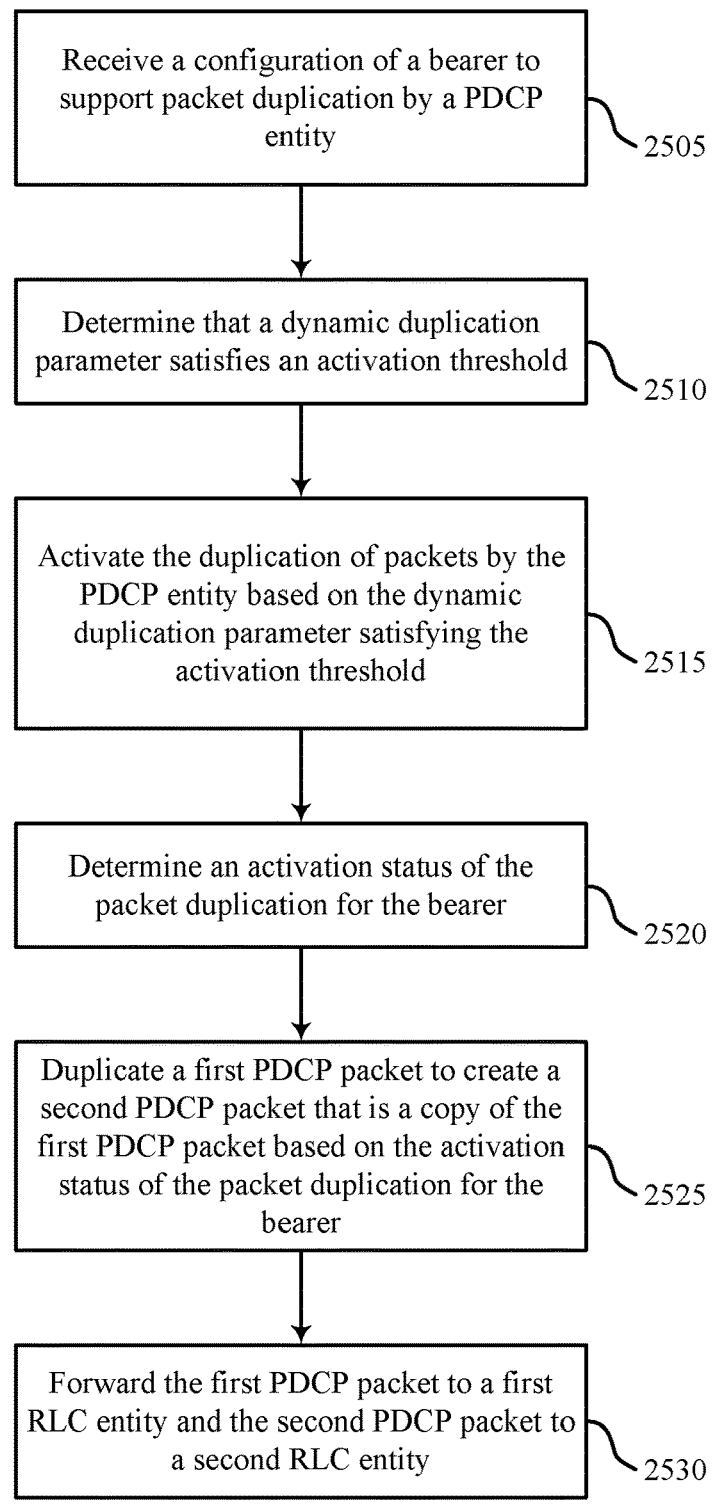

FIG. 25 shows a flowchart illustrating a method 2500 for packet duplication at a PDCP entity in accordance with aspects of the present disclosure. The operations of method 2500 may be implemented by transmitting device such as the UE 115 or the base station 105 or its components as described herein. For example, the operations of method 2500 may be performed by a transmitting device communication manager as described with reference to FIGS. 11 through 13. In some examples, transmitting device such as the UE 115 or the base station 105 may execute a set of codes to control the functional elements of the device to perform the functions described below. Additionally or alternatively, the transmitting device such as the UE 115 or the base station 105 may perform aspects of the functions described below using special-purpose hardware.

At block 2505 the transmitting device such as the UE 115 or the base station 105 may receive a configuration of a bearer to support duplication of packets for a PDCP entity. The operations of block 2505 may be performed according to the methods described herein. In certain examples, aspects of the operations of block 2505 may be performed by a bearer manager as described with reference to FIGS. 11 through 13.

At block 2510 the transmitting device such as the UE 115 or the base station 105 may determine that a dynamic duplication parameter satisfies an activation threshold. The operations of block 2510 may be performed according to the methods described herein. In certain examples, aspects of the operations of block 2510 may be performed by a parameter manager as described with reference to FIGS. 11 through 13.

At block 2515 the transmitting device such as the UE 115 or the base station 105 may activate the duplication of packets by the PDCP entity based at least in part on the dynamic duplication parameter satisfying the activation threshold. The operations of block 2515 may be performed according to the methods described herein. In certain examples, aspects of the operations of block 2515 may be performed by a duplication manager as described with reference to FIGS. 11 through 13.

At block 2520 the transmitting device such as the UE 115 or the base station 105 may determine an activation status of the packet duplication for the bearer. The operations of block 2520 may be performed according to the methods described herein. In certain examples, aspects of the operations of block 2520 may be performed by a bearer manager as described with reference to FIGS. 11 through 13.

At block 2525 the transmitting device such as the UE 115 or the base station 105 may duplicate a first PDCP packet to create a second PDCP packet that is a copy of the first PDCP packet based at least in part on the activation status of the packet duplication for the bearer. The operations of block 2525 may be performed according to the methods described herein. In certain examples, aspects of the operations of block 2525 may be performed by a duplication manager as described with reference to FIGS. 11 through 13.

At block 2530 the transmitting device such as the UE 115 or the base station 105 may forward the first PDCP packet to a first RLC entity and the second PDCP packet to a second RLC entity. The operations of block 2530 may be performed according to the methods described herein. In certain examples, aspects of the operations of block 2530 may be performed by a transmitter as described with reference to FIGS. 11 through 13.

Figure 26:
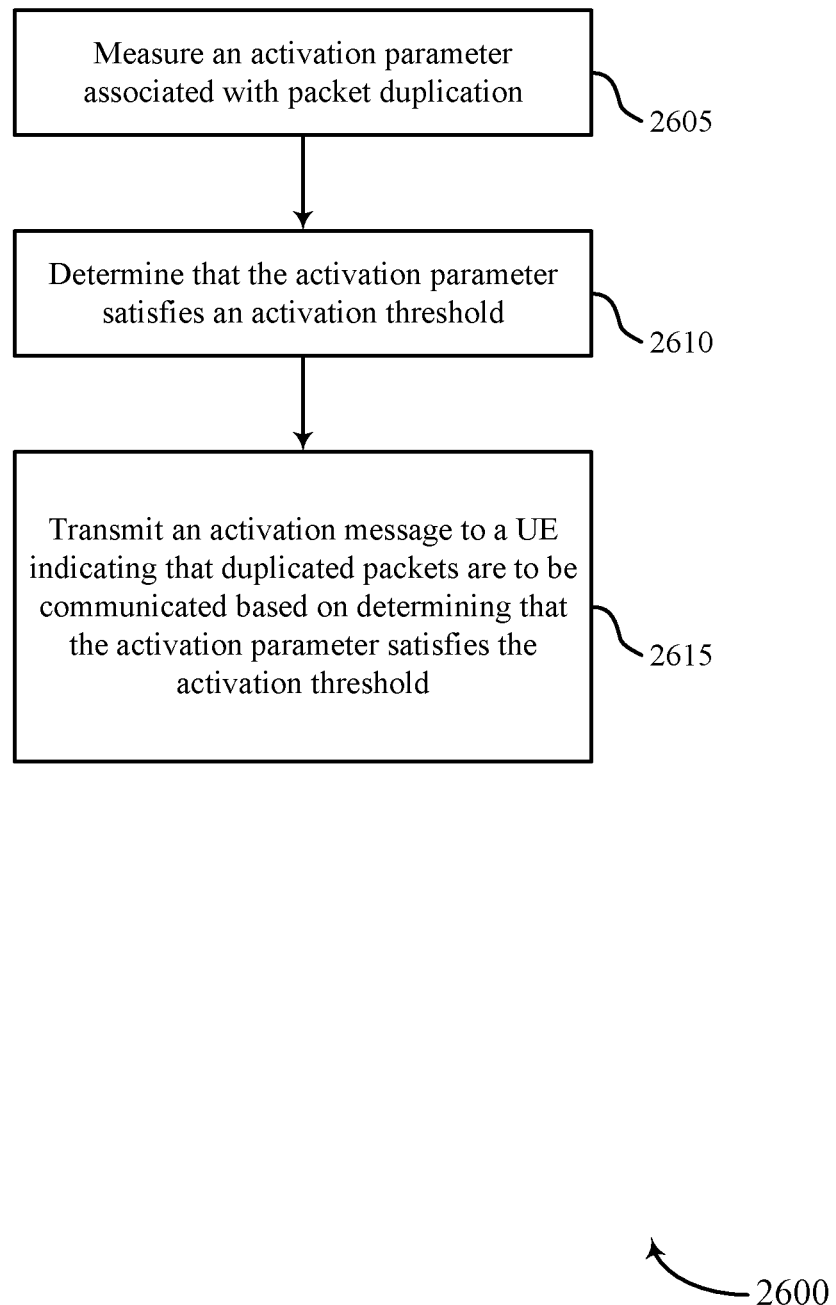

FIG. 26 shows a flowchart illustrating a method 2600 for packet duplication at a PDCP entity in accordance with aspects of the present disclosure. The operations of method 2600 may be implemented by a base station 105 or its components as described herein. For example, the operations of method 2600 may be performed by a base station communication manager as described with reference to FIGS. 15 through 19. In some examples, a base station 105 may execute a set of codes to control the functional elements of the device to perform the functions described below. Additionally or alternatively, the base station 105 may perform aspects of the functions described below using special-purpose hardware.

At block 2605 the base station 105 may measure an activation parameter associated with packet duplication. The operations of block 2605 may be performed according to the methods described herein. In certain examples, aspects of the operations of block 2605 may be performed by a parameter manager as described with reference to FIGS. 15 through 19.

At block 2610 the base station 105 may determine that the activation parameter satisfies an activation threshold. The operations of block 2610 may be performed according to the methods described herein. In certain examples, aspects of the operations of block 2610 may be performed by a activation manager as described with reference to FIGS. 15 through 19.

At block 2615 the base station 105 may transmit an activation message to a UE indicating that duplicated packets are to be communicated based at least in part on determining that the activation parameter satisfies the activation threshold. The operations of block 2615 may be performed according to the methods described herein. In certain examples, aspects of the operations of block 2615 may be performed by a activation manager as described with reference to FIGS. 15 through 19.

Figure 27:
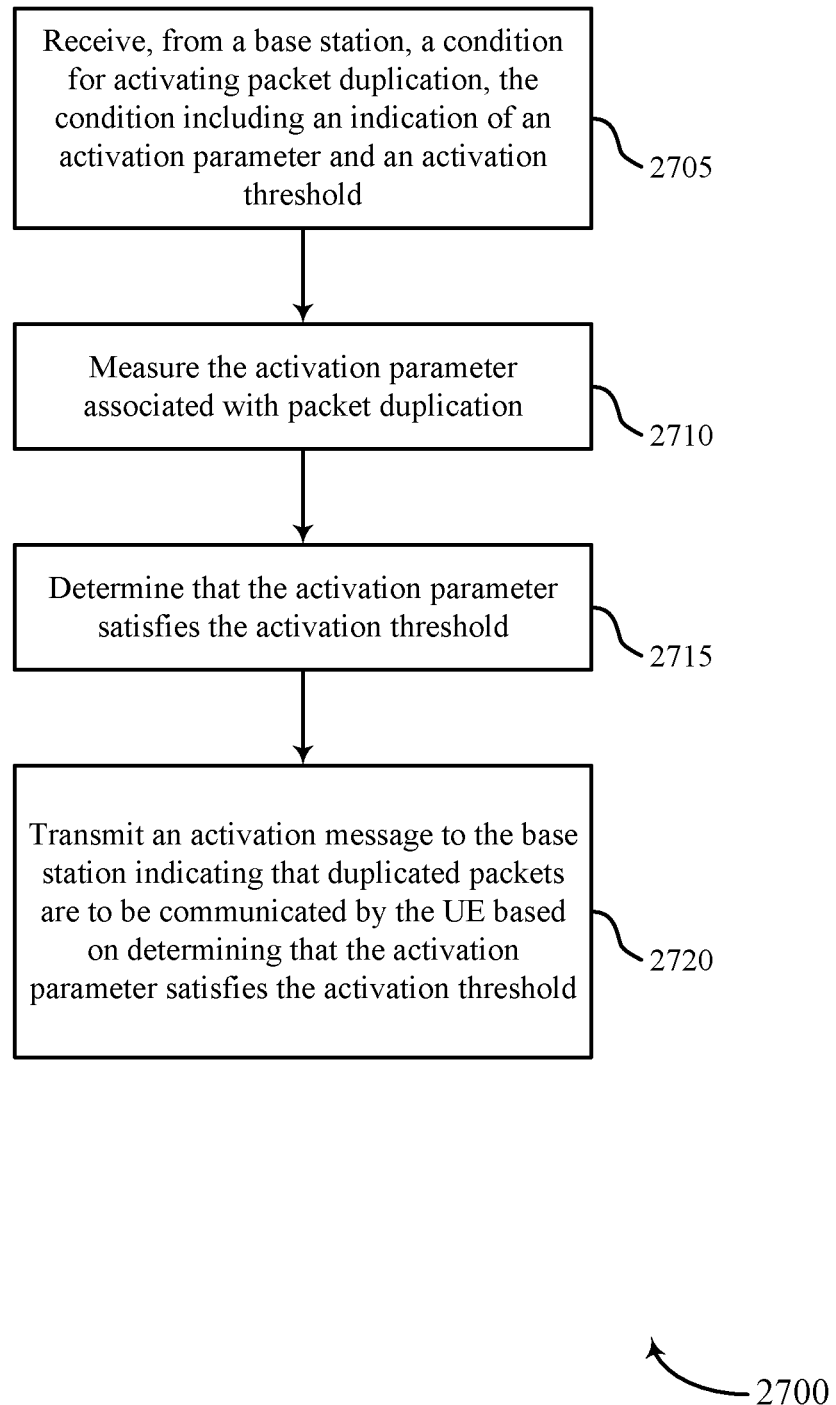

FIG. 27 shows a flowchart illustrating a method 2700 for packet duplication at a PDCP entity in accordance with aspects of the present disclosure. The operations of method 2700 may be implemented by a UE 115 or its components as described herein. For example, the operations of method 2700 may be performed by a UE communication manager as described with reference to FIGS. 14 through 23. In some examples, a UE 115 may execute a set of codes to control the functional elements of the device to perform the functions described below. Additionally or alternatively, the UE 115 may perform aspects of the functions described below using special-purpose hardware.

At block 2705 the UE 115 may receive, from a base station, a condition for activating packet duplication, the condition including an indication of an activation parameter and an activation threshold. The operations of block 2705 may be performed according to the methods described herein. In certain examples, aspects of the operations of block 2705 may be performed by a parameter manager as described with reference to FIGS. 14 through 23.

At block 2710 the UE 115 may measure the activation parameter associated with packet duplication. The operations of block 2710 may be performed according to the methods described herein. In certain examples, aspects of the operations of block 2710 may be performed by a parameter manager as described with reference to FIGS. 14 through 23.

At block 2715 the UE 115 may determine that the activation parameter satisfies the activation threshold. The operations of block 2715 may be performed according to the methods described herein. In certain examples, aspects of the operations of block 2715 may be performed by a activation manager as described with reference to FIGS. 14 through 23.

At block 2720 the UE 115 may transmit an activation message to the base station indicating that duplicated packets are to be communicated by the UE based at least in part on determining that the activation parameter satisfies the activation threshold. The operations of block 2720 may be performed according to the methods described herein. In certain examples, aspects of the operations of block 2720 may be performed by a activation manager as described with reference to FIGS. 14 through 23.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a configuration of a bearer to support packet duplication by a packet data convergence protocol (PDCP) entity;
determining an activation status of the packet duplication for the bearer;

duplicating a first PDCP packet to create a second PDCP packet that is a copy of the first PDCP packet based at least in part on the activation status of the packet duplication for the bearer;

forwarding the first PDCP packet to a first radio link control (RLC) entity and the second PDCP packet to a second RLC entity for transmission;

receiving, via the first RLC entity, an acknowledgement (ACK) indicating that the first PDCP packet was received by a receiving device;

refraining from transmitting the second PDCP packet via the second RLC entity based at least in part on receiving the ACK;

transmitting a first buffer status report (BSR) for the first RLC entity; and transmitting a second BSR for the second RLC entity, wherein the second BSR is different from the first BSR.

2. The method of claim 1, further comprising:
determining that a dynamic duplication parameter satisfies an activation threshold, the dynamic duplication parameter comprising a link parameter; and
activating the packet duplication by the PDCP entity based at least in part on the dynamic duplication parameter satisfying the activation threshold.

3. The method of claim 2, wherein the dynamic duplication parameter includes, a packet loss rate associated with the first RLC entity, a packet loss rate associated with the second RLC entity, a data rate associated with the first RLC entity, a data rate associated with the second RLC entity, a channel quality indicator associated with the first RLC entity, a channel quality indicator associated with the second RLC entity, an application packet type, a transport block size associated with the first RLC entity, a transport block size associated with the second RLC entity, or combinations thereof.

4. The method of claim 1, wherein at least one of the first PDCP packet of the first RLC entity or the second PDCP packet of the second RLC entity includes a logical channel identifier (LCID), a logical channel group identifier (LCG ID), a buffer size of the first RLC entity, a buffer size of the second RLC entity, padding, or combinations thereof.

5. The method of claim 1, further comprising:
identifying a current left edge and a next sequence number of the first RLC entity; and
determining a state variable for the second RLC entity based at least in part on the current left edge and the next sequence number of the first RLC entity.

6. The method of claim 1, further comprising:
adjusting a state variable of the second RLC entity based at least in part on an updated state variable of the first RLC entity; and
discarding packets stored in a buffer of the second RLC entity based at least in part on adjusting the state variable of the second RLC entity.

7. The method of claim 6, wherein:
the updated state variable of the first RLC entity is indicated to the second RLC entity by an indication from the PDCP entity, the first RLC entity, or a radio resource control (RRC) entity.

8. The method of claim 1, further comprising:
activating a timer based at least in part on forwarding the first PDCP packet to the first RLC entity.

9. The method of claim 8, further comprising:
receiving the ACK prior to the timer expiring.

10. The method of claim 8, wherein forwarding the second PDCP packet to the second RLC entity for transmission is based at least in part on the timer expiring prior to receiving the ACK.

11. The method of claim 1, further comprising:
transmitting the first PDCP packet using a first component carrier having a first frequency spectrum band, the first component carrier being mapped to the first RLC entity.

12. The method of claim 11, further comprising:
receiving a message indicating the mapping of the first RLC entity to the first component carrier and the second RLC entity to the second component carrier, wherein transmitting the first PDCP packet is based at least in part on the mapping.

13. The method of claim 1, further comprising:
identifying a first buffer status for a first buffer of the first RLC entity and a second buffer status for a second buffer of the second RLC entity; and
transmitting a single BSR that includes the first buffer status and the second buffer status.

14. The method of claim 1, further comprising:
selecting the first RLC entity or the second RLC entity as a default RLC entity; and
transmitting an identification of the default RLC entity to a receiving device.

15. The method of claim 1, wherein the first RLC entity and the second RLC entity are associated with carrier aggregation for communicating with a same base station.

16. The method of claim 1, wherein the first RLC entity is associated with a first base station and the second RLC entity is associated with a second base station different from the first base station for dual connectivity communication.

17. The method of claim 1, wherein the packet duplication includes a plurality of procedures for processing data at the PDCP entity that are different from procedures specified by other modes of operation of the PDCP entity.

18. The method of claim 1, further comprising:
coordinating a forwarding of the first PDCP packet to the first RLC entity and the second PDCP packet to the second RLC entity based at least in part on a status of the first RLC entity and a status of the second RLC entity.

19. The method of claim 18, further comprising:
configuring the status of the first RLC entity and the status of the second RLC entity based at least in part on activating the packet duplication, deactivating the packet duplication, or reactivating the packet duplication.

20. The method of claim 18, wherein:
the coordinating of the forwarding of the first PDCP packet and the second PDCP packet is based at least in part on using a timer.

21. An apparatus for wireless communication, comprising:
a processor;
memory in electronic communication with the processor; and
instructions stored in the memory and operable, when executed by the processor, to cause the apparatus to:
receive a configuration of a bearer to support packet duplication by a packet data convergence protocol (PDCP) entity;
determine an activation status of the packet duplication bearer;
duplicate a first PDCP packet to create a second PDCP packet that is a copy of the first PDCP packet based at least in part on the activation status of the packet duplication for the bearer;

forward the first PDCP packet to a first radio link control (RLC) entity and the second PDCP packet to a second RLC entity for transmission;

receive, via the first RLC entity, an acknowledgement (ACK) indicating that the first PDCP packet was received by a receiving device;

refrain from transmitting the second PDCP packet via the second RLC entity based at least in part on receiving the ACK;

transmit a first buffer status report (BSR) for the first RLC entity; and transmit a second BSR for the second RLC entity, wherein the second BSR is different from the first BSR.

22. A method for wireless communication by a user equipment (UE), comprising:

receiving, at the UE from a base station, a condition for activating packet duplication, the condition including an indication of an activation parameter and an activation threshold;

measuring the activation parameter associated with packet duplication;

determining that the activation parameter satisfies the activation threshold; and transmitting, by the UE to the base station, an activation message indicating that duplicated packets are to be communicated by the UE based at least in part on determining that the activation parameter satisfies the activation threshold, the activation message being transmitted prior to a transmission of the duplicated packets.

23. The method of claim 22, further comprising:

duplicating, by a packet data convergence protocol (PDCP) entity of the UE, a first PDCP packet to create a second PDCP packet that is a copy of the first PDCP packet based at least in part on determining that the activation parameter satisfies the activation threshold.

24. The method of claim 23, further comprising:

forwarding the first PDCP packet to a first RLC entity and the second PDCP packet to a second RLC entity different from the first RLC entity.

25. The method of claim 23, further comprising:

transmitting the first PDCP packet and the second PDCP packet to the base station based at least in part on determining that the activation parameter satisfies the activation threshold.

26. The method of claim 22, wherein:

the activation parameter is a packet loss rate or a channel quality indicator associated with a communication link between the base station and the UE.

27. The method of claim 22, further comprising:

receiving an identification of a default RLC entity from the base station.

28. An apparatus for wireless communication, comprising:

a processor;

memory in electronic communication with the processor; and instructions stored in the memory and operable, when executed by the processor, to cause the apparatus to:

receive, at a user equipment (UE) from a base station, a condition for activating packet duplication, the condition including an indication of an activation parameter and an activation threshold;

measure the activation parameter associated with packet duplication;

determine the activation parameter satisfies the activation threshold; and transmit, by the UE to the base station, an activation message indicating that duplicated packets are to be communicated by the UE based at least in part on determining that the activation parameter satisfies the activation threshold, the activation message being transmitted prior a transmission of the duplicated packets.

* * * * *